(12) United States Patent
Hara

(10) Patent No.: US 11,697,473 B2
(45) Date of Patent: Jul. 11, 2023

(54) BICYCLE REAR DERAILLEUR

(71) Applicant: SHIMANO INC., Sakai (JP)

(72) Inventor: Nobukatsu Hara, Sakai (JP)

(73) Assignee: SHIMANO INC., Sakai (JP)

( * ) Notice: Subject to any disclaimer, the term of this patent is extended or adjusted under 35 U.S.C. 154(b) by 114 days.

(21) Appl. No.: 17/202,298

(22) Filed: Mar. 15, 2021

(65) Prior Publication Data
US 2022/0289337 A1 Sep. 15, 2022

(51) Int. Cl.
B62M 9/124 (2010.01)
B62M 9/1242 (2010.01)
B62M 9/126 (2010.01)
B62M 9/125 (2010.01)

(52) U.S. Cl.
CPC ............ B62M 9/124 (2013.01); B62M 9/125 (2013.01); B62M 9/126 (2013.01); B62M 9/1242 (2013.01); B62M 2009/12406 (2013.01)

(58) Field of Classification Search
CPC .................. B62M 9/121; B62M 9/124; B62M 2009/12406; B62M 9/1242; B62M 9/1244; B62M 9/1246; B62M 9/1248; B62M 9/125; B62M 9/126; B62M 9/16
See application file for complete search history.

(56) References Cited

U.S. PATENT DOCUMENTS 3,583,249 A * 6/1971 Morse .................... B62M 9/126
474/80
3,710,636 A * 1/1973 Ozaki .................... B62M 9/126
474/82
4,231,264 A * 11/1980 Bergles .................. B62M 9/126
474/80
4,637,808 A * 1/1987 Nakamura ............. B62M 9/126
474/80
6,135,903 A * 10/2000 Savard ..................... B62M 9/16
474/82
6,159,118 A * 12/2000 Campbell ............ B62M 9/1248
474/78
6,793,598 B1 9/2004 Savard
7,104,908 B2 * 9/2006 Nagano ................ B62M 9/1242
474/82

(Continued)

FOREIGN PATENT DOCUMENTS

WO WO-2007057198 A1 * 5/2007 ............ B62M 9/121

Primary Examiner — Michael R Mansen
Assistant Examiner — Raveen J Dias
(74) Attorney, Agent, or Firm — Mori & Ward, LLP

(57) ABSTRACT

A bicycle rear derailleur comprises a base member, a linkage structure, a movable member, a first pulley assembly, and a second pulley assembly. The first pulley assembly includes a first pulley support and a first toothed pulley. The first pulley support is pivotally coupled to the movable member about a first pivot axis. The first toothed pulley is rotatably coupled to the first pulley support about a first pulley axis spaced apart from the first pivot axis. The second pulley assembly includes a second pulley support, a second toothed pulley, and a third toothed pulley. The second pulley support is pivotally coupled to the movable member about a second pivot axis. The second toothed pulley is rotatably coupled to the second pulley support about a second pulley axis. The third toothed pulley is rotatably coupled to the second pulley support about a third pulley axis.

18 Claims, 34 Drawing Sheets

(56) References Cited

U.S. PATENT DOCUMENTS

| | | | |
|---|---|---|---|
| 8,012,052 B2* | 9/2011 | Shahana | B62M 9/1242 |
| | | | 474/82 |
| 9,227,696 B2* | 1/2016 | Yamaguchi | B62M 9/126 |
| 11,401,006 B2* | 8/2022 | Braedt | B62M 9/126 |
| 2008/0064545 A1* | 3/2008 | Yamaguchi | B62M 9/126 |
| | | | 474/82 |
| 2008/0081716 A1* | 4/2008 | Watarai | B62M 9/125 |
| | | | 474/80 |
| 2008/0125259 A1* | 5/2008 | Kunisawa | B62M 9/126 |
| | | | 474/82 |
| 2008/0194363 A1* | 8/2008 | Kunisawa | B62M 9/126 |
| | | | 474/82 |
| 2009/0062045 A1* | 3/2009 | Kunisawa | B62M 9/16 |
| | | | 474/82 |
| 2009/0247334 A1* | 10/2009 | Takachi | B62M 9/126 |
| | | | 474/82 |
| 2009/0258738 A1* | 10/2009 | Hara | B62M 9/16 |
| | | | 474/122 |
| 2010/0113200 A1* | 5/2010 | Yamamoto | B62M 9/16 |
| | | | 474/133 |
| 2012/0083372 A1 | 4/2012 | Yamaguchi et al. | |
| 2014/0128191 A1* | 5/2014 | Bohm | B66C 23/202 |
| | | | 474/82 |
| 2017/0066501 A1* | 3/2017 | Hilgenberg | B62M 9/122 |
| 2017/0197685 A1* | 7/2017 | Braedt | B62M 9/122 |
| 2018/0186429 A1* | 7/2018 | Nakamura | B62M 9/1242 |
| 2018/0194433 A1* | 7/2018 | Dos Santos | B62M 9/00 |
| 2018/0274623 A1 | 9/2018 | Brown et al. | |
| 2019/0061877 A1* | 2/2019 | Suyama | B62M 9/126 |
| 2020/0189688 A1* | 6/2020 | Rodgers | F16C 1/16 |
| 2021/0070396 A1* | 3/2021 | Garcia | B62M 9/125 |
| 2022/0144381 A1* | 5/2022 | Rodriguez | B62M 11/04 |

* cited by examiner

BICYCLE REAR DERAILLEUR

BACKGROUND OF THE INVENTION

Field of the Invention

The present invention relates to a bicycle rear derailleur.

Discussion of the Background

A bicycle includes a rear derailleur configured to move a chain relative to a plurality of sprockets. The rear derailleur includes a base, a linkage, a movable part, a guide pulley, a tension pulley, and a chain guide. The movable part is movably coupled to the base via the linkage. The chain guide is pivotally coupled to the movable part. The guide pulley is rotatably coupled to the chain guide. The tension pulley is rotatably coupled to the chain guide. Especially, while a bicycle travels on uneven terrain, it is possible for the chain guide of the rear derailleur to hit rocks, ground and so on. Therefore, it is preferable to increase a distance between the chin guide of the rear derailleur and a road surface in a perpendicular direction which is perpendicular to the road surface in order to avoid undesirable collision between the chain guide of the rear derailleur and rocks and ground. For example, such a bicycle rear derailleur is known in U.S. Pat. No. 6,793,598. However, with such a derailleur disclosed in the prior art, it could be difficult to appropriately retain a long bicycle chain which is used with a multiple rear sprocket assembly having a relatively wide gear range. Based on such a prior art, it is the objective of the present invention to provide a rear derailleur in which a chain guide can be spaced apart from ground to reduce collision between rear derailleur and ground in a mounting state the rear derailleur is mounted to a frame of a bicycle. It is also the objective of the present invention to provide a rear derailleur which can be applied to a rear sprocket assembly having a wide gear range and can appropriately retain a long bicycle chain used with the rear sprocket assembly having such a wide gear range. The bicycle rear derailleur according to the present invention are usable for electrically assisted bicycles in which not only human torque but also motor torque are applied to bicycle sprockets.

SUMMARY OF THE INVENTION

In accordance with a first aspect of the present invention, a bicycle rear derailleur comprises a base member, a linkage structure, a movable member, a first pulley assembly, and a second pulley assembly. The base member is configured to be mounted to a bicycle frame. The linkage structure is pivotally coupled to the base member. The movable member is pivotally coupled to the linkage structure such that the movable member is movable relative to the base member. The first pulley assembly includes a first pulley support and a first toothed pulley. The first pulley support is pivotally coupled to the movable member about a first pivot axis. The first toothed pulley is configured to engage with a bicycle chain and is rotatably coupled to the first pulley support about a first pulley axis spaced apart from the first pivot axis. The second pulley assembly includes a second pulley support, a second toothed pulley, and a third toothed pulley. The second pulley support is pivotally coupled to the movable member about a second pivot axis spaced apart from the first pivot axis. The second toothed pulley is configured to engage with the bicycle chain and is rotatably coupled to the second pulley support about a second pulley axis spaced apart from the second pivot axis. The third toothed pulley is configured to engage with the bicycle chain and is rotatably coupled to the second pulley support about a third pulley axis spaced apart from the second pivot axis and the second pulley axis.

With the bicycle rear derailleur according to the first aspect, the first pulley assembly and the second pulley assembly can effectively retain a longer bicycle chain. Thus, it is possible to increase a distance between the bicycle rear derailleur and a road surface in a perpendicular direction which is perpendicular to the road surface and/or to apply the bicycle rear derailleur to a rear sprocket assembly having a wider gear range.

In accordance with a second aspect of the present invention, the bicycle rear derailleur according to the first aspect is configured so that the first pivot axis is disposed closer to the linkage structure than the second pivot axis.

With the bicycle rear derailleur according to the second aspect, the first pulley assembly and the second pulley assembly can reliably retain a longer bicycle chain. Thus, it is possible to reliably increase the distance between the bicycle rear derailleur and the road surface in the perpendicular direction and/or to reliably apply the bicycle rear derailleur to the rear sprocket assembly having the wider gear range.

In accordance with a third aspect of the present invention, the bicycle rear derailleur according to the first or second aspect is configured so that the second pivot axis is disposed between the second pulley axis and the third pulley axis.

With the bicycle rear derailleur according to the third aspect, it is possible to more reliably increase the distance between the bicycle rear derailleur and the road surface in the perpendicular direction and/or to more reliably apply the bicycle rear derailleur to the rear sprocket assembly having the wider gear range.

In accordance with a fourth aspect of the present invention, the bicycle rear derailleur according to any one of the first to third aspects further comprises a first cable pulley, a second cable pulley, and an interlocking cable. The first cable pulley is fixedly coupled to the first pulley support and rotatably coupled to the movable member about the first pivot axis. The second cable pulley is fixedly coupled to the second pulley support and is rotatably coupled to the movable member about the second pivot axis. The interlocking cable is coupled to the first cable pulley and the second cable pulley so as to interlock the first pulley support and the second pulley support.

With the bicycle rear derailleur according to the fourth aspect, it is possible to move the first pulley support and the second pulley support together. Thus, it is possible to reliably shift the bicycle chain relative to the rear sprocket assembly using the bicycle rear derailleur.

In accordance with a fifth aspect of the present invention, the bicycle rear derailleur according to the fourth aspect further comprises a biasing member disposed about the first pivot axis. The biasing member has a first end coupled to the movable member and a second end coupled to at least one of the first cable pulley and the first pulley support.

With the bicycle rear derailleur according to the fifth aspect, it is possible to reliably apply tension to the bicycle chain.

In accordance with a sixth aspect of the present invention, the bicycle rear derailleur according to the fifth aspect is configured so that the movable member and the second pulley support are free of another biasing member about the second pivot axis.

With the bicycle rear derailleur according to the sixth aspect, it is possible to reduce a total number of parts in the bicycle rear derailleur. Thus, it is possible to save weight of the bicycle rear derailleur.

In accordance with a seventh aspect of the present invention, the bicycle rear derailleur according to any one of the first to sixth aspects further comprises a rotational shaft and a damping structure. The rotational shaft is secured to one of the first pulley support and the second pulley support and is rotatably coupled to the movable member about corresponding one of the first pivot axis and the second pivot axis. The damping structure is disposed on the movable member about the rotational shaft. The damping structure is configured to provide rotational resistance in one rotational direction of the one of the first pulley support and the second pulley support.

With the bicycle rear derailleur according to the seventh aspect, it is possible to reduce vibration of the bicycle chain, restricting the bicycle rear derailleur from incorrectly or unintentionally changing gears in the rear sprocket assembly.

In accordance with an eighth aspect of the present invention, the bicycle rear derailleur according to the seventh aspect is configured so that the damping structure includes a one-way clutch disposed between the movable member and the rotational shaft.

With the bicycle rear derailleur according to the eighth aspect, it is possible to reliably provide the rotational resistance of the damping structure.

In accordance with a ninth aspect of the present invention, the bicycle rear derailleur according to the seventh or eighth aspect is configured so that the damping structure includes a resistance applying member operatively arranged between the movable member and the rotational shaft and a resistance adjusting member configured to contact the resistance applying member. The resistance adjusting member is movably mounted on the movable member between at least a first position and a second position so that first rotational resistance with the resistance adjusting member in the first position is different from second rotational resistance with the resistance adjusting member in the second position.

With the bicycle rear derailleur according to the ninth aspect, it is possible to change the rotational resistance provided by the damping structure using the resistance adjusting member. Thus, for example, it is possible to shift the bicycle chain relative to the rear sprocket assembly with a lighter operating force under a situation where it is harder to incorrectly or unintentionally shift the bicycle chain relative to the rear sprocket assembly due to vibration of the bicycle chain.

In accordance with a tenth aspect of the present invention, the bicycle rear derailleur according to any one of the seventh to ninth aspects is configured so that the damping structure is configured to provide frictional resistance in the one rotational direction of the one of the first pulley support and the second pulley support.

With the bicycle rear derailleur according to the tenth aspect, it is possible to simplify the damping structure.

In accordance with an eleventh aspect of the present invention, the bicycle rear derailleur according to any one of the seventh to tenth aspects is configured so that the damping structure is configured to provide hydraulic resistance in the one rotational direction of the one of the first pulley support and the second pulley support.

With the bicycle rear derailleur according to the eleventh aspect, it is possible to recognize the damping structure in a case where it is harder to utilize frictional resistance.

In accordance with a twelfth aspect of the present invention, the bicycle rear derailleur according to any one of the first to eleventh aspects is configured so that an inclination angle is defined between a reference axis line and a hub axle line as viewed along the first pivot axis in a mounting state where the bicycle rear derailleur is mounted to the bicycle frame. The reference axis line passes through the first pivot axis and the second pivot axis as viewed along the first pivot axis. The hub axle line passes through a center axis of a front hub axle and a center axis of a rear hub axle as viewed along the first pivot axis. The inclination angle ranges from 0 degree to 25 degrees.

With the bicycle rear derailleur according to the twelfth aspect, it is possible to reliably increase the distance between the bicycle rear derailleur and the road surface in the perpendicular direction.

In accordance with a thirteenth aspect of the present invention, a bicycle rear derailleur comprises a base member, a linkage structure, a movable member, a first pulley assembly, and a second pulley assembly. The base member is configured to be mounted to a bicycle frame. The linkage structure is pivotally coupled to the base member. The movable member is pivotally coupled to the linkage structure such that the movable member is movable relative to the base member. The first pulley assembly is pivotally or rotatably coupled to the movable member about a first pivot axis. The second pulley assembly is pivotally or rotatably coupled to the movable member about a second pivot axis spaced apart from the first pivot axis. An inclination angle is defined between a reference axis line and a hub axle line as viewed along the first pivot axis in a mounting state where the bicycle rear derailleur is mounted to the bicycle frame. The reference axis line passes through the first pivot axis and the second pivot axis as viewed along the first pivot axis. The hub axle line passes through a center axis of a front hub axle and a center axis of a rear hub axle as viewed along the first pivot axis. The inclination angle ranges from 0 degree to 25 degrees.

With the bicycle rear derailleur according to the thirteenth aspect, it is possible to increase a distance between the bicycle rear derailleur and a road surface in a perpendicular direction which is perpendicular to the road surface.

In accordance with a fourteenth aspect of the present invention, a bicycle rear derailleur comprises a base member, a linkage structure, a movable member, a first pulley assembly, and a second pulley assembly. The base member is configured to be mounted to a bicycle frame at a base mounting axis. The linkage structure is pivotally coupled to the base member. The movable member is pivotally coupled to the linkage structure such that the movable member is movable relative to the base member. The first pulley assembly includes a first pulley support and a first toothed pulley. The first pulley support is pivotally coupled to the movable member about a first pivot axis. The first toothed pulley is configured to engage with a bicycle chain and is rotatably coupled to the first pulley support about a first pulley axis spaced apart from the first pivot axis. The second pulley assembly includes a second pulley support and a second toothed pulley. The second pulley support is pivotally coupled to the movable member about a second pivot axis spaced apart from the first pivot axis. The second toothed pulley is configured to engage with the bicycle chain and is rotatably coupled to the second pulley support about a second pulley axis spaced apart from the second pivot axis. An arrangement angle is defined between an arrangement line and a reference axis line as viewed along the first pivot axis. The arrangement line passes through the base mounting axis and the first pivot axis as viewed along the first pivot axis. The reference axis line passes through the first pivot axis and the second pivot axis as viewed along the first pivot axis. The arrangement angle ranges from 100 degrees to 150 degrees.

With the bicycle rear derailleur according to the fourteenth aspect, it is possible to increase a distance between the bicycle rear derailleur and a road surface in a perpendicular direction which is perpendicular to the road surface.

In accordance with a fifteenth aspect of the present invention, the bicycle rear derailleur according to the fourteenth aspect is configured so that the second pulley assembly includes a third toothed pulley. The third toothed pulley is configured to engage with the bicycle chain and is rotatably coupled to the second pulley support about a third pulley axis spaced apart from the second pivot axis and the second pulley axis.

With the bicycle rear derailleur according to the fifteenth aspect, it is possible to reliably increase the distance between the bicycle rear derailleur and the road surface in the perpendicular direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
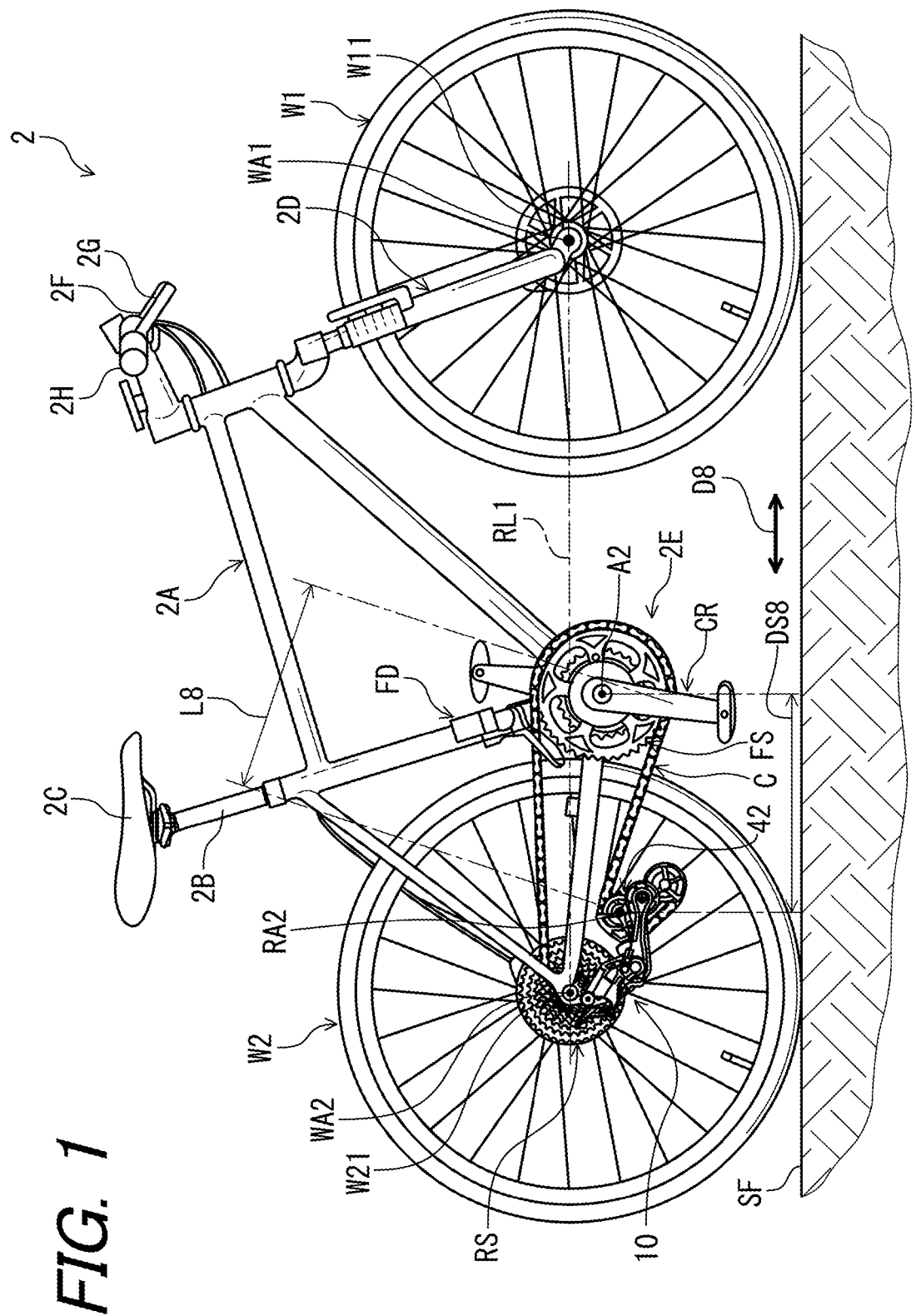
FIG. 1 is a side elevational view of a bicycle including a bicycle rear derailleur in accordance with an embodiment.

The embodiment(s) will now be described with reference to the accompanying drawings, wherein like reference numerals designate corresponding or identical elements throughout the various drawings.

As seen in FIG. 1, a bicycle 2 includes a bicycle rear derailleur 10 in accordance with an embodiment. While the bicycle 2 is illustrated as a mountain bike, the bicycle rear derailleur 10 can be applied to a road bike, a city bike, a tricycle, a cargo bike, a recumbent bike, an electric bike (E-bike), or any type of bicycles.

The bicycle 2 further includes a bicycle frame 2A, a seatpost 2B, a saddle 2C, a front fork 2D, a drive train 2E, an operating device 2F, an operating device 2G, a handlebar 2H, a front wheel W1, and a rear wheel W2. The front fork 2D is pivotally mounted to the bicycle frame 2A. The handlebar 2H is secured to the front fork 2D. The front wheel W1 is rotatably coupled to the front fork 2D. The rear wheel W2 is rotatably coupled to the bicycle frame 2A. The front wheel W1 includes a front hub axle W11 having a center axis WA1. The front hub axle W11 is coupled to the front fork 2D. The rear wheel W2 includes a rear hub axle W21 having a center axis WA2. The rear hub axle W21 is coupled to the bicycle frame 2A. The front hub axle W11 is configured to rotatably support the front wheel W1 relative to the front fork 2D about the center axis WA1 of the front hub axle W11. The rear hub axle W21 is configured to rotatably support the rear wheel W2 relative to the bicycle frame 2A about the center axis WA2 of the rear hub axle W21.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2C or a seat) in the bicycle 2 with facing the handlebar 2H. Accordingly, these terms, as utilized to describe the bicycle rear derailleur 10 or other components, should be interpreted relative to the bicycle 2 equipped with the bicycle rear derailleur 10 as used in an upright riding position on a horizontal surface.

The drive train 2E includes the bicycle rear derailleur 10, a front derailleur FD, a crank CR, a front sprocket assembly FS, a rear sprocket assembly RS, and a bicycle chain C. The front sprocket assembly FS is coupled to the crank CR to rotate relative to the bicycle frame 2A along with the crank CR. The front sprocket assembly FS includes a plurality of front sprockets. The rear sprocket assembly RS is rotatable relative to the bicycle frame 2A about the center axis WA2 of the rear hub axle W21. The rear sprocket assembly RS includes a plurality of rear sprockets. The bicycle chain C is engaged with the front sprocket assembly FS and the rear sprocket assembly RS.

The bicycle rear derailleur 10 is mounted to the bicycle frame 2A and is configured to shift the bicycle chain C relative to the rear sprocket assembly RS to change a gear position in response to an operation of the operating device 2F. The front derailleur FD is mounted to the bicycle frame 2A and is configured to shift the bicycle chain C relative to the front sprocket assembly FS to change a gear position in response to an operation of the operating device 2G. However, the front derailleur FD can be omitted from the drive train 2E if needed and/or desired. In such an embodiment, the front sprocket assembly FS includes only a single sprocket.

Figure 2:
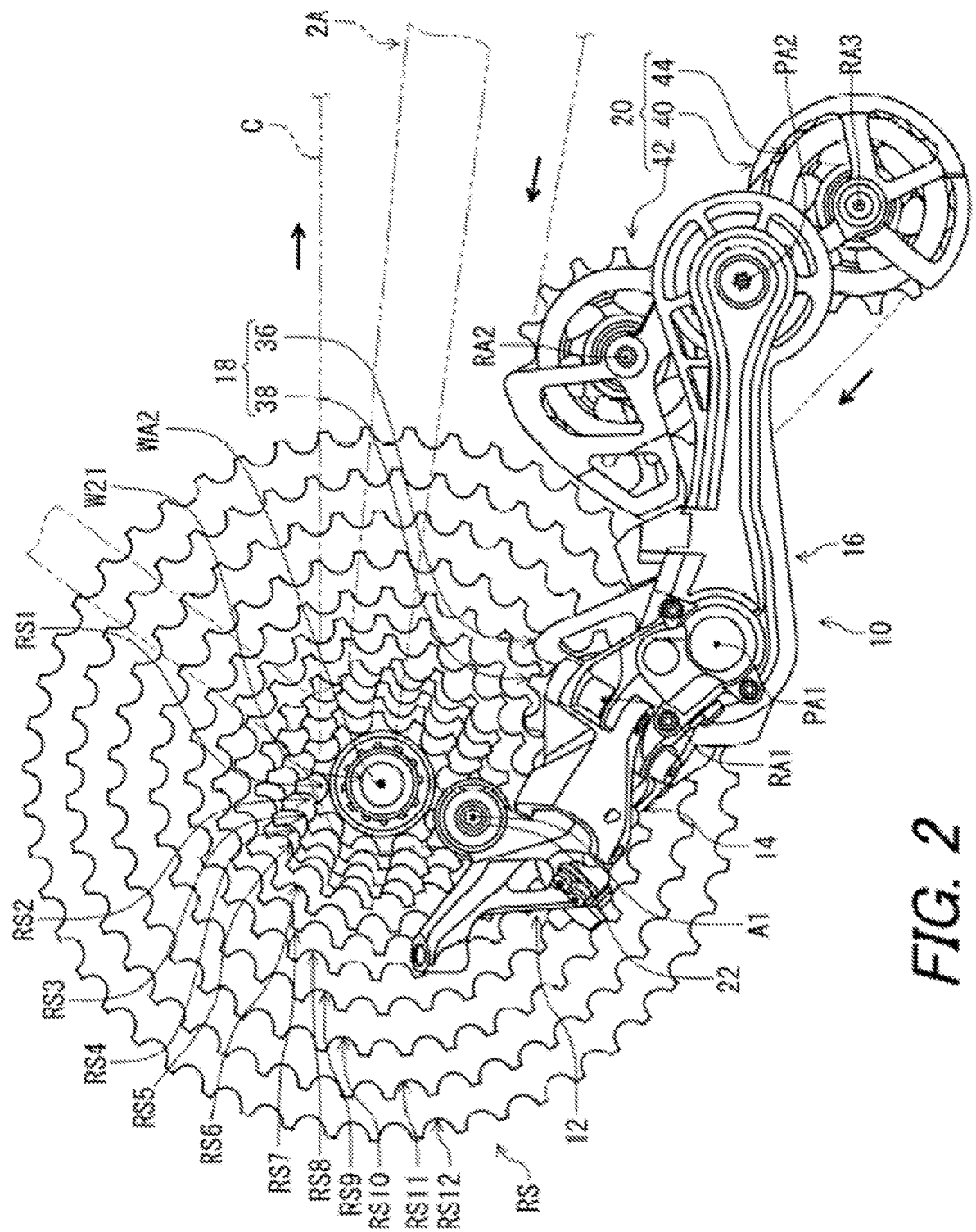
FIG. 2 is a partial side elevational view of the bicycle illustrated in FIG. 1.

As seen in FIG. 2, the rear sprocket assembly RS includes a plurality of rear sprockets RS1 to RS12. The rear sprocket RS1 has an outer diameter which is the smallest in the plurality of rear sprockets RS1 to RS12. The rear sprocket RS12 has an outer diameter which is the largest in the plurality of rear sprockets RS1 to RS12. Thus, the rear sprocket RS1 corresponds to a top gear of the rear sprocket assembly RS. The rear sprocket RS12 corresponds to a low gear of the rear sprocket assembly RS. A total number of the rear sprockets of the rear sprocket assembly RS is not limited to the above number. The structure of the rear sprocket assembly RS is not limited to the above structure.

The bicycle rear derailleur 10 comprises a base member 12, a linkage structure 14, a movable member 16, a first pulley assembly 18, and a second pulley assembly 20. The base member 12 is configured to be mounted to the bicycle frame 2A. The base member 12 is configured to be mounted to the bicycle frame 2A at a base mounting axis A1. In the present embodiment, the bicycle rear derailleur 10 comprises a mounting member 22. The base member 12 is configured to be secured to the bicycle frame 2A with the mounting member 22. The mounting member 22 has the base mounting axis A1 as a center axis. The base mounting axis A1 is spaced apart from the center axis WA2 of the rear hub axle W21 of the rear wheel W2. The base member 12 can be directly secured to the bicycle frame 2A about the center axis WA2 of the rear hub axle W21 of the rear wheel W2.

Figure 3:
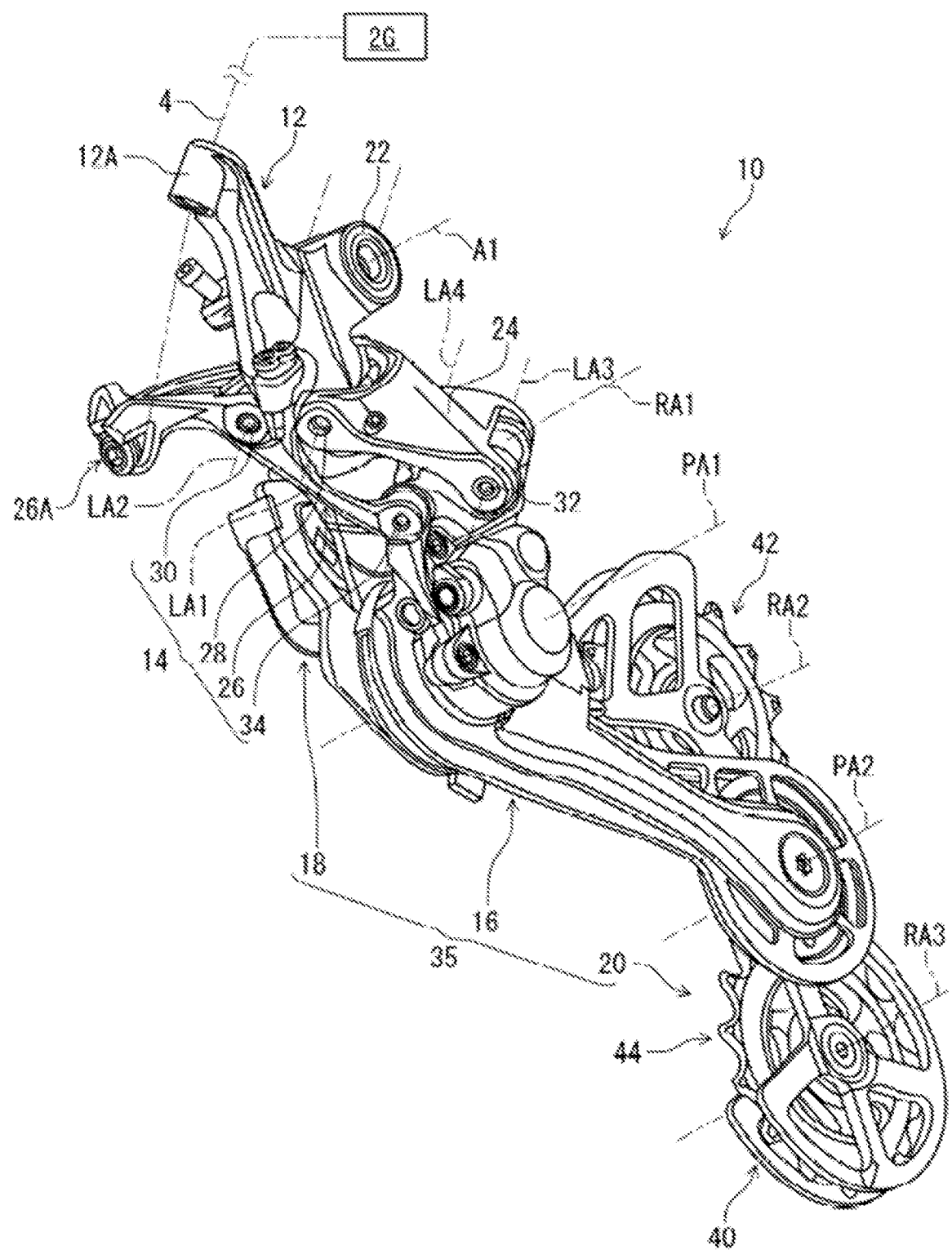
FIG. 3 is a perspective view of the bicycle rear derailleur illustrated in FIG. 1.

As seen in FIG. 3, the linkage structure 14 is pivotally coupled to the base member 12. The linkage structure 14 includes a first link 24, a second link 26, a first link pin 28, a second link pin 30, a third link pin 32, and a fourth link pin 34. The first link 24 is pivotally coupled to the base member 12 with the first link pin 28. The first link 24 is pivotable relative to the base member 12 about a first link axis LA1. The second link 26 is pivotally coupled to the base member 12 with the second link pin 30. The second link 26 is pivotable relative to the base member 12 about a second link axis LA2. The first link 24 is pivotally coupled to the movable member 16 with the third link pin 32. The first link 24 is pivotable relative to the movable member 16 about a third link axis LA3. The second link 26 is pivotally coupled to the movable member 16 with the fourth link pin 34. The second link 26 is pivotable relative to the movable member 16 about a fourth link axis LA4.

The second link 26 is configured to be coupled to the operating device 2G with a control cable 4. Examples of the control cable 4 include a Bowden cable. For example, the control cable 4 includes an outer tube and an inner wire movably provided in the outer tube. The base member 12 includes a cable support 12A. The cable support 12A is configured to support the outer tube of the control cable 4. The second link 26 includes a cable attachment part 26A to which an end of the inner wire of the control cable 4 is to be coupled. For example, the cable attachment part 26A includes an attachment screw.

Figure 4:
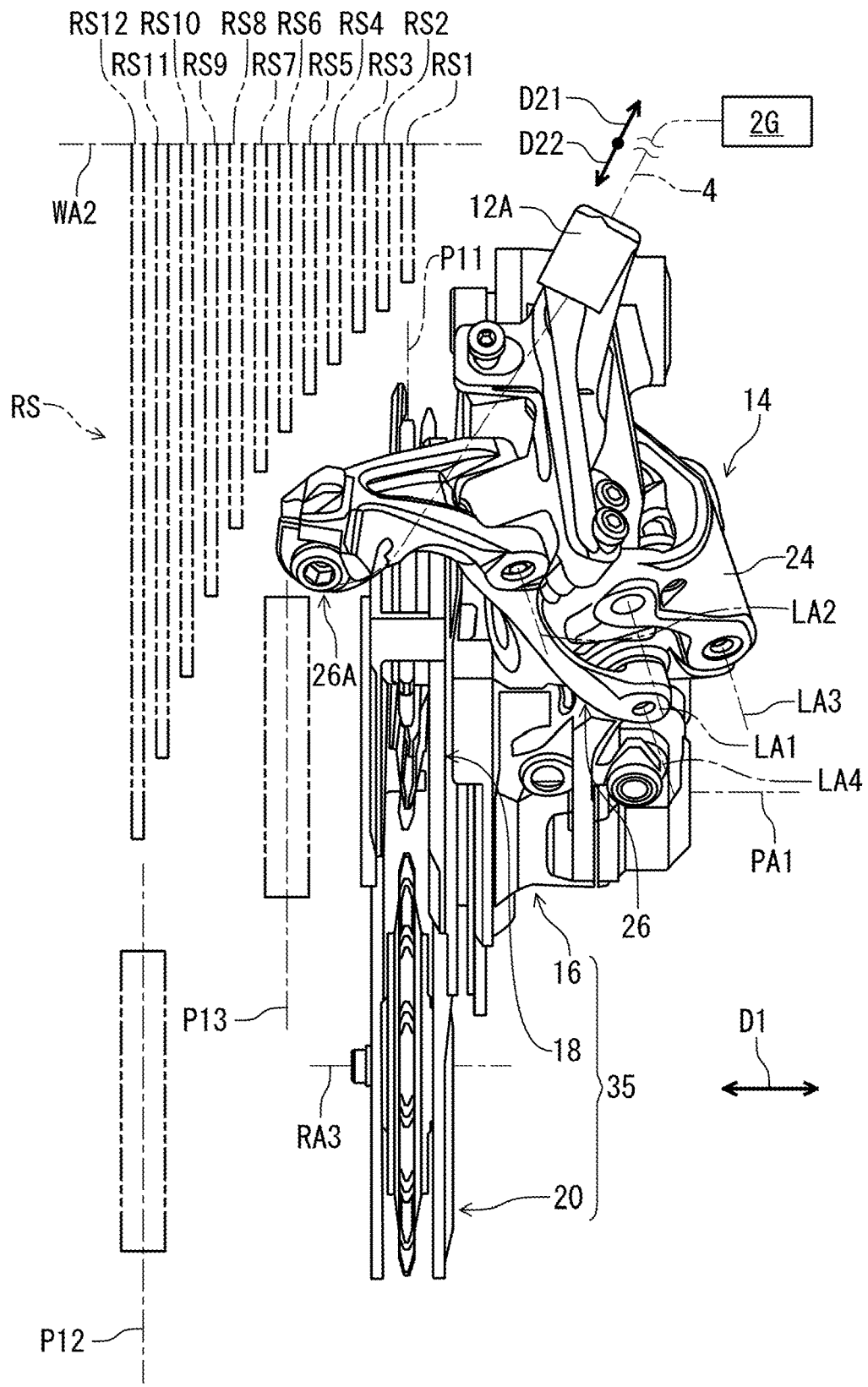
FIG. 4 is a rear view of the bicycle rear derailleur illustrated in FIG. 1.

As seen in FIG. 4, the movable member 16 is pivotally coupled to the linkage structure 14 such that the movable member 16 is movable relative to the base member 12. Therefore, the movable member 16 is pivotally coupled to the linkage structure 14 such that the movable member 16 is movable relative to the bicycle frame 12. The movable member 16 is pivotally coupled to the linkage structure 14 such that the movable member 16 is movable toward and away from the bicycle frame 2A. The movable member 16, the first pulley assembly 18, and the second pulley assembly 20 are movable relative to the base member 12 between a first axial position P11 and a second axial position P12 along an axial direction D1 of the center axis WA2 in response to the operation of the operating device 2F. Thus, the movable member 16, the first pulley assembly 18, and the second pulley assembly 20 constitute a movable assembly 35. In FIG. 4, the first axial position P11 and the second axial position P12 are indicated based on the first pulley assembly 18.

In the present embodiment, the movable assembly 35 is in the first axial position P11 in a state where the bicycle chain C is engaged with the rear sprocket RS1. The movable assembly 35 is in the second axial position P12 in a state where the bicycle chain C is engaged with the rear sprocket RS12. The movable assembly 35 is in the intermediate axial position P13 in a state where the bicycle chain C is engaged with the rear sprocket RS6. Thus, the first axial position P11 corresponds to the top gear of the rear sprocket assembly RS. The second axial position P12 corresponds to the low gear of the rear sprocket assembly RS.

When the inner wire of the control cable 4 is pulled in a first operating direction D21 by the operating device 2G, the movable assembly 35 is moved relative to the base member 12 toward the second axial position P12. When the inner wire of the control cable 4 is released in a second operating direction D22 by the operating device 2G, the movable assembly 35 is moved relative to the base member 12 toward the first axial position P11. The second operating direction D22 is an opposite direction of the first operating direction D21.

The operating device 2F is configured to hold the inner wire of the control cable 4 in a plurality of positions respectively corresponding to the plurality of axial positions of the movable assembly 35. The plurality of axial positions of the movable assembly 35 respectively corresponds to the plurality of rear sprockets RS1 to RS12. Thus, the movable assembly 35 is configured to be positioned in each axial position of the plurality of axial positions respectively corresponding to the plurality of rear sprockets RS1 to RS12. The plurality of axial positions includes the first axial position P11, the second axial position P12, and at least one intermediate axial position (e.g., the intermediate axial position P13) provided between the first axial position P11 and the second axial position P12. A total number of the plurality of axial positions of the movable assembly 35 is not limited to the above number.

Figure 5:
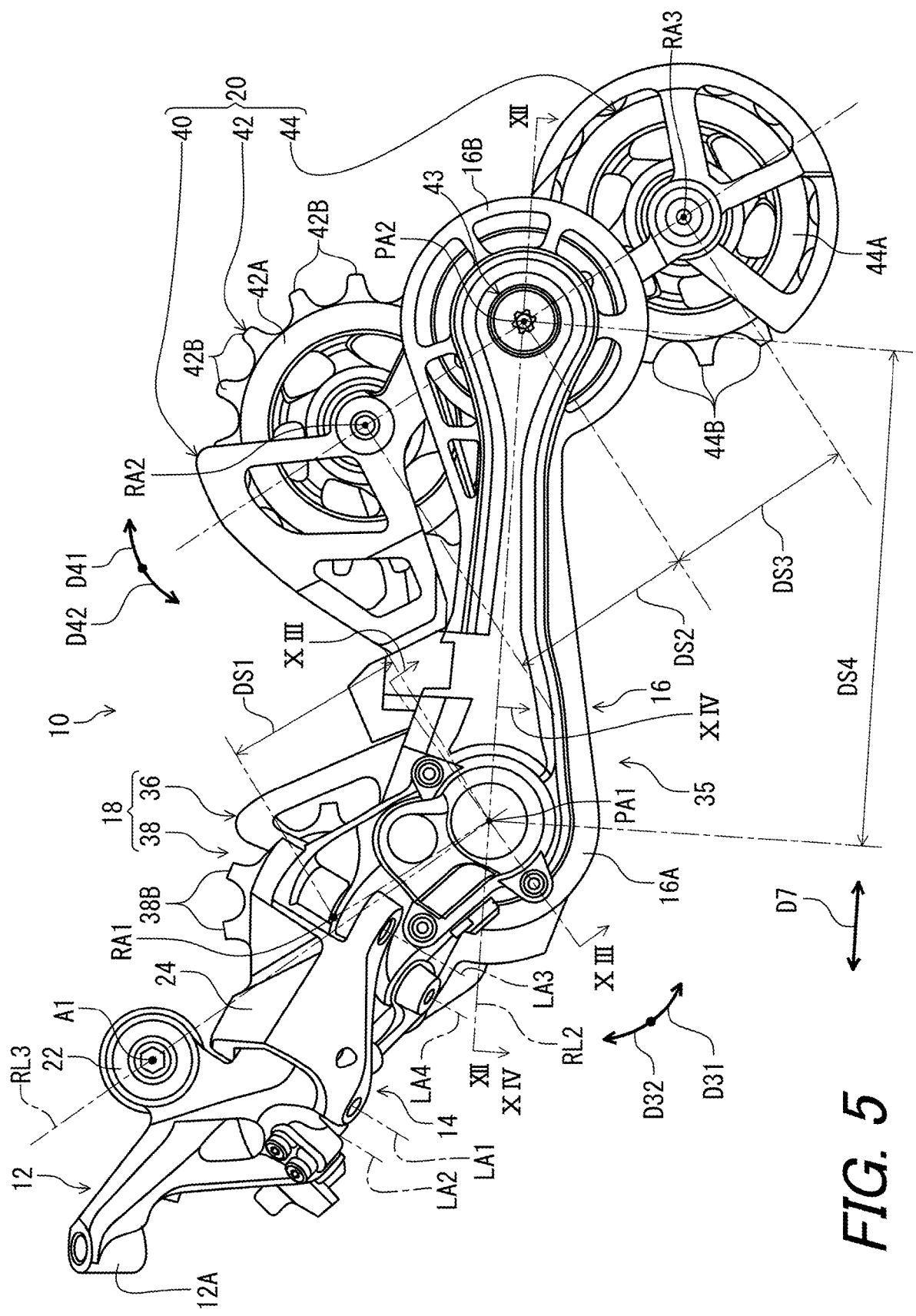
FIG. 5 is a side elevational view of the bicycle rear derailleur illustrated in FIG. 1 (top-gear state).
Figure 6:
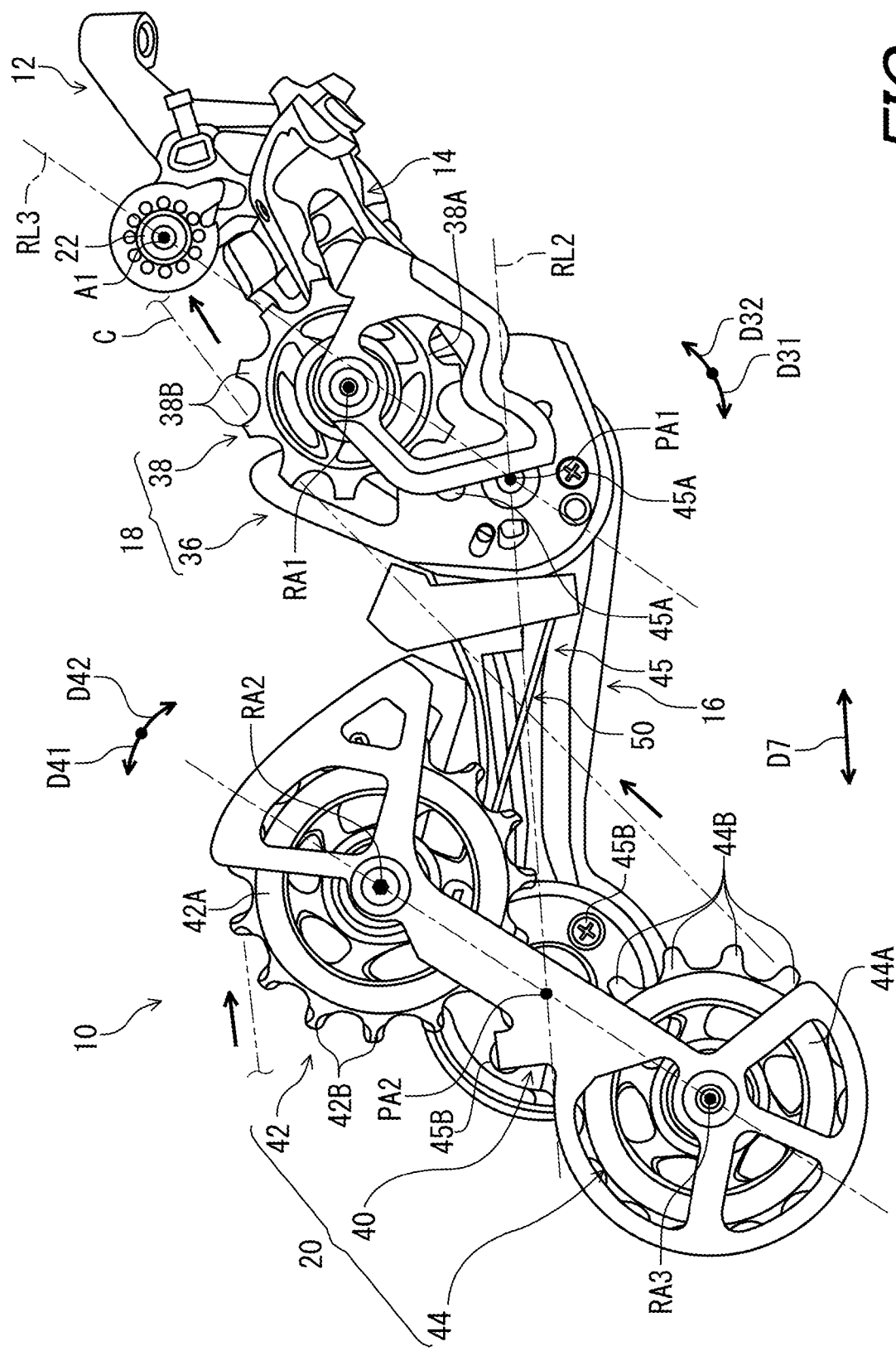
FIG. 6 is another side elevational view of the bicycle rear derailleur illustrated in FIG. 1 (top-gear state).

As seen in FIGS. 5 and 6, the first pulley assembly 18 is pivotally or rotatably coupled to the movable member 16 about a first pivot axis PA1. In the present embodiment, the first pulley assembly 18 includes a first pulley support 36 and a first toothed pulley 38. The first pulley support 36 is pivotally coupled to the movable member 16 about the first pivot axis PA1. The first toothed pulley 38 is configured to engage with the bicycle chain C and is rotatably coupled to the first pulley support 36 about a first pulley axis RA1 spaced apart from the first pivot axis PA1. However, the first pulley support 36 can be omitted from the first pulley assembly 18 if needed and/or desired. In such an embodiment, the first toothed pulley 38 is rotatably coupled to the movable member 16 about the first pivot axis PA1.

As seen in FIG. 6, the second pulley assembly 20 is pivotally or rotatably coupled to the movable member 16 about a second pivot axis PA2 spaced apart from the first pivot axis PA1. In the present embodiment, the second pulley assembly 20 includes a second pulley support 40 and a second toothed pulley 42. The second pulley support 40 is pivotally coupled to the movable member 16 about the second pivot axis PA2 spaced apart from the first pivot axis PA1. The second toothed pulley 42 is configured to engage with the bicycle chain C and is rotatably coupled to the second pulley support 40 about a second pulley axis RA2 spaced apart from the second pivot axis PA2. However, the second pulley support 40 can be omitted from the second pulley assembly 20 if needed and/or desired. In such an embodiment, the second toothed pulley 42 is rotatably coupled to the movable member 16 about the second pulley axis RA2.

As seen in FIG. 5, the bicycle rear derailleur 10 comprises a pivot coupling structure 43. The pivot coupling structure 43 is configured to pivotally couple the second pulley assembly 20 to the movable member 16 about the second pivot axis PA2. The pivot coupling structure 43 is configured to pivotally couple the second pulley support 40 to the movable member 16 about the second pivot axis PA2.

As seen in FIG. 6, the second pulley assembly 20 includes a third toothed pulley 44. The third toothed pulley 44 is configured to engage with the bicycle chain C and is rotatably coupled to the second pulley support 40 about a third pulley axis RA3 spaced apart from the second pivot axis PA2 and the second pulley axis RA2. However, the third toothed pulley 44 can be omitted form the second pulley assembly 20 if needed and/or desired.

The first toothed pulley 38 includes a first pulley body 38A and a plurality of first teeth 38B. The first pulley body 38A is rotatably coupled to the first pulley support 36 about the first pulley axis RA1. The plurality of first teeth 38B extends radially outward from the first pulley body 38A. The plurality of first teeth 38B is configured to engage with the bicycle chain C.

The second toothed pulley 42 includes a second pulley body 42A and a plurality of second teeth 42B. The second pulley body 42A is rotatably coupled to the second pulley support 40 about the second pulley axis RA2. The plurality of second teeth 42B extends radially outward from the second pulley body 42A. The plurality of second teeth 42B is configured to engage with the bicycle chain C.

The third toothed pulley 44 includes a third pulley body 44A and a plurality of third teeth 44B. The third pulley body 44A is rotatably coupled to the second pulley support 40 about the third pulley axis RA3. The plurality of third teeth 44B extends radially outward from the third pulley body 44A. The plurality of third teeth 44B is configured to engage with the bicycle chain C.

In the present embodiment, an outer diameter of the first toothed pulley 38 is different from an outer diameter of the second toothed pulley 42 and an outer diameter of the third toothed pulley 44. The outer diameter of the first toothed pulley 38 is smaller than the outer diameter of the second toothed pulley 42 and the outer diameter of the third toothed pulley 44. The outer diameter of the second toothed pulley 42 is equal to the outer diameter of the third toothed pulley 44. However, the outer diameter of the first toothed pulley 38 can be equal to or larger than at least one of the outer diameter of the second toothed pulley 42 and the outer diameter of the third toothed pulley 44. The outer diameter of the second toothed pulley 42 can be different from the outer diameter of the third toothed pulley 44.

As seen in FIG. 5, the movable member 16 extends from the first pivot axis PA1 to the second pivot axis PA2. The movable member 16 includes a first end portion 16A and a second end portion 16B. The movable member 16 extends between the first end portion 16A and the second end portion 16B in a direction D7. The first pulley assembly 18 is pivotally or rotatably coupled to the first end portion 16A. The second pulley assembly 20 is pivotally or rotatably coupled to the second end portion 16B.

In the present embodiment, as seen in FIG. 3, the base mounting axis A1, the first pivot axis PA1, the second pivot axis PA2, the first pulley axis RA1, and the third pulley axis RA3 are parallel to each other. The second pulley axis RA2 is incline relative to the base mounting axis A1, the first pivot axis PA1, the second pivot axis PA2, the first pulley axis RA1, and the third pulley axis RA3. However, the second pulley axis RA2 can be parallel to at least one of the base mounting axis A1, the first pivot axis PA1, the second pivot axis PA2, the first pulley axis RA1, and the third pulley axis RA3 if needed and/or desired. At least one of the base mounting axis A1, the first pivot axis PA1, the second pivot axis PA2, the first pulley axis RA1, and the third pulley axis RA3 can be inclined relative to another of the base mounting axis A1, the first pivot axis PA1, the second pivot axis PA2, the first pulley axis RA1, and the third pulley axis RA3 if needed and/or desired.

Figure 7:
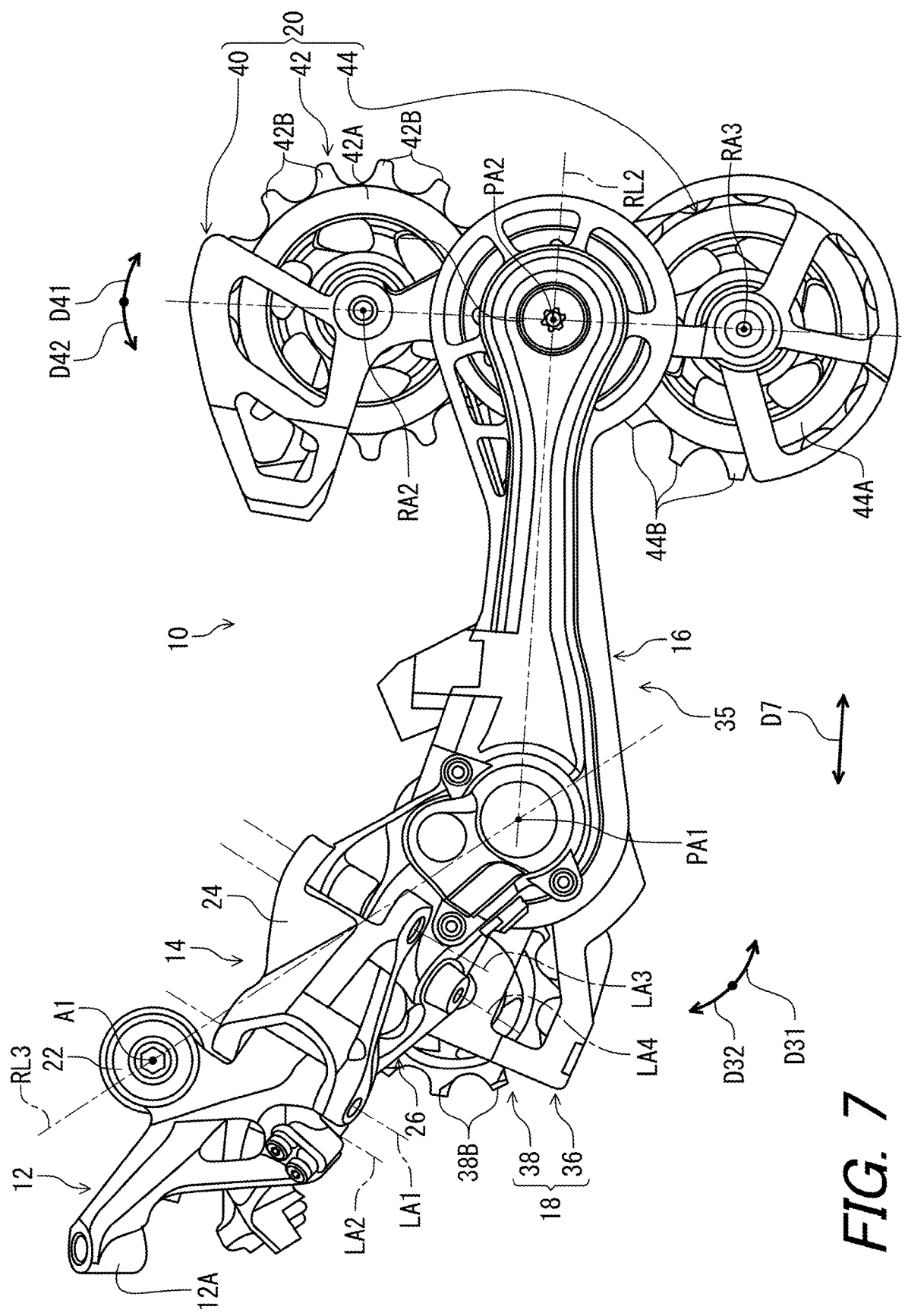
FIG. 7 is a side elevational view of the bicycle rear derailleur illustrated in FIG. 1 (middle-gear state).
Figure 8:
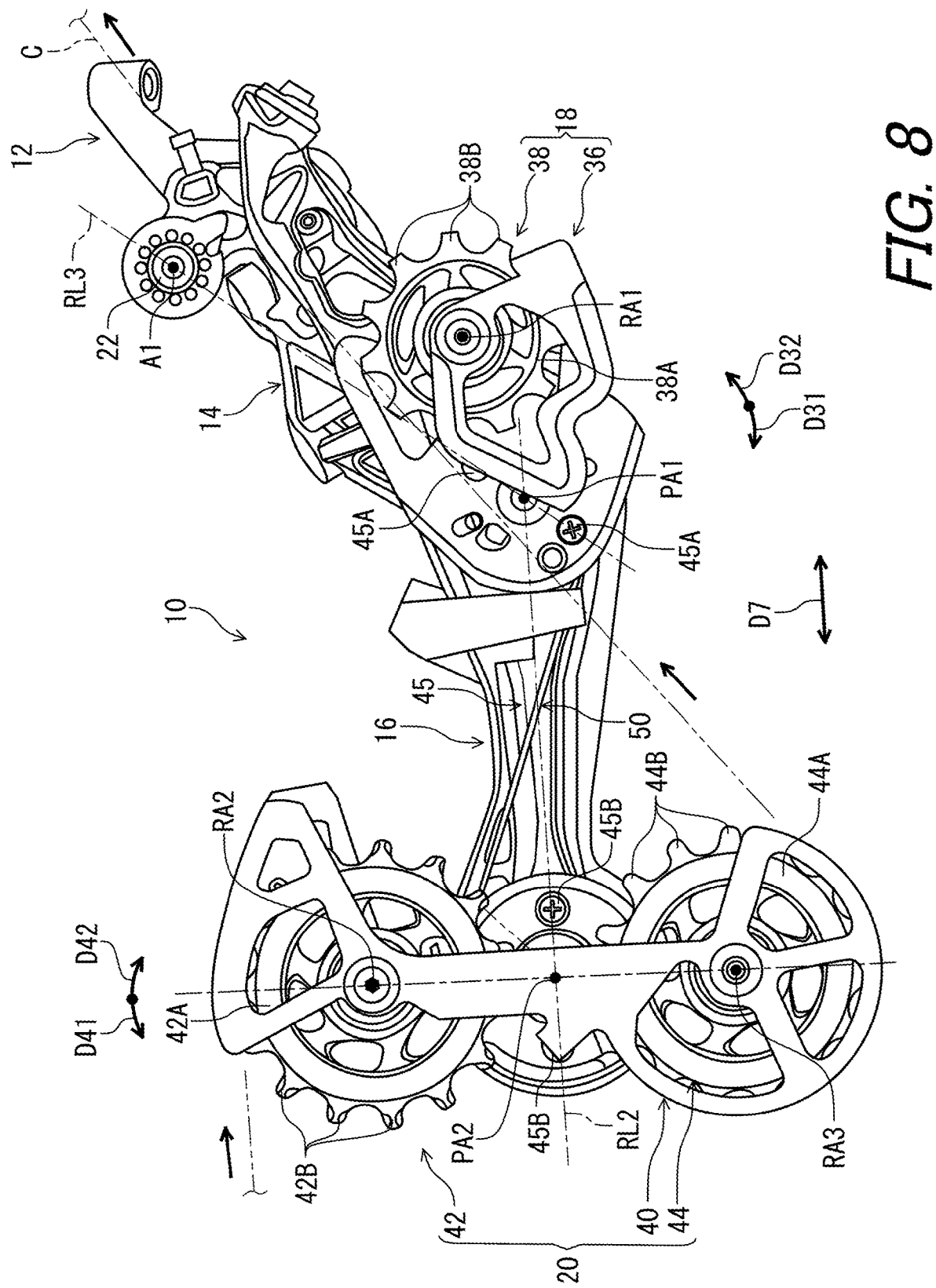
FIG. 8 is another side elevational view of the bicycle rear derailleur illustrated in FIG. 1 (middle-gear state).
Figure 9:
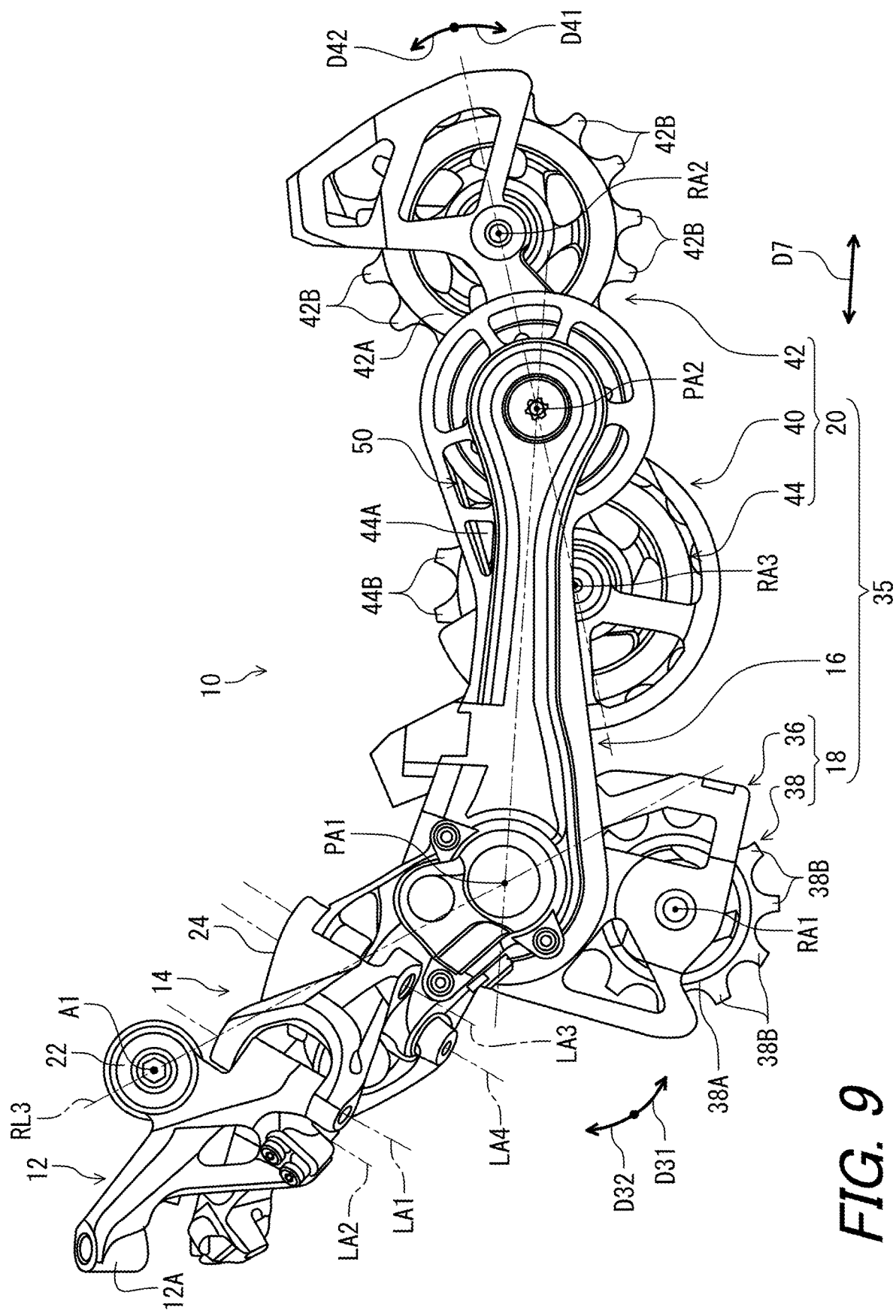
FIG. 9 is a side elevational view of the bicycle rear derailleur illustrated in FIG. 1 (low-gear state).
Figure 10:
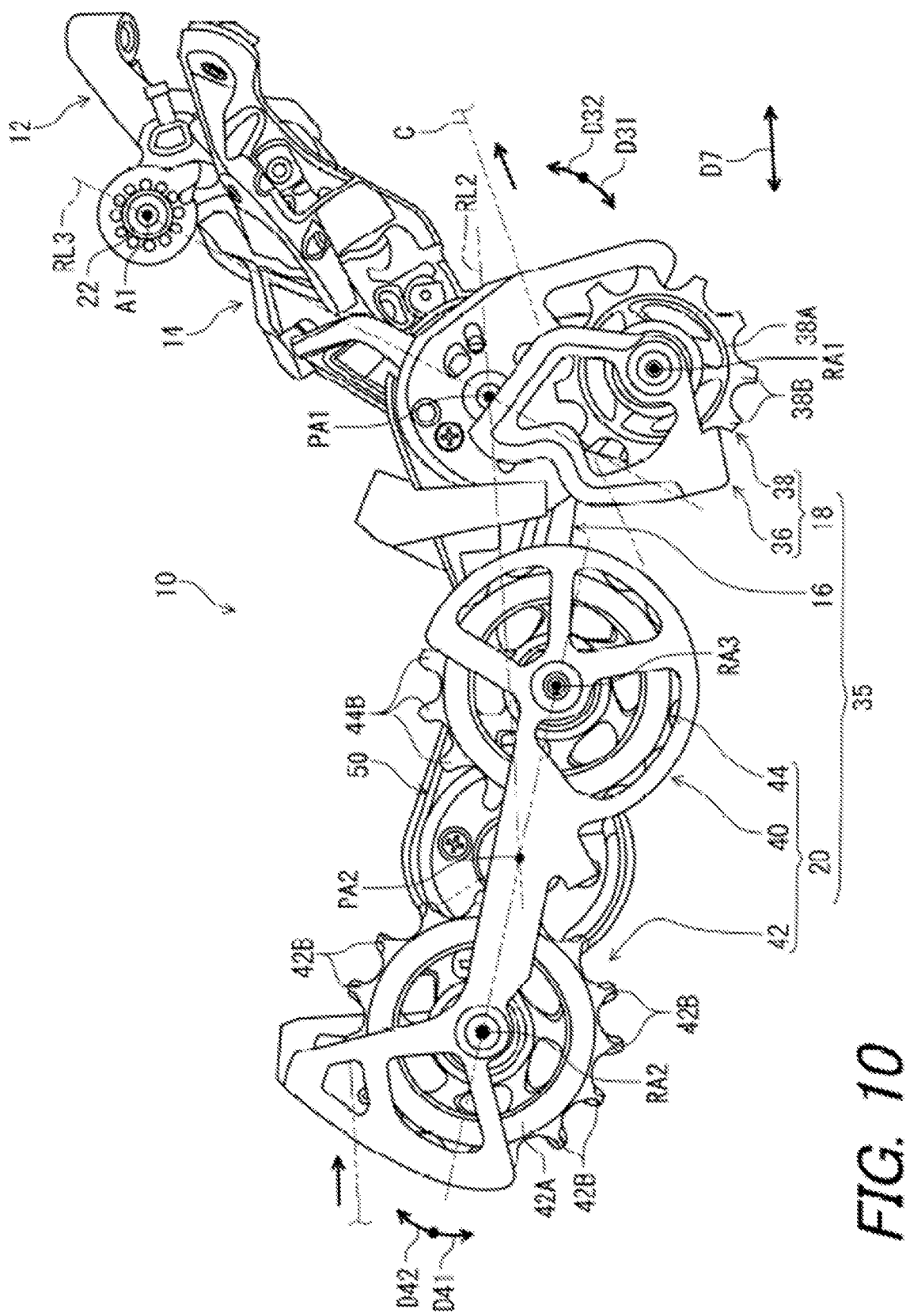
FIG. 10 is another side elevational view of the bicycle rear derailleur illustrated in FIG. 1 (low-gear state).

FIGS. 5 and 6 show a top-gear state where the movable assembly 35 is in the first axial position P11 (see e.g., FIG. 4) and the bicycle chain C is engaged with the rear sprocket RS1 (see e.g., FIG. 4). FIGS. 7 and 8 shows a middle-gear state where the movable assembly 35 is in the intermediate axial position P13 (see e.g., FIG. 4) and the bicycle chain C is engaged with the rear sprocket RS6 (see e.g., FIG. 4). FIGS. 9 and 10 shows a low-gear state where the movable assembly 35 is in the second axial position P12 (see e.g., FIG. 4) and the bicycle chain C is engaged with the rear sprocket RS12 (see e.g., FIG. 4).

As seen in FIGS. 5 to 10, the first pulley support 36 is pivoted relative to the movable member 16 about the first pivot axis PA1 in a first pivot direction D31 when the movable assembly 35 is moved from the first axial position P11 to the second axial position P12 (see e.g., FIG. 4). The first pulley support 36 is pivoted relative to the movable member 16 about the first pivot axis PA1 in a first additional pivot direction D32 when the movable assembly 35 is moved from the second axial position P12 to the first axial position P11 (see e.g., FIG. 4). The first additional pivot direction D32 is an opposite direction of the first pivot direction D31. As shown FIGS. 5, 7, and 9, when viewed from an axially outer side of the bicycle rear derailleur 10 in the axial direction D1 (see e.g., FIG. 4), the first pivot direction D31 is a counterclockwise direction defined about the first pivot axis PA1, and the first additional pivot direction D32 is a clockwise direction defined about the first pivot axis PA1.

The second pulley support 40 is pivoted relative to the movable member 16 about the first pivot axis PA1 in a second pivot direction D41 when the movable assembly 35 is moved from the first axial position P11 to the second axial position P12 (see e.g., FIG. 4). The second pulley support 40 is pivoted relative to the movable member 16 about the first pivot axis PA1 in a second additional pivot direction D42 when the movable assembly 35 is moved from the second axial position P12 to the first axial position P11 (see e.g., FIG. 4). The second additional pivot direction D42 is an opposite direction of the second pivot direction D41. In FIGS. 5, 7, and 9, when viewed from the axially outer side of the bicycle rear derailleur 10 in the axial direction D1 (see e.g., FIG. 4), the second pivot direction D41 is a clockwise direction defined about the second pivot axis PA2, and the second additional pivot direction D42 is a counterclockwise direction defined about the second pivot axis PA2.

As seen in FIGS. 5, 7, and 9, the first pivot axis PA1 is disposed closer to the linkage structure 14 than the second pivot axis PA2. The second pivot axis PA2 is disposed between the second pulley axis RA2 and the third pulley axis RA3. The first pulley axis RA1 is disposed closer to the first pivot axis PA1 than the second pivot axis PA2.

As seen in FIG. 5, a first distance DS1 is defined between the first pivot axis PA1 and the first pulley axis RA1. A second distance DS2 is defined between the second pivot axis PA2 and the second pulley axis RA2. A third distance DS3 is defined between the second pivot axis PA2 and the third pulley axis RA3. A fourth distance DS4 is defined between the first pivot axis PA1 and the second pivot axis PA2 in the direction D7. In the present embodiment, the first distance DS1 is shorter than the second distance DS2 and the third distance DS3. The second distance DS2 is equal to the third distance DS3. The fourth distance DS4 is longer than the first distance DS1, the second distance DS2, and the third distance DS3. However, the positional relationships among the linkage structure 14, the first pivot axis PA1, the second pivot axis PA2, the first pulley axis RA1, the second pulley axis RA2, and the third pulley axis RA3 is not limited to the above relationships. The relationships among the first distance DS1, the second distance DS2, the third distance DS3, and the fourth distance DS4 are not limited to the above relationships.

As seen in FIG. 6, the bicycle rear derailleur 10 further comprises a coupling structure 45. The coupling structure 45 is configured to couple the first pulley assembly 18 and the second pulley assembly 20 so as to transmit a movement of one of the first pulley assembly 18 and the second pulley assembly 20 relative to the movable member 16 to the other of the first pulley assembly 18 and the second pulley assembly 20. The coupling structure 45 is configured to couple the first pulley support 36 and the second pulley support 40 so as to transmit a pivotal movement of one of the first pulley support 36 and the second pulley support 40 relative to the movable member 16 to the other of first pulley support 36 and the second pulley support 40.

Figure 11:
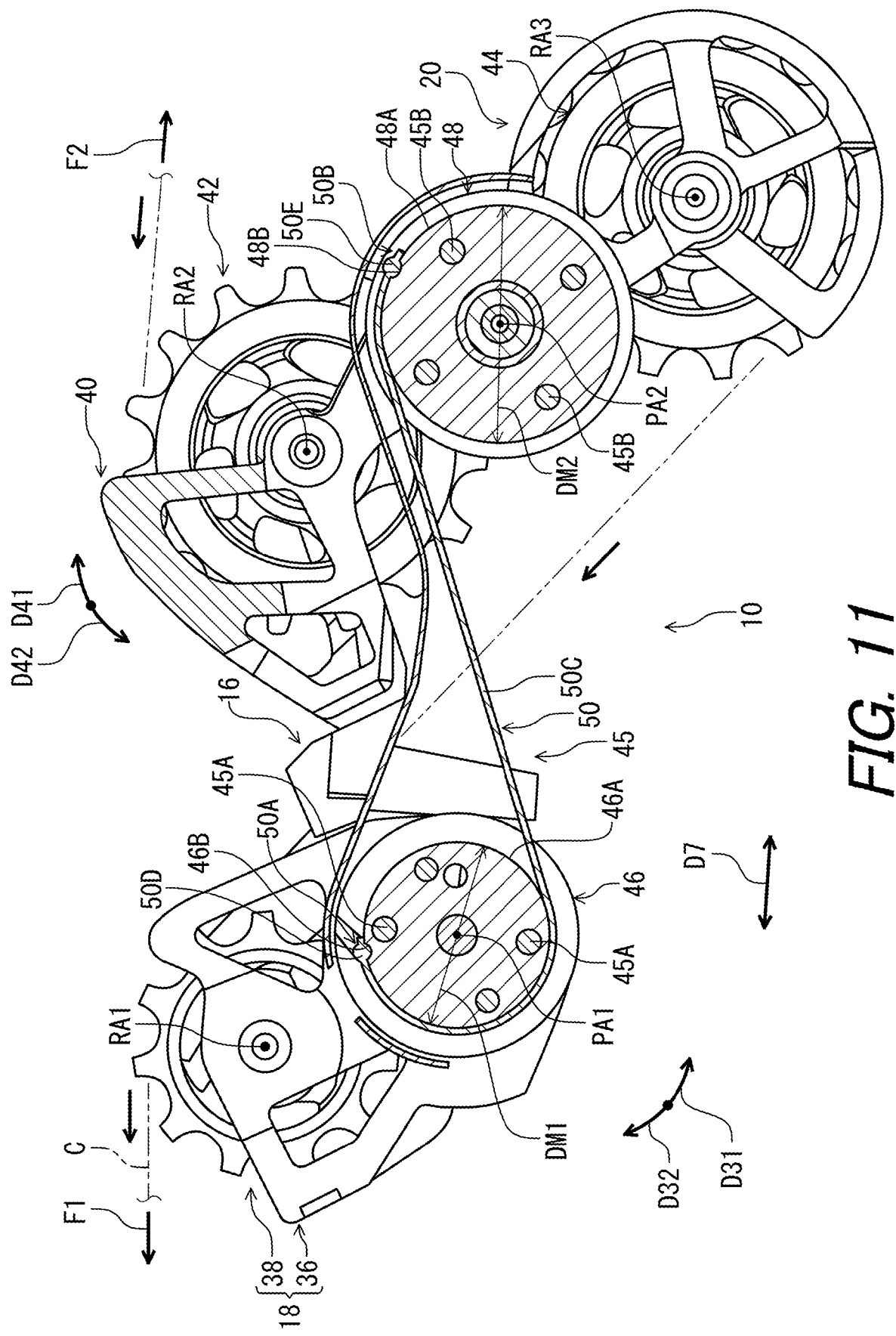
FIG. 11 is a cross-sectional view of the bicycle rear derailleur taken along line XI-XI of FIG. 12.

As seen in FIG. 11, the coupling structure 45 includes a first cable pulley 46, a second cable pulley 48, and an interlocking cable 50. Namely, the bicycle rear derailleur 10 further comprises the first cable pulley 46, the second cable pulley 48, and the interlocking cable 50. The first cable pulley 46 is fixedly coupled to the first pulley support 36 and is rotatably coupled to the movable member 16 about the first pivot axis PA1. The second cable pulley 48 is fixedly coupled to the second pulley support 40 and is rotatably coupled to the movable member 16 about the second pivot axis PA2. The first cable pulley 46 is rotatable relative to the movable member 16 along with the first pulley support 36. The second cable pulley 48 is rotatable relative to the movable member 16 along with the second pulley support 40. The first cable pulley 46 is secured to the first pulley support 36 with fasteners 45A. The second cable pulley 48 is secured to the second pulley support 40 with fasteners 45B.

The interlocking cable 50 is coupled to the first cable pulley 46 and the second cable pulley 48 so as to interlock the first pulley support 36 and the second pulley support 40. The interlocking cable 50 is configured to couple the first cable pulley 46 and the second cable pulley 48 so as to transmit a movement of one of the first cable pulley 46 and the second cable pulley 48 to the other of the first cable pulley 46 and the second cable pulley 48.

The interlocking cable 50 is configured to couple the first cable pulley 46 and the second cable pulley 48 so as to pivot the second pulley support 40 about the second pivot axis PA2 in response to a pivotal movement of the first pulley support 36 about the first pivot axis PA1. The interlocking cable 50 is configured to couple the first cable pulley 46 and the second cable pulley 48 so as to pivot the first pulley support 36 about the first pivot axis PA1 in response to a pivotal movement of the second pulley support 40 about the second pivot axis PA2. However, the structure configured to move the first pulley support 36 and the second pulley support 40 together is not limited to the first cable pulley 46, the second cable pulley 48, and the interlocking cable 50.

The interlocking cable 50 includes a first cable end 50A, a second cable end 50B, and an intermediate part 50C. The intermediate part 50C extends between the first cable end 50A and the second cable end 50B. The first cable end 50A includes a first attachment part 50D. The second cable end 50B includes a second attachment part 50E. The first attachment part 50D has a diameter larger than a diameter of the intermediate part 50C. The second attachment part 50E has a diameter larger than a diameter of the intermediate part 50C. The first attachment part 50D has a spherical shape. The second attachment part 50E has a spherical shape. However, the structure of the interlocking cable 50 is not limited to the above structure. For example, each of the first attachment part 50D and the second attachment part 50E can have various shapes.

The first cable pulley 46 includes a first groove 46A and a first recess 46B. The first groove 46A has an annular shape. The first recess 46B is provided in the first groove 46A. The first cable end 50A and the intermediate part 50C are configured to be provided in the first groove 46A. The first attachment part 50D is configured to be provided in the first recess 46B to transmit force between the first cable pulley 46 and the interlocking cable 50. A bottom of the first groove 46A defines a first diameter DM1 as viewed along the first pivot axis PA1.

The second cable pulley 48 includes a second groove 48A and a second recess 48B. The second groove 48A has an annular shape. The second recess 48B is provided in the second groove 48A. The second cable end 50B and the intermediate part 50C are configured to be provided in the second groove 48A. The second attachment part 50E is configured to be provided in the second recess 48B to transmit force between the second cable pulley 48 and the interlocking cable 50. A bottom of the second groove 48A defines a second diameter DM2 as viewed along the second pivot axis PA2. The second diameter DM2 is different from the first diameter DM1. Thus, a pivot angle of the second pulley assembly 20 is different from a pivot angle of the first pulley assembly 18. In the present embodiment, the second diameter DM2 is larger than the first diameter DM1. Thus, the pivot angle of the second pulley assembly 20 is smaller than the pivot angle of the first pulley assembly 18. However, the second diameter DM2 can be equal to or smaller than the first diameter DM1 if needed and/or desired.

First force F1 is applied from the bicycle chain C to the first pulley assembly 18 to pivot the first pulley support 36 relative to the movable member 16 in the first pivot direction D31. Second force F2 is applied from the bicycle chain C to the second pulley assembly 20 to pivot the second pulley support 40 relative to the movable member 16 in the second pivot direction D41. Thus, tensional force is applied to the interlocking cable 50 in a state where the bicycle chain C is engaged with the first toothed pulley 38, the second toothed pulley 42, and the third toothed pulley 44.

Figure 12:
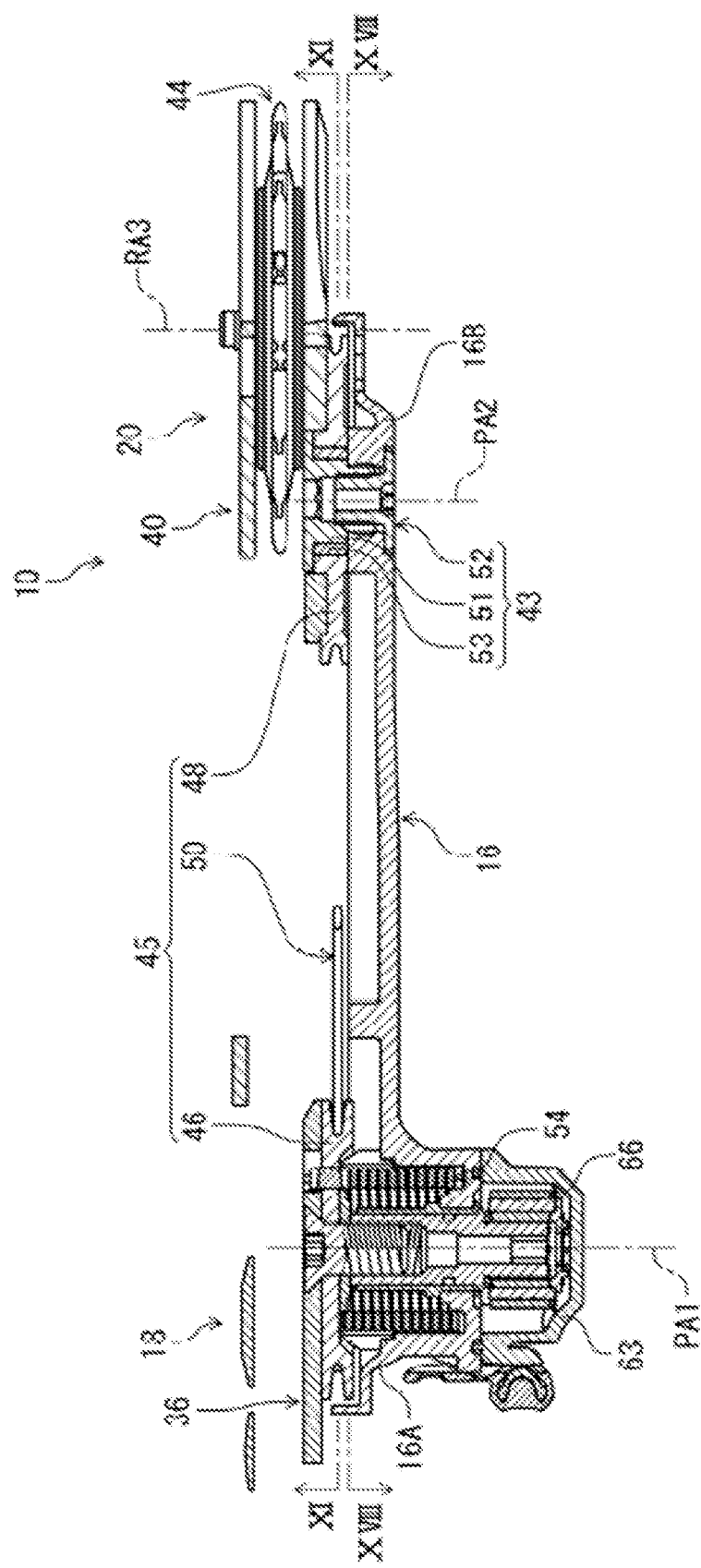
FIG. 12 is a cross-sectional view of the bicycle rear derailleur taken along line XII-XII of FIG. 5.

As seen in FIG. 12, the first cable pulley 46 is provided between the movable member 16 and the first pulley support 36 of the first pulley assembly 18. The second cable pulley 48 is provided between the movable member 16 and the second pulley support 40 of the second pulley assembly 20. In the present embodiment, the first cable pulley 46 is a separate member from the first pulley support 36. The second cable pulley 48 is a separate member from the second pulley support 40. However, the first cable pulley 46 can be integrally provided with the first pulley support 36 as a one-piece unitary member if needed and/or desired. The second cable pulley 48 can be integrally provided with the second pulley support 40 as a one-piece unitary member if needed and/or desired.

As seen in FIG. 12, the pivot coupling structure 43 includes a support member 51, a securing member 52, and a bearing 53. The support member 51 is secured to the movable member 16 with the securing member 52. The support member 51 is configured to pivotally support the second pulley assembly 20 and the second cable pulley 48 relative to the movable member 16 about the second pivot axis PA2. The support member 51 is configured to pivotally support the second pulley support 40 and the second cable pulley 48 relative to the movable member 16 about the second pivot axis PA2. The bearing 53 is attached to the support member 51 so as to pivotally support the second pulley support 40 and the second cable pulley 48 relative to the movable member 16 about the second pivot axis PA2.

Figure 13:
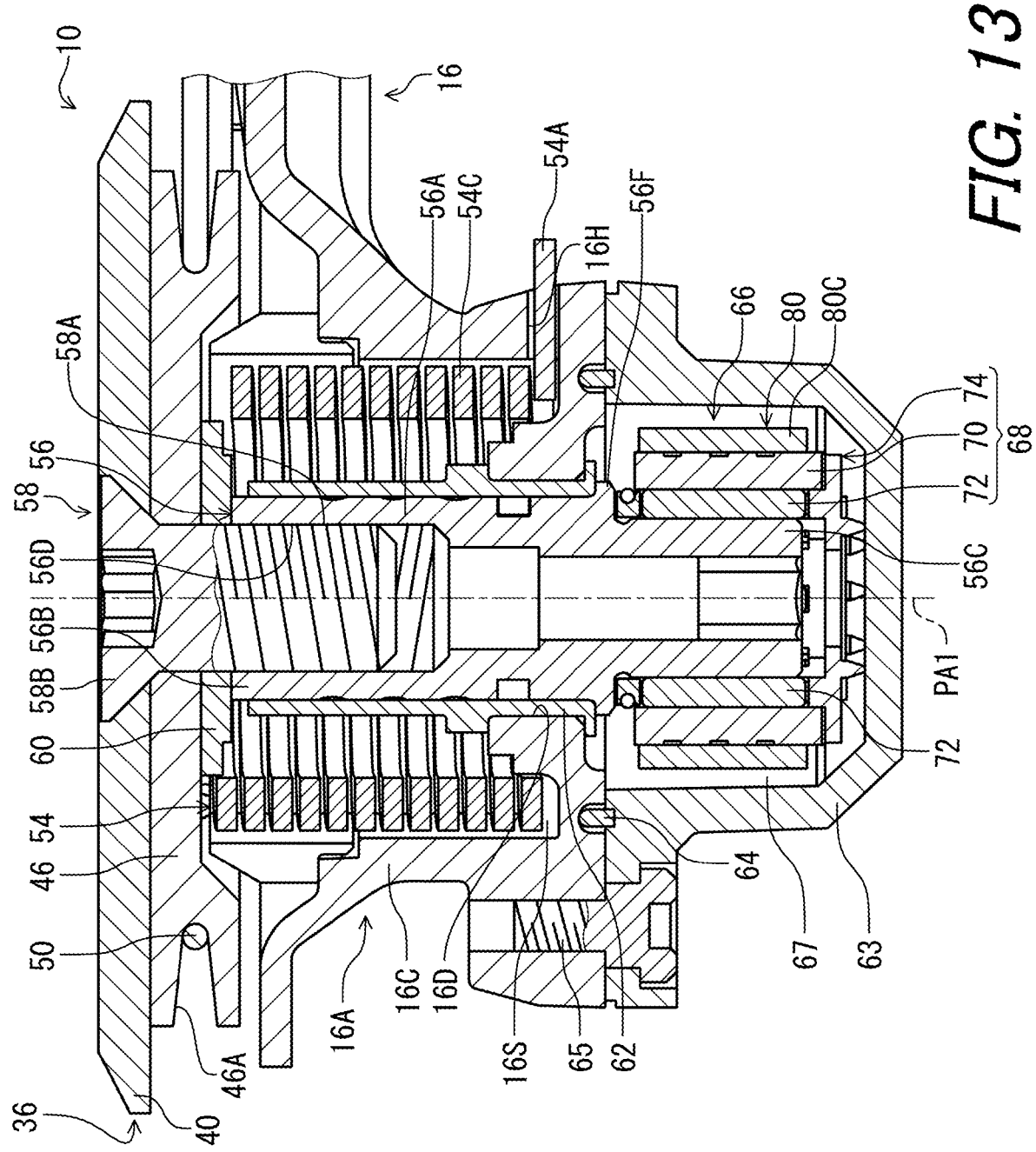
FIG. 13 is a cross-sectional view of the bicycle rear derailleur taken along line XIII-XIII of FIG. 5.

As seen in FIG. 13, the bicycle rear derailleur 10 further comprises a biasing member 54. The biasing member 54 is configured to apply rotational force to the first pulley support 36 relative to the movable member 16 about the first pivot axis PA1. The biasing member 54 is disposed about the first pivot axis PA1. The biasing member 54 is provided between the first pulley support 36 and the movable member 16. The biasing member 54 is provided between the first cable pulley 46 and the movable member 16.

The biasing member 54 has a first end 54A. The first end 54A is coupled to the movable member 16. The movable member 16 includes an attachment hole 16H. The first end 54A is provided in the attachment hole 16H to transmit force between the movable member 16 and the biasing member 54.

Figure 14:
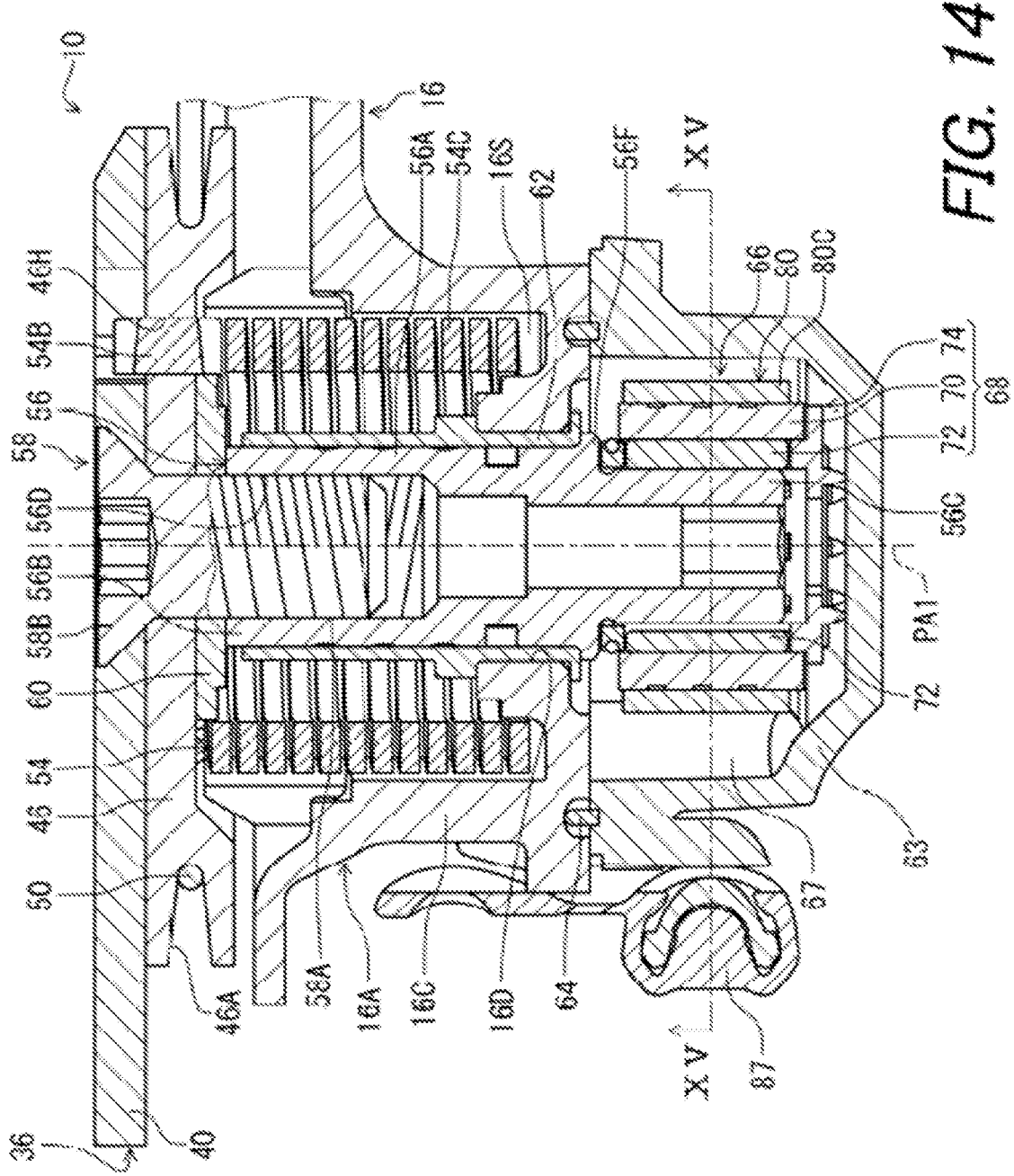
FIG. 14 is a cross-sectional view of the bicycle rear derailleur taken along line XIV-XIV of FIG. 5.

As seen in FIG. 14, the biasing member 54 has a second end 54B. The second end 54B is coupled to at least one of the first cable pulley 46 and the first pulley support 36. In the present embodiment, the second end 54B is coupled to the first cable pulley 46. The first cable pulley 46 includes an attachment hole 46H. The second end 54B is provided in the attachment hole 46H to transmit force between the first cable pulley 46 and the biasing member 54. However, the second end 54B can be coupled to the first pulley support 36 or both the first cable pulley 46 and the first pulley support 36 if needed and/or desired.

In the present embodiment, the biasing member 54 includes a torsion spring. For example, the biasing member 54 includes a coiled body 54C. The coiled body 54C is made of a spring material and is wound about the first pivot axis PA1. As seen in FIG. 13, the first end 54A extends from an end of the coiled body 54C. As seen in FIG. 14, the second end 54B extends from the other end of the coiled body 54C. However, the biasing member 54 is not limited to the torsion spring.

As seen in FIG. 14, the first end portion 16A of the movable member 16 includes an accommodation part 16C. The accommodation part 16C includes an accommodation space 16S. The biasing member 54 is provided in the accommodation space 16S of the accommodation part 16C. The biasing member 54 is provided between the first pulley support 36 and the accommodation part 16C. The biasing member 54 is provided between the first cable pulley 46 and the accommodation part 16C.

The bicycle rear derailleur 10 further comprises a rotational shaft 56. The rotational shaft 56 is secured to one of the first pulley support 36 and the second pulley support 40 and is rotatably coupled to the movable member 16 about corresponding one of the first pivot axis PA1 and the second pivot axis PA2. In the present embodiment, the rotational shaft 56 is secured to the first pulley support 36 and is rotatably coupled to the movable member 16 about the first pivot axis PA1. However, the rotational shaft 56 can be secured to the second pulley support 40 and can be rotatably coupled to the movable member 16 about the second pivot axis PA2 if needed and/or desired.

The rotational shaft 56 extends along the first pivot axis PA1. A longitudinal center axis of the rotational shaft 56 is coincident with the first pivot axis PA1. The rotational shaft 56 includes a shaft body 56A. The shaft body 56A includes a first shaft end 56B and a second shaft end 56C. The shaft body 56A extends between the first shaft end 56B and the second shaft end 56C along the first pivot axis PA1. The bicycle rear derailleur 10 further comprises a shaft fastener 58 and a support plate 60. The first shaft end 56B of the rotational shaft 56 is secured to the first pulley support 36 and the first cable pulley 46 with the shaft fastener 58. The rotational shaft 56 includes a threaded hole 56D provided at the first shaft end 56B. The shaft fastener 58 includes an externally threaded part 58A threadedly engaged with the threaded hole 56D. The first pulley support 36, the first cable pulley 46, and the support plate 60 are held between the first shaft end 56B and a head part 58B of the shaft fastener 58.

The accommodation part 16C of the movable member 16 includes a support hole 16D connected with the accommodation space 16S. The rotational shaft 56 extends through the accommodation space 16S and the support hole 16D. The bicycle rear derailleur 10 further comprises a sleeve 62 provided between the rotational shaft 56 and the movable member 16. The sleeve 62 is provided in the support hole 16D and is attached to the movable member 16. The rotational shaft 56 is rotatably provided in the sleeve 62. The rotational shaft 56 is in slidable contact with the sleeve 62. The rotational shaft 56 includes a flange 56F. The flange 56F extends radially outward from the shaft body 56A with respect to the first pivot axis PA1. The flange 56F is provided between the first shaft end 56B and the second shaft end 56C. The flange 56F is configured to restrict the movable member 16 from moving relative to the rotational shaft 56 away from the first pulley support 36 and the first cable pulley 46.

The bicycle rear derailleur 10 further comprises a cover 63 and a seal member 64. The cover 63 is secured to the movable member 16 with fasteners 65 to cover the second shaft end 56C of the rotational shaft 56. The cover 63 is attached to the accommodation part 16C. The seal member 64 is provided between the movable member 16 and the cover 63. The seal member 64 is made of an elastic material such as rubber.

As seen in FIG. 12, the movable member 16 and the second pulley support 40 are free of another biasing member about the second pivot axis PA2. However, at least one of the movable member 16 and the second pulley support 40 can include another biasing member configured to apply rotational force to the movable member 16 and the second pulley support 40 if needed and/or desired.

As seen in FIG. 14, the bicycle rear derailleur 10 further comprises a damping structure 66. The damping structure 66 is disposed on the movable member 16 about the rotational shaft 56. The damping structure 66 is disposed on the movable member 16 about the second shaft end 56C of the rotational shaft 56. The damping structure 66 is provided between the movable member 16 and the cover 63. The damping structure 66 is provided in an internal space 67 defined by the movable member 16 and the cover 63.

Figure 15:
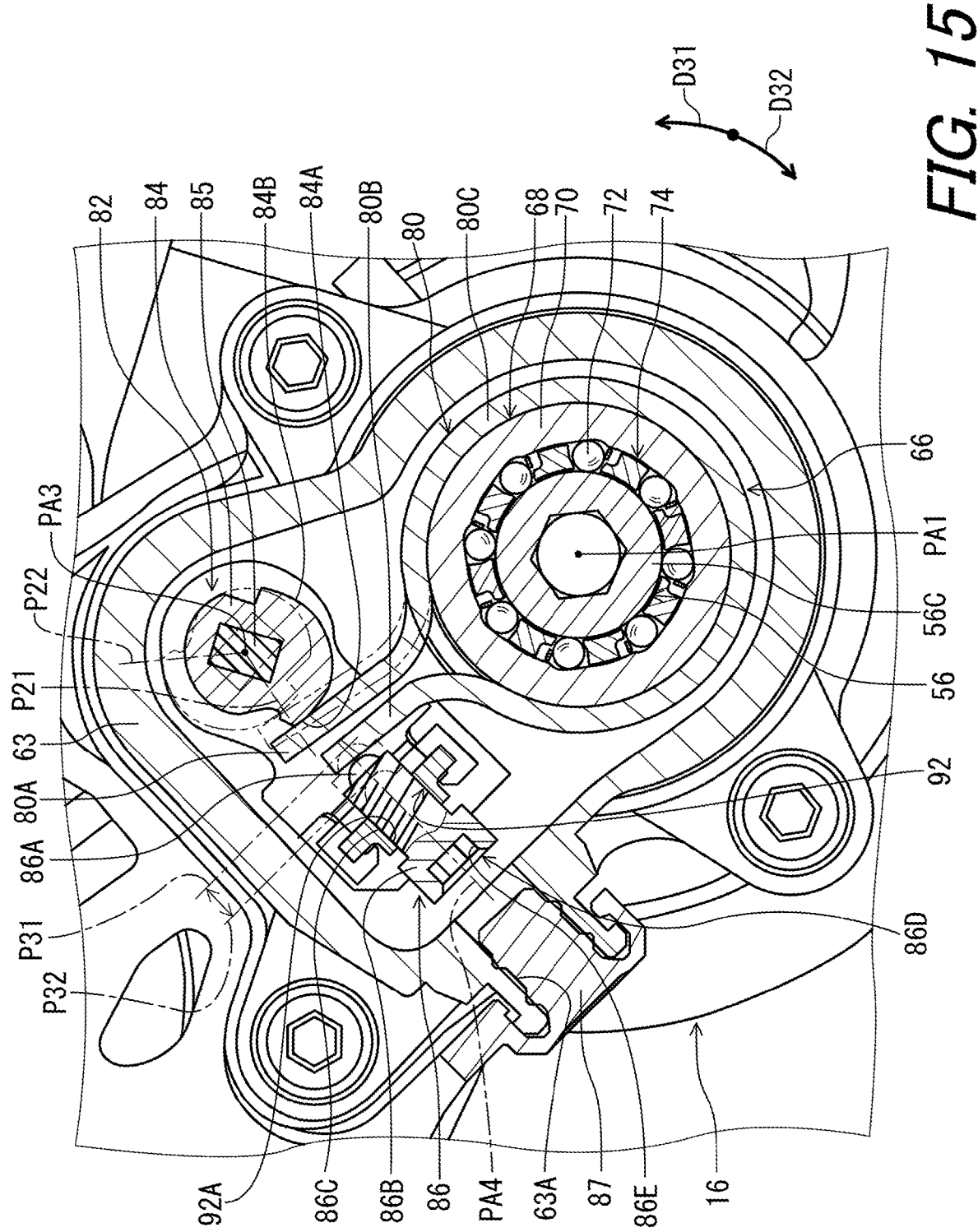
FIG. 15 is a cross-sectional view of the bicycle rear derailleur taken along line XV-XV of FIG. 14.

As seen in FIG. 15, the damping structure 66 is configured to provide rotational resistance in one rotational direction of the one of the first pulley support 36 and the second pulley support 40. The damping structure 66 is configured to provide frictional resistance in the one rotational direction of the one of the first pulley support 36 and the second pulley support 40.

In the present embodiment, the damping structure 66 is configured to provide rotational resistance in one rotational direction of the first pulley support 36 through the rotational shaft 56. The damping structure 66 is configured to provide frictional resistance in the one rotational direction of the first pulley support 36 through the rotational shaft 56. However, the damping structure 66 can be configured to provide rotational resistance in one rotational direction of the second pulley support 40 if needed and/or desired. The damping structure 66 can be configured to provide frictional resistance in one rotational direction of the second pulley support 40. The rotational resistance can include other resistance instead of or in addition to frictional resistance.

The damping structure 66 includes a one-way clutch 68. The one-way clutch 68 is disposed between the movable member 16 and the rotational shaft 56. The one-way clutch 68 is configured to control a direction in which the rotational resistance is applied to the one of the first pulley support 36 and the second pulley support 40. The one-way clutch 68 is configured to transmit the rotational resistance to the one of the first pulley support 36 and the second pulley support 40 through the rotational shaft 56 when the one of the first pulley support 36 and the second pulley support 40 is pivoted relative to the movable member 16 about the corresponding one of the first pivot axis PA1 and the second pivot axis PA2.

In the present embodiment, the one-way clutch 68 is configured to control a direction in which the rotational resistance is applied to the first pulley support 36. The one-way clutch 68 is configured to transmit the rotational resistance to the first pulley support 36 through the rotational shaft 56 when the first pulley support 36 is pivoted relative to the movable member 16 about the first pivot axis PA1 in the first pivot direction D31. The one-way clutch 68 is configured to not transmit the rotational resistance to the first pulley support 36 when the first pulley support 36 is pivoted relative to the movable member 16 about the first pivot axis PA1 in the first additional pivot direction D32.

However, the one-way clutch 68 can be configured to control a direction in which the rotational resistance is applied to the second pulley support 40. The one-way clutch 68 can be configured to transmit the rotational resistance to the second pulley support 40 through the rotational shaft 56 when the second pulley support 40 is pivoted relative to the movable member 16 about the second pivot axis PA2 in the second additional pivot direction D42. The one-way clutch 68 can be configured to not transmit the rotational resistance to the second pulley support 40 when the second pulley support 40 is pivoted relative to the movable member 16 about the second pivot axis PA2 in the second additional pivot direction D42.

The one-way clutch 68 includes an outer race 70, a plurality of rollers 72, and a retainer 74. The outer race 70 has a tubular shape. The roller 72 has a columnar shape in the present embodiment. The rotational shaft 56 is provided in the outer race 70. Each roller of the plurality of rollers 72 is rotatably provided in the outer race 70. Each roller of the plurality of rollers 72 is rotatably provided between the outer race 70 and the rotational shaft 56. The retainer 74 is configured to rotatably retain the plurality of rollers 72. The retainer 74 is attached to the outer race 70 to rotate along with the outer race 70 about the first pivot axis PA1.

Figure 16:
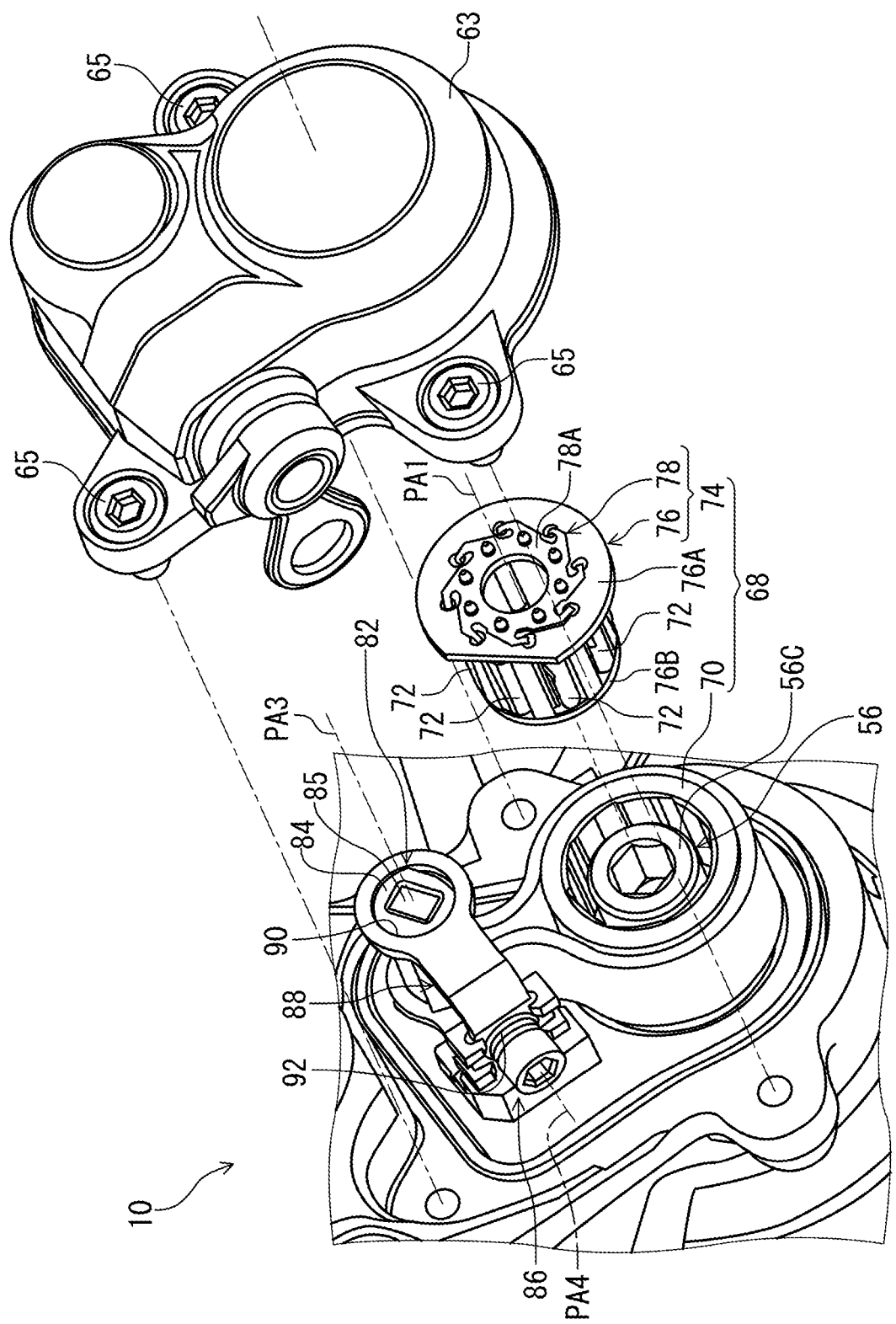
FIG. 16 is an exploded perspective view of the bicycle rear derailleur illustrated in FIG. 1.

As seen in FIG. 16, the retainer 74 includes a retainer body 76 and a retainer spring 78. The retainer body 76 is provided in the outer race 70. The retainer spring 78 is attached to the retainer body 76. The retainer body 76 includes a first ring 76A and a second ring 76B. The plurality of rollers 72 is provided between the first ring 76A and the second ring 76B. The retainer spring 78 includes a support ring 78A. The support ring 78A is attached to the first ring 76A.

Figure 17:
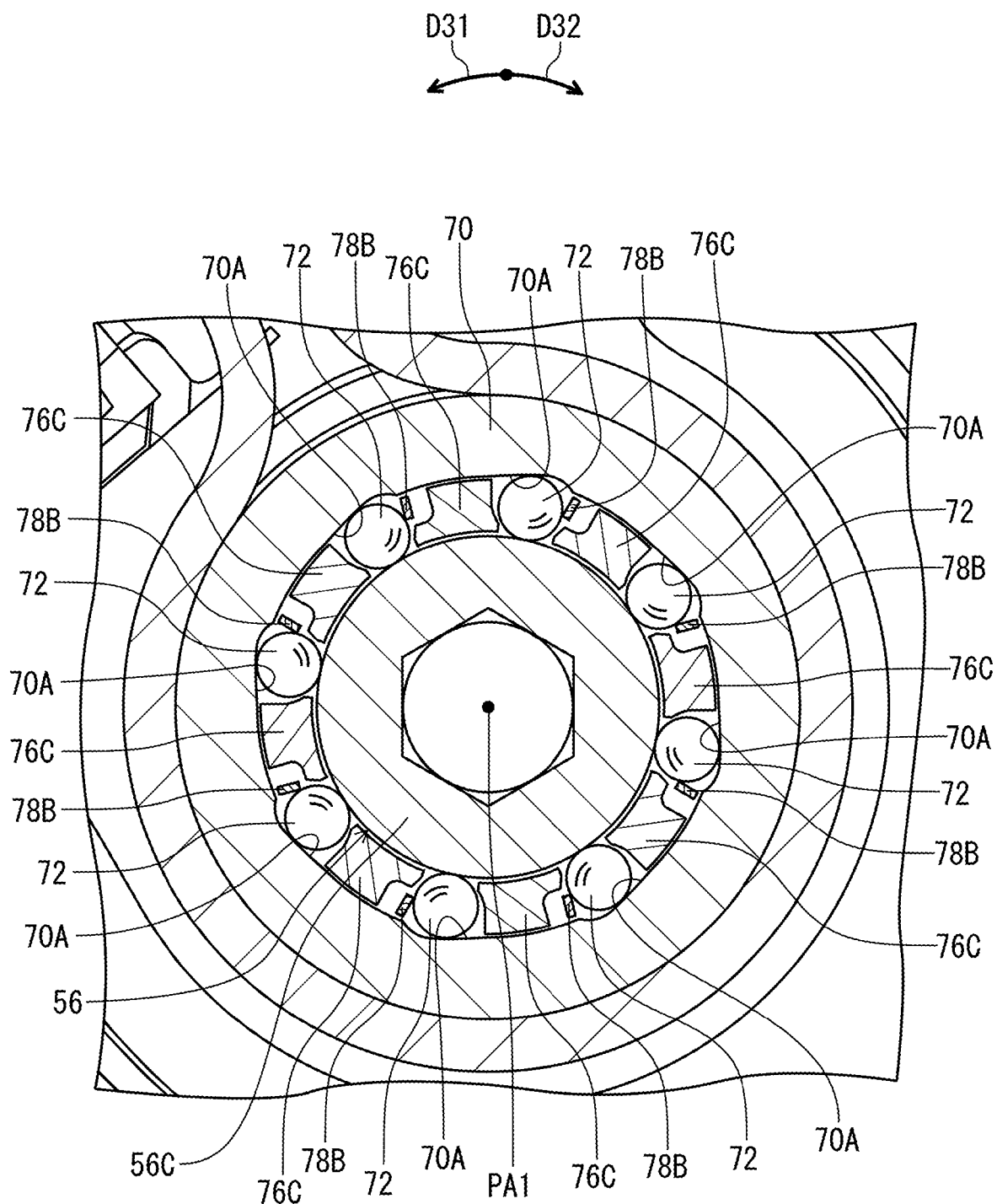
FIG. 17 is an enlarged cross-sectional view of the bicycle rear derailleur illustrated in FIG. 15.

As seen in FIG. 17, the retainer body 76 includes a plurality of intermediate parts 76C. The roller 72 is provided between adjacent two intermediate parts 76C of the plurality of intermediate parts 76C. The retainer spring 78 includes a plurality of leaf springs 78B. The leaf spring 78B is provided between the roller 72 and the intermediate part 76C. The leaf spring 78B is configured to bias the roller 72 in the first pivot direction D31.

The outer race 70 includes a plurality of inclined inner surfaces 70A. The inclined inner surface 70A is inclined to reduce a radial distance between the rotational shaft 56 and the inclined inner surface 70A. A radial distance between the rotational shaft 56 and a downstream end of the inclined inner surface 70A in the first pivot direction D31 is smaller than a diameter of the roller 72. A radial distance between the rotational shaft 56 and an upstream end of the inclined inner surface 70A in the first pivot direction D31 is larger than the diameter of the roller 72.

The inclined inner surface 70A is configured to be contactable with the roller 72 to restrict the roller 72 from rotating about its rotational axis when the rotational shaft 56 is rotated relative to the movable member 16 in the first pivot direction D31. The inclined inner surface 70A is configured to be contactable with the roller 72 to restrict the plurality of rollers 72 from revolving relative to the rotational shaft 56 about the first pivot axis PA1 when the rotational shaft 56 is rotated relative to the movable member 16 in the first pivot direction D31. Thus, the outer race 70 is rotated about the first pivot axis PA1 along with the rotational shaft 56 when the rotational shaft 56 is rotated relative to the movable member 16 about the first pivot axis PA1 in the first pivot direction D31.

The inclined inner surface 70A is configured to allow the roller 72 to rotate about its rotational axis when the rotational shaft 56 is rotated relative to the movable member 16 in the first additional pivot direction D32. The inclined inner surface 70A is configured to allow the roller 72 to revolve the plurality of rollers 72 relative to the rotational shaft 56 about the first pivot axis PA1 when the rotational shaft 56 is rotated relative to the movable member 16 in the first additional pivot direction D32. Thus, the rotation of the rotational shaft 56 is not transmitted to the outer race 70 when the rotational shaft 56 is rotated relative to the movable member 16 about the first pivot axis PA1 in the first additional pivot direction D32.

As seen in FIG. 15, the damping structure 66 includes a resistance applying member 80 and a resistance adjusting member 82. The resistance applying member 80 is operatively arranged between the movable member 16 and the rotational shaft 56. The resistance adjusting member 82 is configured to contact the resistance applying member 80. The resistance applying member 80 is in slidable contact with the one-way clutch 68. The resistance applying member 80 is in slidable contact with the outer race 70 of the one-way clutch 68. The resistance applying member 80 is mounted to the movable member 16 to rotate along with the movable member 16 relative to the first pulley support 36 about the first pivot axis PA1.

The resistance applying member 80 is provided about the first pivot axis PA1 and the rotational shaft 56. The resistance applying member 80 is elastically deformable to change the rotational resistance applied to the first pulley support 36. The resistance applying member 80 is made of an elastic material such as a spring material. The resistance applying member 80 includes a first plate end 80A, a second plate end 80B, and a curved part 80C. The curved part 80C circumferentially extends about the first pivot axis PA1 and the rotational shaft 56. The curved part 80C is provided radially outward of the rotational shaft 56 and the outer race 70 of the one-way clutch 68. The curved part 80C is contactable with an outer peripheral surface of the outer race 70.

The first plate end 80A extends radially outward rom from an end of the curved part 80C. The second plate end 80B extends from the other end of the curved part 80C. The first plate end 80A is spaced apart from the second plate end 80B. An inner diameter of the curved part 80C decreases when the first plate end 80A is moved toward the second plate end 80B. The inner diameter of the curved part 80C increases when the first plate end 80A is moved away from the second plate end 80B. Thus, rotational resistance generated between the outer race 70 and the resistance applying member 80 is changed by changing a distance between the first plate end 80A and the second plate end 80B.

The resistance adjusting member 82 is movably mounted on the movable member 16 between at least a first position P21 and a second position P22 so that first rotational resistance with the resistance adjusting member 82 in the first position P21 is different from second rotational resistance with the resistance adjusting member 82 in the second position P22. The resistance adjusting member 82 is rotatably mounted on the movable member 16 between at least the first position P21 and the second position P22 so that the first rotational resistance with the resistance adjusting member 82 in the first position P21 is different from the second rotational resistance with the resistance adjusting member 82 in the second position P22. The resistance adjusting member 82 is pivotable relative to the movable member 16 and the resistance applying member 80 about an adjustment pivot axis PA3 spaced apart from the first pivot axis PA1.

Rotational resistance applied by the resistance applying member 80 when the resistance adjusting member 82 is in the first position P21 is different from rotational resistance applied by the resistance applying member 80 when the resistance adjusting member 82 is in the second position P22. The resistance applying member 80 is configured to apply first rotational resistance to the rotational shaft 56 when the resistance adjusting member 82 is in the first position P21. The resistance applying member 80 is configured to apply second rotational resistance to the rotational shaft 56 when the resistance adjusting member 82 is in the second position P22. In the present embodiment, the first rotational resistance is greater than the second rotational resistance. However, the second rotational resistance can be greater than the first rotational resistance.

The resistance adjusting member 82 is configured to change the distance between the first plate end 80A and the second plate end 80B so as to change the rotational resistance applied to the rotational shaft 56. The resistance adjusting member 82 includes a resistance adjusting body 84. The resistance adjusting body 84 has a first surface 84A and a second surface 84B. The first surface 84A is configured to contact the first plate end 80A. The second surface 84B is configured to be contactable with the first plate end 80A. The second surface 84B is configured to be spaced apart from the first plate end 80A. In the present embodiment, a first outer radius is defined from the adjustment pivot axis PA3 to the first surface 84A. A second outer radius is defined from the adjustment pivot axis PA3 to the second surface 84B. The first outer radius is larger than the second outer radius.

Figure 18:
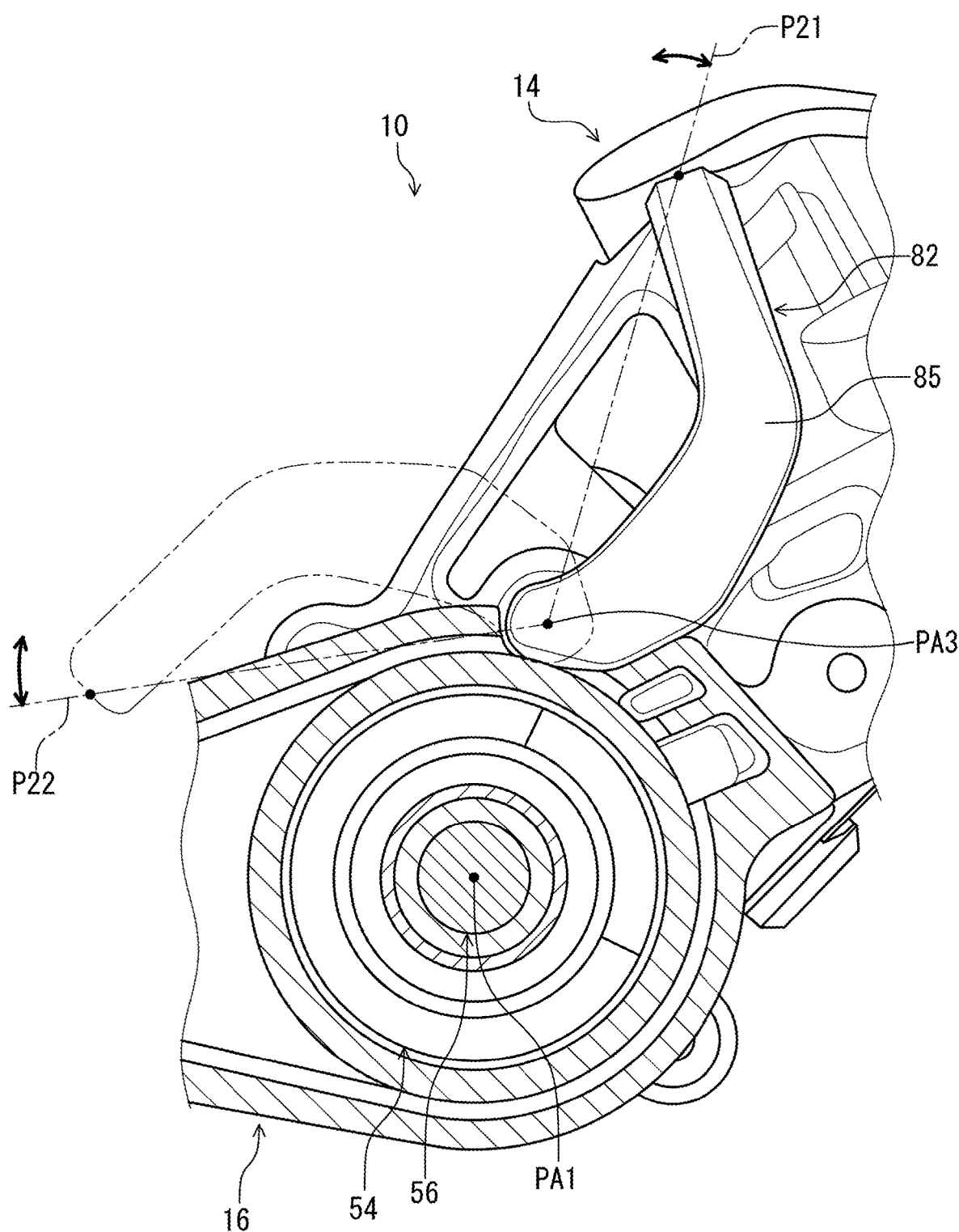
FIG. 18 is a cross-sectional view of the bicycle rear derailleur taken along line XVIII-XVIII of FIG. 12.

As seen in FIG. 18, the resistance adjusting member 82 includes an adjusting lever 85. The adjusting lever 85 is coupled to the resistance adjusting body 84 (see e.g., FIG. 15). The adjusting lever 85 is pivotally coupled to the movable member 16 about the adjustment pivot axis PA3. However, the adjusting lever 85 can be omitted from the resistance adjusting member 82 if needed and/or desired.

As seen in FIG. 15, the damping structure 66 includes a resistance adjusting member 86. The resistance adjusting member 86 is configured to contact the resistance applying member 80. The resistance adjusting member 86 is movably mounted on the movable member 16 between at least a first position P31 and a second position P32 so that first rotational resistance with the resistance adjusting member 86 in the first position P31 is different from second rotational resistance with the resistance adjusting member 86 in the second position P32. The resistance adjusting member 86 is rotatably mounted on the movable member 16 between at least the first position P31 and the second position P32 so that the first rotational resistance with the resistance adjusting member 86 in the first position P31 is different from the second rotational resistance with the resistance adjusting member 86 in the second position P32. The resistance adjusting member 86 is pivotable relative to the movable member 16 and the resistance applying member 80 about an adjustment pivot axis PA4 spaced apart from the first pivot axis PA1.

Rotational resistance applied by the resistance applying member 80 when the resistance adjusting member 86 is in the first position P31 is different from rotational resistance applied by the resistance applying member 80 when the resistance adjusting member 86 is in the second position P32. The resistance applying member 80 is configured to apply first rotational resistance to the rotational shaft 56 when the resistance adjusting member 86 is in the first position P31. The resistance applying member 80 is configured to apply second rotational resistance to the rotational shaft 56 when the resistance adjusting member 86 is in the second position P32. In the present embodiment, the first rotational resistance is greater than the second rotational resistance. However, the second rotational resistance can be greater than the first rotational resistance if needed and/or desired.

The resistance adjusting member 86 is configured to change the distance between the first plate end 80A and the second plate end 80B so as to change the rotational resistance applied to the rotational shaft 56. The resistance adjusting member 86 includes a first end 86A, a second end 86B, an externally threaded part 86C, and a tool engagement part 86D. The resistance adjusting member 86 extends between the first end 86A and the second end 86B along the adjustment pivot axis PA4. The first end 86A is configured to be contactable with the second plate end 80B. The tool engagement part 86D is provided at the second end 86B. The tool engagement part 86D is configured to be engaged with a tool such as a hexagonal wrench. The tool engagement part 86D includes a hexagon socket 86E.

The bicycle rear derailleur 10 further comprises a cap 87. The cap 87 is configured to be detachably attached to the cover 63. The cover 63 includes an opening 63A. The cap 87 is configured to cover the opening 63A in a state where the cap 87 is attached to the cover 63. A tool can be engaged with the tool engagement part 86D through the opening 63A in a state where the cap 87 is detached from the cover 63.

As seen in FIG. 16, the damping structure 66 includes a support 88. The support 88 is attached to the movable member 16. The support 88 is configured to rotatably support the resistance adjusting member 86 about the adjustment pivot axis PA3. The support 88 is configured to rotatably support the resistance adjusting member 86 about the adjustment pivot axis PA4. The support 88 includes support holes 90 and 92. The resistance adjusting member 82 is rotatably provided in the support hole 90 about the adjustment pivot axis PA3. The resistance adjusting member 86 is rotatably provided in the support hole 92 about the adjustment pivot axis PA4.

As seen in FIG. 15, the support hole 92 includes a threaded hole 92A. The externally threaded part 86C of the resistance adjusting member 86 is threadedly engaged with the threaded hole 92A. Rotation of the resistance adjusting member 86 moves the resistance adjusting member 86 relative to the movable member 16 and the support 88 along the adjustment pivot axis PA4 between at least the first position P31 and the second position P32.

The resistance adjusting member 86 is configured to move the second plate end 80B toward the first plate end 80A when the resistance adjusting member 86 moves from the first position P31 to the second position P32. Thus, the rotational resistance applied to the rotational shaft 56 increases when the resistance adjusting member 86 moves from the first position P31 to the second position P32. The resistance adjusting member 86 is configured to allow the second plate end 80B to move away from the first plate end 80A when the resistance adjusting member 86 moves from the second position P32 to the first position P31. Thus, the rotational resistance applied to the rotational shaft 56 decreases when the resistance adjusting member 86 moves from the second position P32 to the first position P31.

As seen in FIG. 1, a hub axle line RL1 passes through the center axis WA1 of the front hub axle W11 and the center axis WA2 of the rear hub axle W21 as viewed along the first pivot axis PA1. The hub axle line RL1 is defined to intersect with the center axis WA1 of the front hub axle W11 and the center axis WA2 of the rear hub axle W21. The hub axle line RL1 is perpendicular to the center axis WA1 of the front hub axle W11 and the center axis WA2 of the rear hub axle W21.

Figure 19:
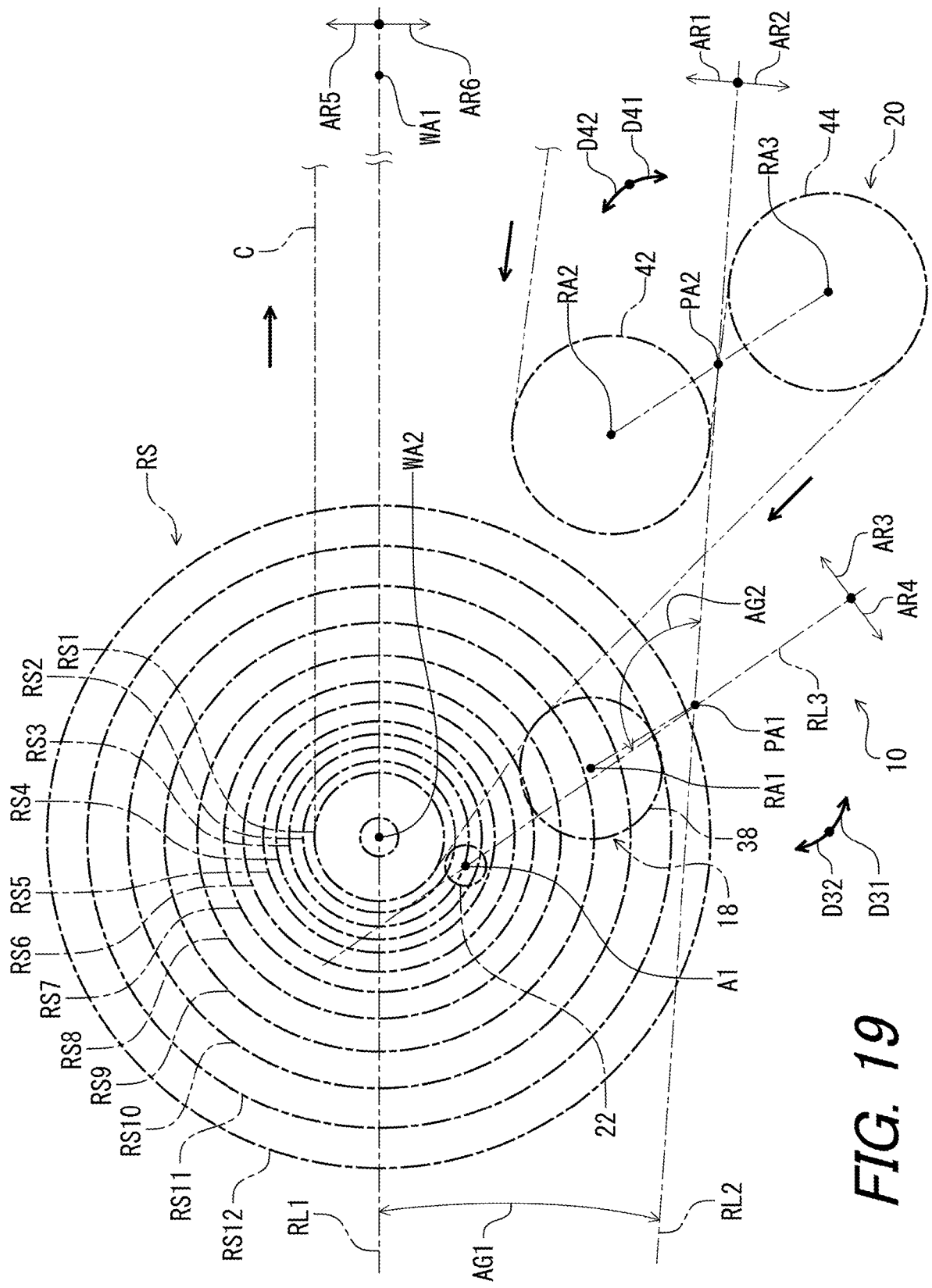
FIG. 19 is a schematic diagram of the bicycle rear derailleur illustrated in FIG. 1 (top-gear state).

As seen in FIG. 19, the hub axle line RL1 defines an upper area AR5 and a lower area AR6 as viewed along the first pivot axis PA1. The upper area AR5 is provided above the lower area AR6 as viewed along the first pivot axis PA1.

A reference axis line RL2 passes through the first pivot axis PA1 and the second pivot axis PA2 as viewed along the first pivot axis PA1. The reference axis line RL2 is defined to intersect with the first pivot axis PA1 and the second pivot axis PA2. The reference axis line RL2 is perpendicular to the first pivot axis PA1 and the second pivot axis PA2. The reference axis line RL2 defines a first area AR1 and a second area AR2 as viewed along the first pivot axis PA1. The first area AR1 is provided above the second area AR2 as viewed along the first pivot axis PA1 in a mounting state where the bicycle rear derailleur 10 is mounted to the bicycle frame 2A.

Figure 20:
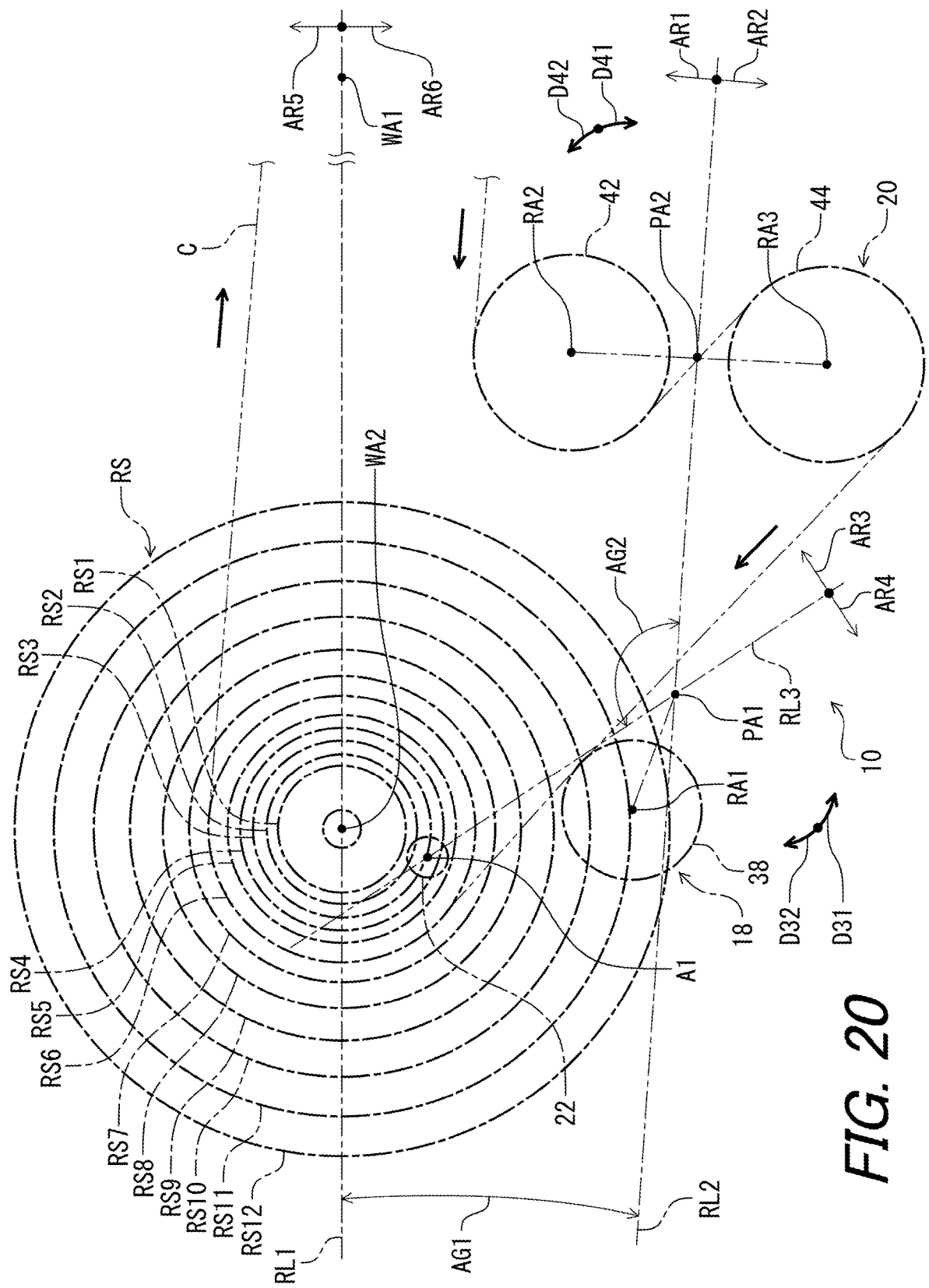
FIG. 20 is a schematic diagram of the bicycle rear derailleur illustrated in FIG. 1 (middle-gear state).
Figure 21:
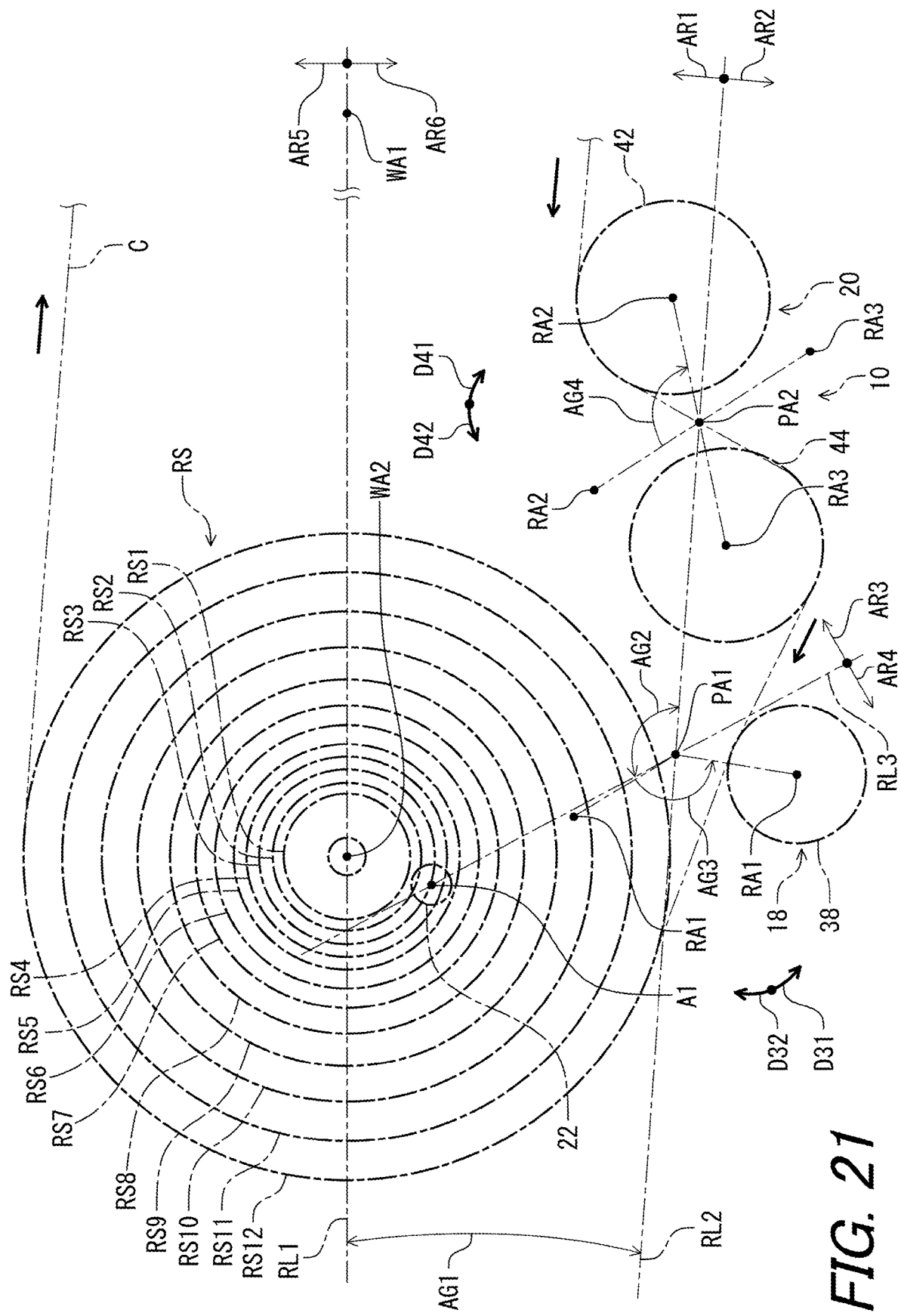
FIG. 21 is a schematic diagram of the bicycle rear derailleur illustrated in FIG. 1 (low-gear state).

As seen in FIGS. 19 to 21, an inclination angle AG1 is defined between the reference axis line RL2 and the hub axle line RL1 as viewed along the first pivot axis PA1 in the mounting state where the bicycle rear derailleur 10 is mounted to the bicycle frame 2A. The inclination angle AG1 is defined in the first area AR1 and the lower area AR6. The inclination angle AG1 is defined above the reference axis line RL2 as viewed along the first pivot axis PA1 in the mounting state where the bicycle rear derailleur 10 is mounted to the bicycle frame 2A. The inclination angle AG1 is defined below the hub axle line RL1 as viewed along the first pivot axis PA1 in the mounting state where the bicycle rear derailleur 10 is mounted to the bicycle frame 2A.

The inclination angle AG1 ranges from 0 degree to 25 degrees. In the present embodiment, the inclination angle AG1 ranges from 0 degree to 25 degrees in each of the top-gear state, the middle-gear state, and the low-gear state. The inclination angle AG1 is 4 degrees in each of the top-gear state, the middle-gear state, and the low-gear state. However, the inclination angle AG1 is not limited to the above angle and range.

The reference axis line RL2 is inclined relative to the hub axle line RL1 as viewed along the first pivot axis PA1 in each of the top-gear state, the middle-gear state, and the low-gear state. The second pivot axis PA2 is provided below the first pivot axis PA1 as viewed along the first pivot axis PA1 in each of the top-gear state, the middle-gear state, and the low-gear state. The inclination angle AG1 is 4 degrees in each of the top-gear state, the middle-gear state, and the low-gear state. Namely, the inclination angle AG1 is the same in each of the top-gear state, the middle-gear state, and the low-gear state. However, the inclination angle AG1 is not limited to the above value and range. The inclination angle AG1 can be different in at least two of the top-gear state, the middle-gear state, and the low-gear state. The second pivot axis PA2 can be above or on the same level as the first pivot axis PA1 as viewed along the first pivot axis PA1 in at least one of the top-gear state, the middle-gear state, and the low-gear state.

As seen in FIG. 19, an arrangement line RL3 passes through the base mounting axis A1 and the first pivot axis PA1 as viewed along the first pivot axis PA1. The arrangement line RL3 is defined to intersect with the base mounting axis A1 and the first pivot axis PA1. The arrangement line RL3 is perpendicular to the base mounting axis A1 and the first pivot axis PA1. The arrangement line RL3 defines a third area AR3 and a fourth area AR4 as viewed along the first pivot axis PA1. The third area AR3 is on a front side of the fourth area AR4 as viewed along the first pivot axis PA1 in the state where the base member 12 is mounted to the bicycle frame 2A.

As seen in FIGS. 19 to 21, an arrangement angle AG2 is defined between the arrangement line RL3 and the reference axis line RL2 as viewed along the first pivot axis PA1. The arrangement angle AG2 is defined in the first area AR1 and the third area AR3. The arrangement angle AG2 is defined above the reference axis line RL2 as viewed along the first pivot axis PA1 in the state where the base member 12 is mounted to the bicycle frame 2A. The arrangement angle AG2 is defined on a front side of the reference axis line RL2 as viewed along the first pivot axis PA1 in the state where the base member 12 is mounted to the bicycle frame 2A.

The arrangement angle AG2 ranges from 100 degrees to 150 degrees. In the present embodiment, the arrangement line RL3 is inclined relative to the reference axis line RL2 as viewed along the first pivot axis PA1 in each of the top-gear state, the middle-gear state, and the low-gear state. The arrangement angle AG2 is 129 degrees in the top-gear state. The arrangement angle AG2 is 127 degrees in the middle-gear state. The arrangement angle AG2 is 122 degrees in the low-gear state. Namely, the arrangement angle AG2 is different in each of the top-gear state, the middle-gear state, and the low-gear state. However, the arrangement angle AG2 is not limited to the above values and range. The arrangement angle AG2 can be the same in at least two of the top-gear state, the middle-gear state, and the low-gear state.

As seen in FIG. 19, the center axis WA1 of the front hub axle W11, the center axis WA2 of the rear hub axle W21, the base mounting axis A1, the first pulley axis RA1, and the second pulley axis RA2 are provided int the first area AR1 as viewed along the first pivot axis PA1 in the top-gear state. The third pulley axis RA3 is provided in the second area AR2 as viewed along the first pivot axis PA1 in the top-gear state. The center axis WA1 of the front hub axle W11, the center axis WA2 of the rear hub axle W21, the base mounting axis A1, the first pulley axis RA1, and the second pulley axis RA2 are provided above the reference axis line RL2 as viewed along the first pivot axis PA1 in the top-gear state. The third pulley axis RA3 is provided below the reference axis line RL2 as viewed along the first pivot axis PA1 in the top-gear state.

The center axis WA1 of the front hub axle W11, the center axis WA2 of the rear hub axle W21, the base mounting axis A1, the first pulley axis RA1, the second pulley axis RA2, and the third pulley axis RA3 are provided in the third area AR3 as viewed along the first pivot axis PA1 in the top-gear state. The positional relationships among the reference axis line RL2, the arrangement line RL3, the center axis WA1 of the front hub axle W11, the center axis WA2 of the rear hub axle W21, the base mounting axis A1, the first pulley axis RA1, the second pulley axis RA2, and the third pulley axis RA3 in the top-gear state are not limited to the above positional relationships.

As seen in FIG. 20, the center axis WA1 of the front hub axle W11, the center axis WA2 of the rear hub axle W21, the base mounting axis A1, the first pulley axis RA1, and the second pulley axis RA2 are provided int the first area AR1 as viewed along the first pivot axis PA1 in the middle-gear state. The third pulley axis RA3 is provided in the second area AR2 as viewed along the first pivot axis PA1 in the middle-gear state. The center axis WA1 of the front hub axle W11, the center axis WA2 of the rear hub axle W21, the base mounting axis A1, the first pulley axis RA1, and the second pulley axis RA2 are provided above the reference axis line RL2 as viewed along the first pivot axis PA1 in the middle-gear state. The third pulley axis RA3 is provided below the reference axis line RL2 as viewed along the first pivot axis PA1 in the middle-gear state.

The center axis WA1 of the front hub axle W11, the center axis WA2 of the rear hub axle W21, the base mounting axis A1, the second pulley axis RA2, and the third pulley axis RA3 are provided in the third area AR3 as viewed along the first pivot axis PA1 in the middle-gear state. The first pulley axis RA1 is provided in the fourth area AR4 as viewed along the first pivot axis PA1 in the middle-gear state. The positional relationships among the reference axis line RL2, the arrangement line RL3, the center axis WA1 of the front hub axle W11, the center axis WA2 of the rear hub axle W21, the base mounting axis A1, the first pulley axis RA1, the second pulley axis RA2, and the third pulley axis RA3 in the middle-gear state are not limited to the above positional relationships.

As seen in FIG. 21, the center axis WA1 of the front hub axle W11, the center axis WA2 of the rear hub axle W21, the base mounting axis A1, and the second pulley axis RA2 are provided int the first area AR1 as viewed along the first pivot axis PA1 in the low-gear state. The first pulley axis RA1 and the third pulley axis RA3 are provided in the second area AR2 as viewed along the first pivot axis PA1 in the low-gear state. The center axis WA1 of the front hub axle W11, the center axis WA2 of the rear hub axle W21, the base mounting axis A1, and the second pulley axis RA2 are provided above the reference axis line RL2 as viewed along the first pivot axis PA1 in the low-gear state. The first pulley axis RA1 and the third pulley axis RA3 are provided below the reference axis line RL2 as viewed along the first pivot axis PA1 in the low-gear state.

The center axis WA1 of the front hub axle W11, the center axis WA2 of the rear hub axle W21, the base mounting axis A1, the second pulley axis RA2, and the third pulley axis RA3 are provided in the third area AR3 as viewed along the first pivot axis PA1 in the low-gear state. The first pulley axis RA1 is provided in the fourth area AR4 as viewed along the first pivot axis PA1 in the low-gear state. The positional relationships among the reference axis line RL2, the arrangement line RL3, the center axis WA1 of the front hub axle W11, the center axis WA2 of the rear hub axle W21, the base mounting axis A1, the first pulley axis RA1, the second pulley axis RA2, and the third pulley axis RA3 in the low-gear state are not limited to the above positional relationships.

As seen in FIG. 21, the first pulley assembly 18 is pivotable about the first pivot axis PA1 at a first pivot angle AG3 from the top-gear state to the low-gear state. The second pulley assembly 20 is pivotable about the second pivot axis PA2 at a second pivot angle AG4 from the top-gear state to the low-gear state. In the present embodiment, the first pivot angle AG3 is different from the second pivot angle AG4. The first pivot angle AG3 is larger than the second pivot angle AG4. For example, the first pivot angle AG3 is 140 degrees. The second pivot angle AG4 is 111 degrees. However, the first pivot angle AG3 and the second pivot angle AG4 are not limited to the above angles. The first pivot angle AG3 can be equal to or smaller than the second pivot angle AG4.

Figure 22:
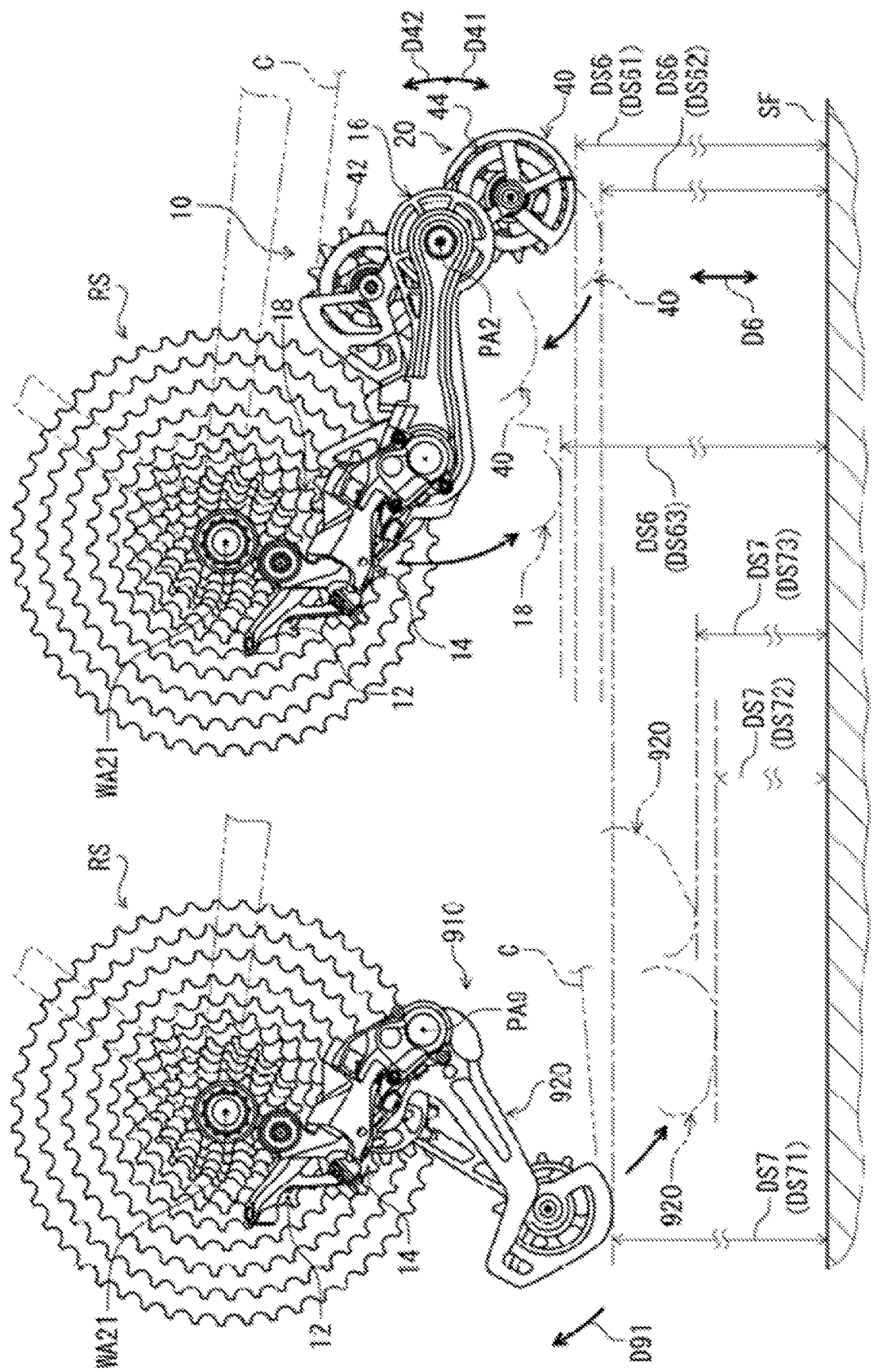
FIG. 22 is a side elevational view of the bicycle rear derailleur illustrated in FIG. 1 with a bicycle rear derailleur in accordance with a comparative example.

As seen in FIG. 22, a distance DS6 is defined between the bicycle rear derailleur 10 and a road surface SF in a perpendicular direction D6 which is perpendicular to the road surface SF. The distance DS6 is defined between the lowest part of the bicycle rear derailleur 10 (e.g., the lowest part of the first pulley assembly 18 or the second pulley assembly 20) and the road surface SF in the perpendicular direction D6. A distance DS61 is defined in the perpendicular direction D6 between the road surface SF and the lowest part of the bicycle rear derailleur 10 which is in the top-gear state. A distance DS62 is defined in the perpendicular direction D6 between the road surface SF and the lowest part of the bicycle rear derailleur 10 which is in the middle-gear state. A distance DS63 is defined in the perpendicular direction D6 between the road surface SF and the lowest part of the bicycle rear derailleur 10 which is in the low-gear state. The distance DS62 is the shortest among the distances DS61, DS62, and DS63.

A distance DS7 is defined between a bicycle rear derailleur 910 in accordance with a comparative example and the road surface SF in the perpendicular direction D6. The distance DS7 is defined between the lowest part of the bicycle rear derailleur 910 (e.g., the lowest part of a chain guide 920 of the bicycle rear derailleur 910) and the road surface SF in the perpendicular direction D6. A distance DS71 is defined in the perpendicular direction D6 between the road surface SF and the lowest part of the bicycle rear derailleur 910 which is in the top-gear state. A distance DS72 is defined in the perpendicular direction D6 between the road surface SF and the lowest part of the bicycle rear derailleur 910 which is in the middle-gear state. A distance DS73 is defined in the perpendicular direction D6 between the road surface SF and the lowest part of the bicycle rear derailleur 910 which is in the low-gear state. The distance DS72 is the shortest among the distances DS71, DS72, and DS73.

As seen in FIG. 22, the distance DS6 is longer than the distance DS7 in each of the top-gear state, the middle-gear state, and the low-gear state. The distance DS61 is longer than the distance DS71. The distance DS62 is longer than the distance DS72. The distance DS63 is longer than the distance DS73. Namely, the lowest part of the bicycle rear derailleur 10 is provided in a higher position than a position of the lowest part of the bicycle rear derailleur 910. Thus, it is possible to reduce interference between the bicycle rear derailleur 10 and at least one of the road surface SF and an object arranged on the road surface SF as compared with the bicycle rear derailleur 910.

The chain guide 920 of the bicycle rear derailleur 910 is pivoted about a pivot axis PA9 in a pivotal direction D91 when an object (e.g., the road surface SF, rock, wood) hits the chain guide 920, increasing tensional force applied to the bicycle chain C. Thus, the bicycle rear derailleur 910 and/or the bicycle chain C may be damaged due to interference between the object and the chain guide 920 of the bicycle rear derailleur 910.

The second pulley assembly 20 of the bicycle rear derailleur 10 is pivoted relative to the movable member 16 about the second pivot axis PA2 in the second pivot direction D41 when the object (e.g., the road surface SF, rock, wood) hits the chain guide 920, decreasing tensional force applied to the bicycle chain C. Thus, it is possible to avoid damage of bicycle rear derailleur 10 and/or the bicycle chain C when interference occurs between the object and the second pulley assembly 20 of the bicycle rear derailleur 10.

As seen in FIG. 1, a distance DS8 is defined between the second pulley axis RA2 and a rotational axis A2 of the crank CR in a horizontal direction D8. The distance DS8 is substantially equal to a length L8 of the bicycle chain C from one of the front sprockets of the front sprocket assembly FS to the bicycle rear derailleur 10 (e.g., the second toothed pulley 42).

Figure 23:
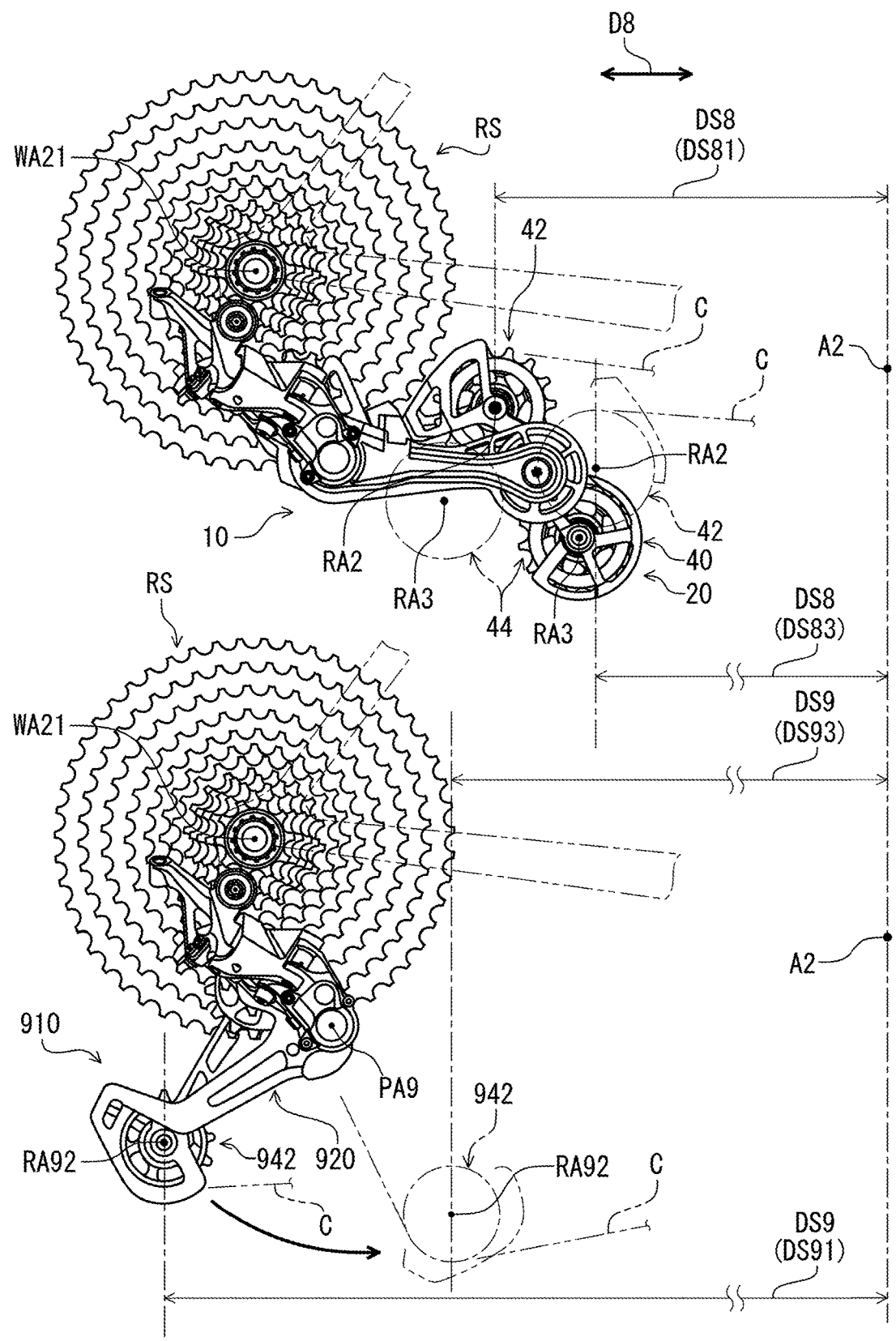
FIG. 23 is a side elevational view of the bicycle rear derailleur illustrated in FIG. 1 with the bicycle rear derailleur in accordance with the comparative example.

As seen in FIG. 23, a distance DS81 is defined between the second pulley axis RA2 of the bicycle rear derailleur 10 which is in the top-gear state and the rotational axis A2 of the crank CR in the horizontal direction D8. A distance DS83 is defined between the second pulley axis RA2 of the bicycle rear derailleur 10 which is in the low-gear state and the rotational axis A2 of the crank CR in the horizontal direction D8.

A distance DS9 is defined between a pulley axis RA92 of a tension pulley 942 of the bicycle rear derailleur 910 and the rotational axis A2 of the crank CR in the horizontal direction D8. A distance DS91 is defined between the pulley axis RA92 of the tension pulley 942 of the bicycle rear derailleur 910 which is in the top-gear state and the rotational axis A2 of the crank CR in the horizontal direction D8. A distance DS93 is defined between the pulley axis RA92 of the tension pulley 942 of the bicycle rear derailleur 910 which is in the low-gear state and the rotational axis A2 of the crank CR in the horizontal direction D8.

As seen in FIG. 23, the distance DS8 is shorter than the distance DS9. The distance DS81 is shorter than the distance DS91. The distance DS83 is shorter than the distance DS93. The distance DS8 can make the length of the bicycle chain C from the front sprocket to the second toothed pulley 42 shorter than the bicycle rear derailleur 910 of the comparative example. Thus, it is possible to reduce vibration of the bicycle chain C provided between the front sprocket and the second toothed pulley 42 as compared with the bicycle rear derailleur 910 in accordance with the comparative example.

First Modification

As seen in FIG. 11, in the coupling structure 45 in accordance with the present embodiment, the first cable pulley 46 and the second cable pulley 48 have a round shape having a constant diameter. However, at least one of the first cable pulley 46 and the second cable pulley 48 can have other shapes such as an oval shape.

Figure 24:
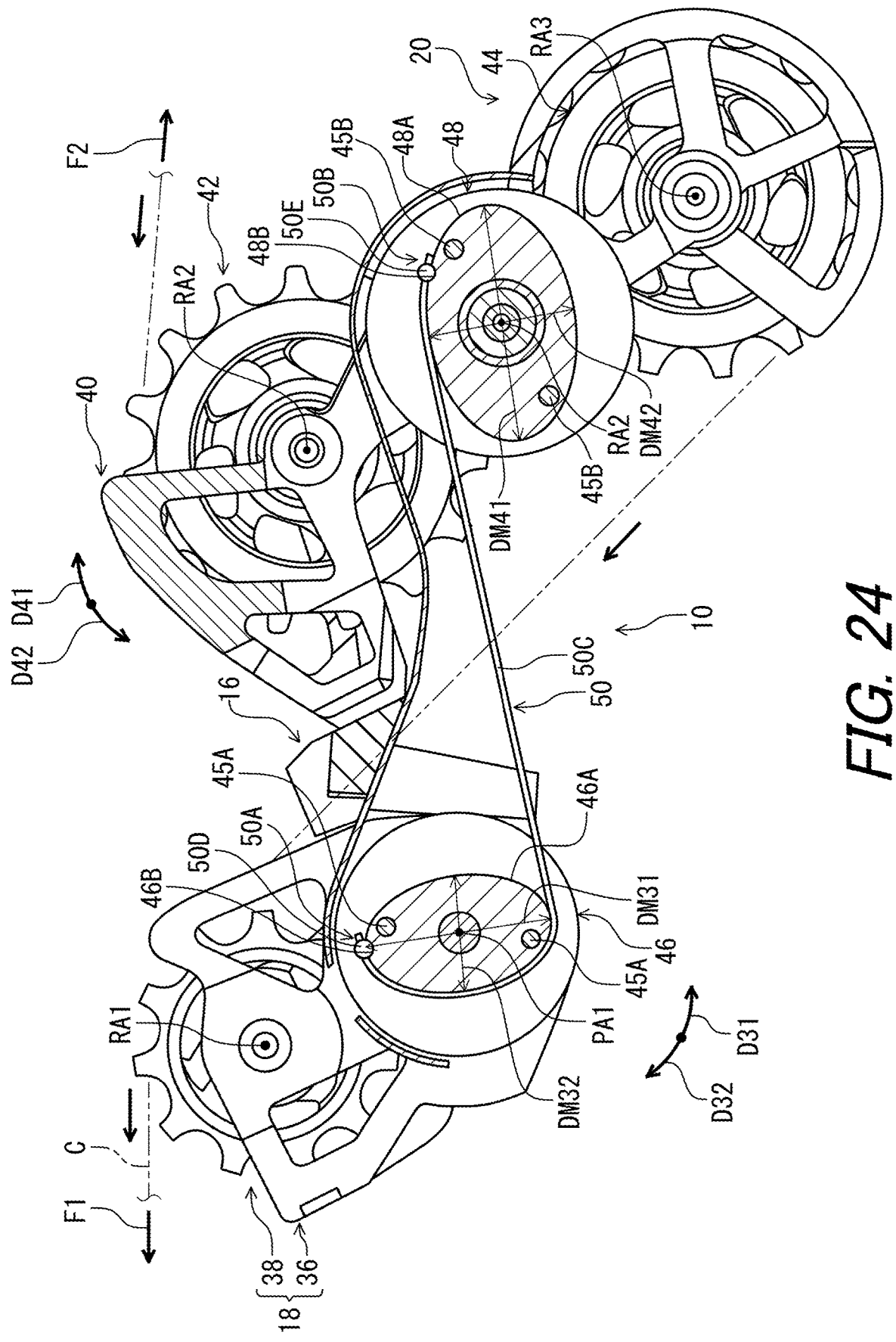
FIG. 24 is a cross-sectional view of a bicycle rear derailleur in accordance with a first modification.

As seen in FIG. 24, for example, the first cable pulley 46 and the second cable pulley 48 have an oval shape in the coupling structure 45 in accordance with a second modification. The bottom of the first groove 46A defines a first diameter DM31 and a first additional diameter DM32 as viewed along the first pivot axis PA1. The first diameter DM31 is defined along a long axis of the oval shape formed by the first groove 46A as viewed along the first pivot axis PA1. The first additional diameter DM32 is defined along a short axis of the oval shape formed by the first groove 46A as viewed along the first pivot axis PA1. The first diameter DM31 is larger than the first additional diameter DM32.

The bottom of the second groove 48A defines a second diameter DM41 and a second additional diameter DM42 as viewed along the second pivot axis PA2. The second diameter DM41 is defined along a long axis of the oval shape formed by the second groove 48A as viewed along the second pivot axis PA2. The second additional diameter DM42 is defined along a short axis of the oval shape formed by the second groove 48A as viewed along the second pivot axis PA2. The second diameter DM41 is larger than the second additional diameter DM42.

In the second modification, the first diameter DM31 is different from the second diameter DM41 and the second additional diameter DM42. The first additional diameter DM32 is different from the second diameter DM41 and the second additional diameter DM42. The first diameter DM31 is larger than the second additional diameter DM42 but smaller than the second diameter DM41. The first additional diameter DM32 is smaller than the second diameter DM41 and the second additional diameter DM42. However, the relationships among the first diameter DM31, the first additional diameter DM32, the second diameter DM41, and the second additional diameter DM42 are not limited to the above relationships.

Changing the shape and the angle of the first cable pulley 46 can change tension of the bicycle chain C depending on the orientation of the first pulley assembly 18. Changing the shape and angle of the second cable pulley 48 can change tension of the bicycle chain C depending on the orientation of the second pulley assembly 20. Only one of the first cable pulley 46 and the second cable pulley 48 can have the oval shape. The modification shown in FIGS. 24 and 25 can apply to the modification shown in FIG. 26.

Second Modification

Figure 25:
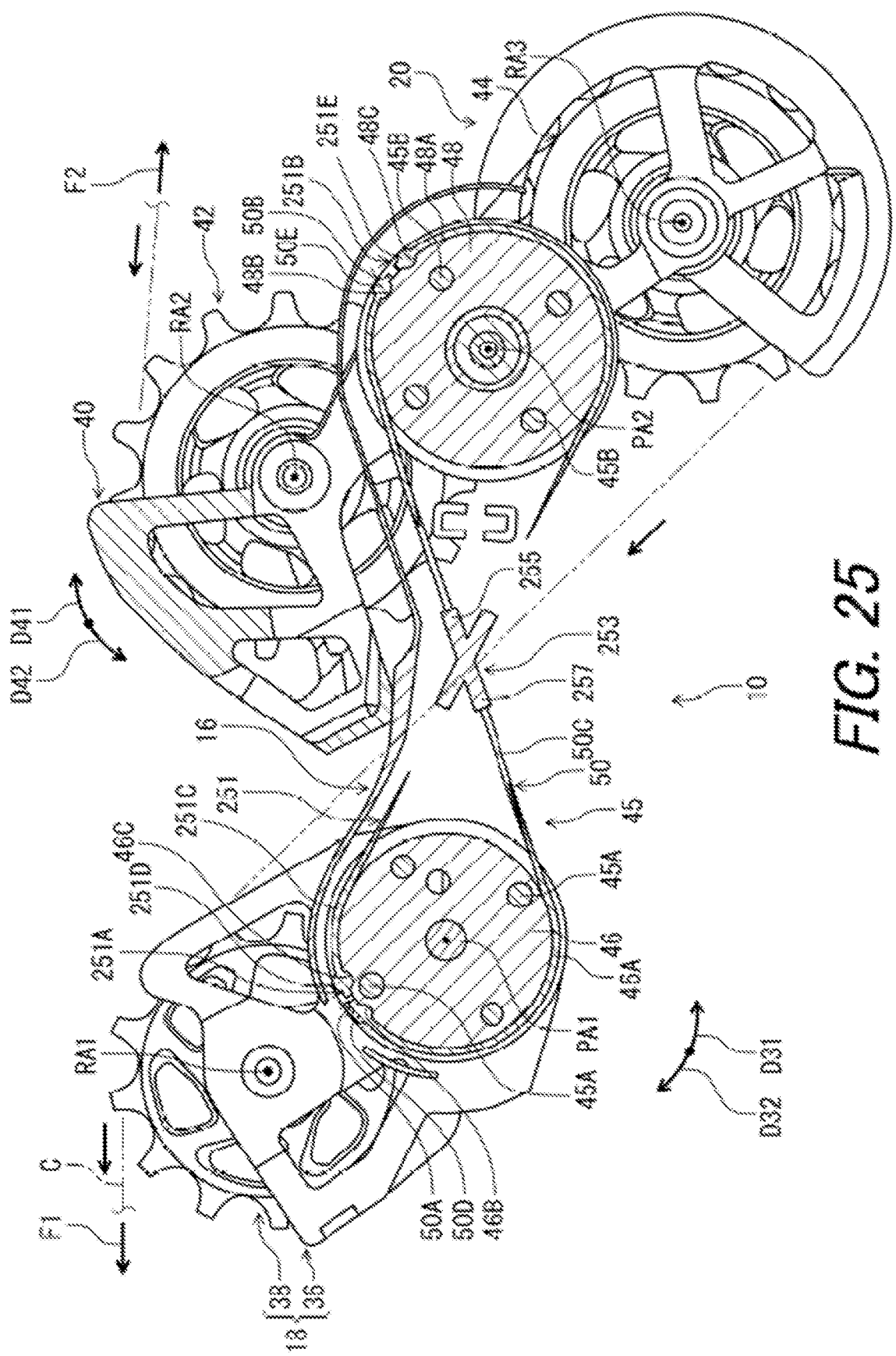
FIG. 25 is a cross-sectional view of a bicycle rear derailleur in accordance with a second modification.

In the present embodiment and the first modification, as seen in FIGS. 11 and 24, the coupling structure 45 includes the interlocking cable 50. As seen in FIG. 25, however, the coupling structure 45 in accordance with a second modification can include an additional interlocking cable 251 if needed and/or desired. The additional interlocking cable 251 is a separate cable from the interlocking cable 50. The additional interlocking cable 251 is coupled to the first cable pulley 46 and the second cable pulley 48 so as to interlock the first pulley support 36 and the second pulley support 40. The additional interlocking cable 251 is configured to couple the first cable pulley 46 and the second cable pulley 48 so as to transmit a movement of one of the first cable pulley 46 and the second cable pulley 48 to the other of the first cable pulley 46 and the second cable pulley 48.

The additional interlocking cable 251 is configured to couple the first cable pulley 46 and the second cable pulley 48 so as to pivot the second pulley support 40 about the second pivot axis PA2 in response to a pivotal movement of the first pulley support 36 about the first pivot axis PA1. The additional interlocking cable 251 is configured to couple the first cable pulley 46 and the second cable pulley 48 so as to pivot the first pulley support 36 about the first pivot axis PA1 in response to a pivotal movement of the second pulley support 40 about the second pivot axis PA2.

The additional interlocking cable 251 includes a first cable end 251A, a second cable end 251B, and an intermediate part 251C. The intermediate part 251C extends between the first cable end 251A and the second cable end 251B. The first cable end 251A includes a first attachment part 251D. The second cable end 251B includes a second attachment part 251E. The first attachment part 251D has a diameter larger than a diameter of the intermediate part 251C. The second attachment part 251E has a diameter larger than a diameter of the intermediate part 251C. The first attachment part 251D has a spherical shape. The second attachment part 251E has a spherical shape. However, the structure of the additional interlocking cable 251 is not limited to the above structure.

The first cable pulley 46 includes a first additional recess 46C. The first additional recess 46C is provided in the first groove 46A. The first cable end 251A and the intermediate part 251C are configured to be provided in the first groove 46A. The first attachment part 251D is configured to be provided in the first additional recess 46C to transmit force between the first cable pulley 46 and the additional interlocking cable 251.

The second cable pulley 48 includes a second additional recess 48C. The second groove 48A has an annular shape. The second additional recess 48C is provided in the second groove 48A. The second cable end 251B and the intermediate part 251C are configured to be provided in the second groove 48A. The second attachment part 251E is configured to be provided in the second additional recess 48C to transmit force between the second cable pulley 48 and the additional interlocking cable 251.

Figure 26:
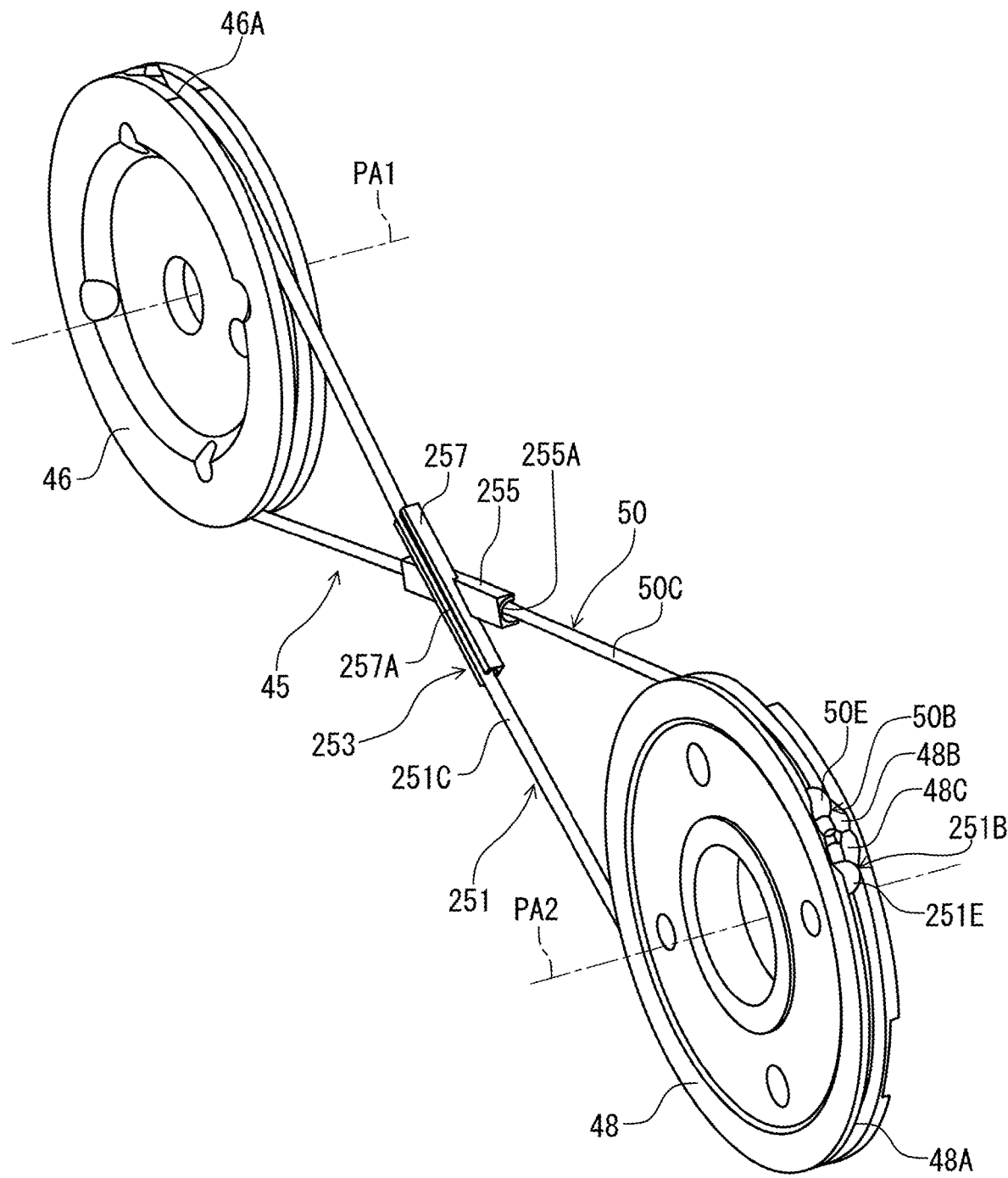
FIG. 26 is a perspective view of a coupling structure of the bicycle rear derailleur illustrated in FIG. 25.

As seen in FIG. 26, the coupling structure 45 in accordance with the second modification can include a cable support 253 if the coupling structure 45 includes the interlocking cable 50 and the additional interlocking cable 251. The cable support 253 is provided between the interlocking cable 50 and the additional interlocking cable 251 to restrict interference between the interlocking cable 50 and the additional interlocking cable 251. The cable support 253 is configured to movably couple the interlocking cable 50 and the additional interlocking cable 251. The cable support 253 includes a first cable support 255 and a second cable support 257. The first cable support 255 includes a first support groove 255A. The second cable support 257 includes a second support groove 257A. The interlocking cable 50 is movably provided in the first support groove 255A of the first cable support 255. The additional interlocking cable 251 is movably provided in the second support groove 257A of the second cable support 257. The first cable support 255 is integrally provided with the second cable support 257 as a one-piece unitary member. However, the first cable support 255 can be a separate member from the second cable support 257 if needed and/or desired.

Third Modification

In the present embodiment and the above modifications, as seen in FIGS. 11, 24, and 25, the coupling structure 45 includes the first cable pulley 46, the second cable pulley 48, and the interlocking cable 50. However, the coupling structure 45 can include structures other than a pulley and a cable.

Figure 27:
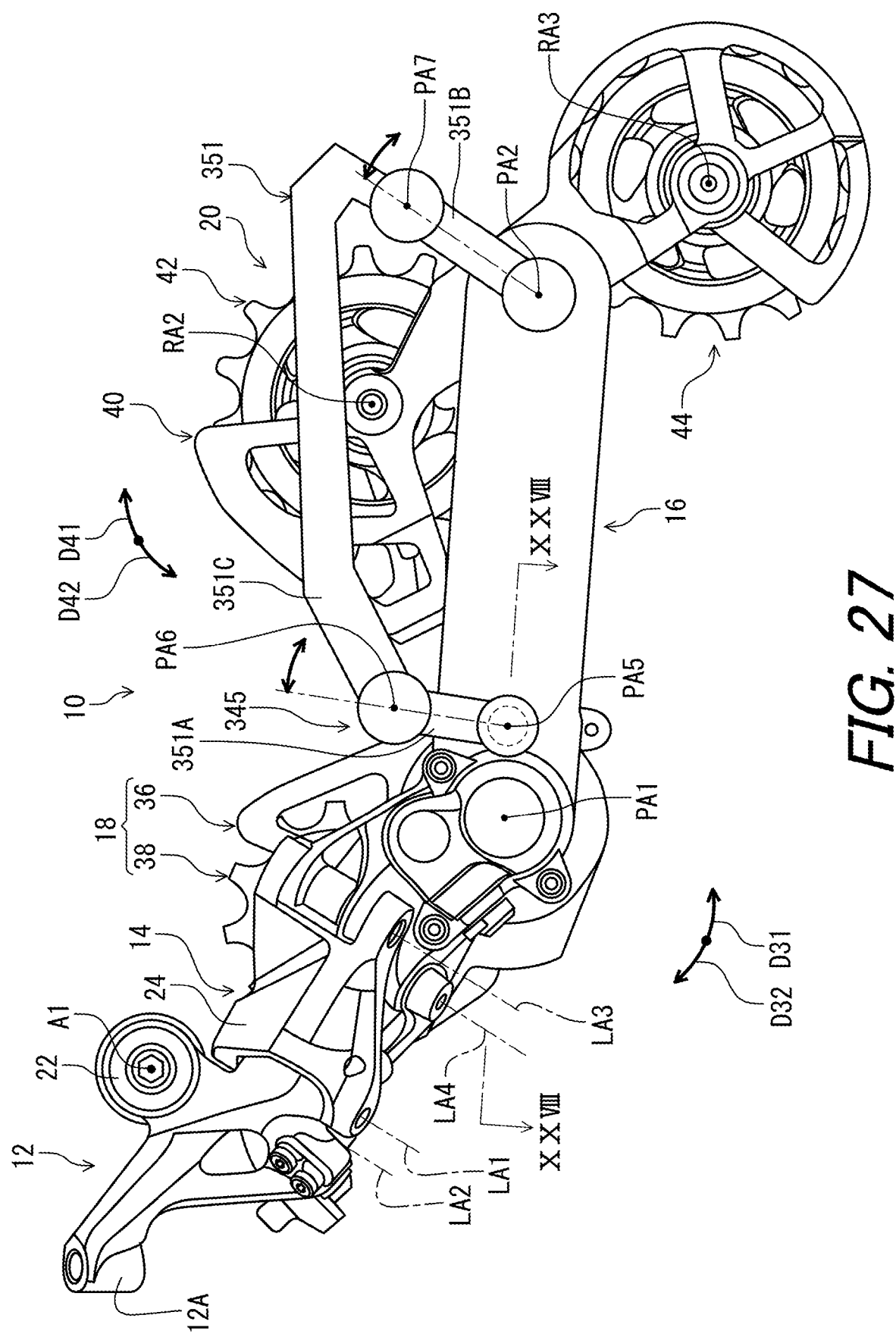
FIG. 27 is a side elevational view of a bicycle rear derailleur in accordance with a third modification.
Figure 28:
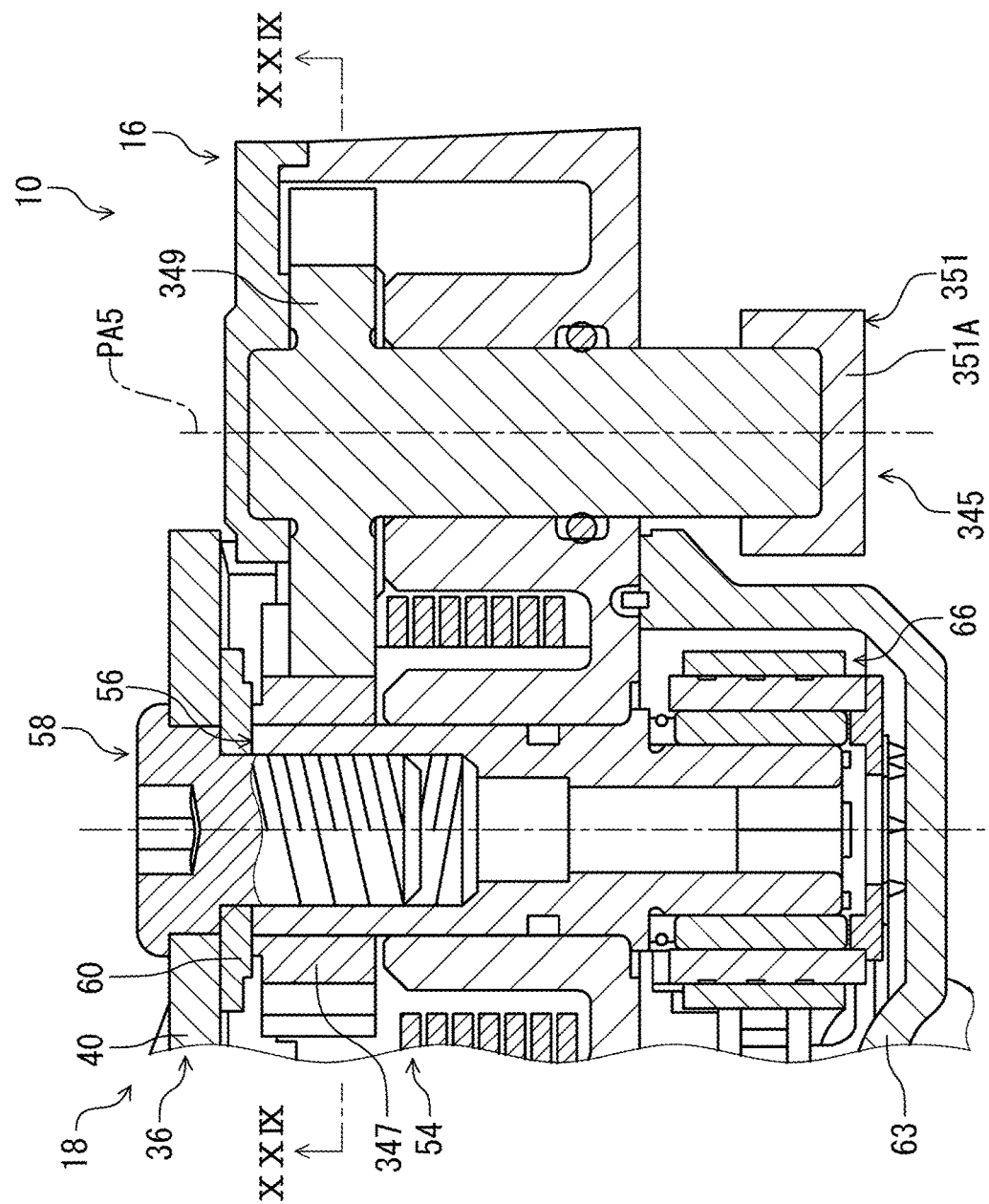
FIG. 28 is a cross-sectional view of the bicycle rear derailleur taken along line XXVIII-XXVIII of FIG. 27.
Figure 29:
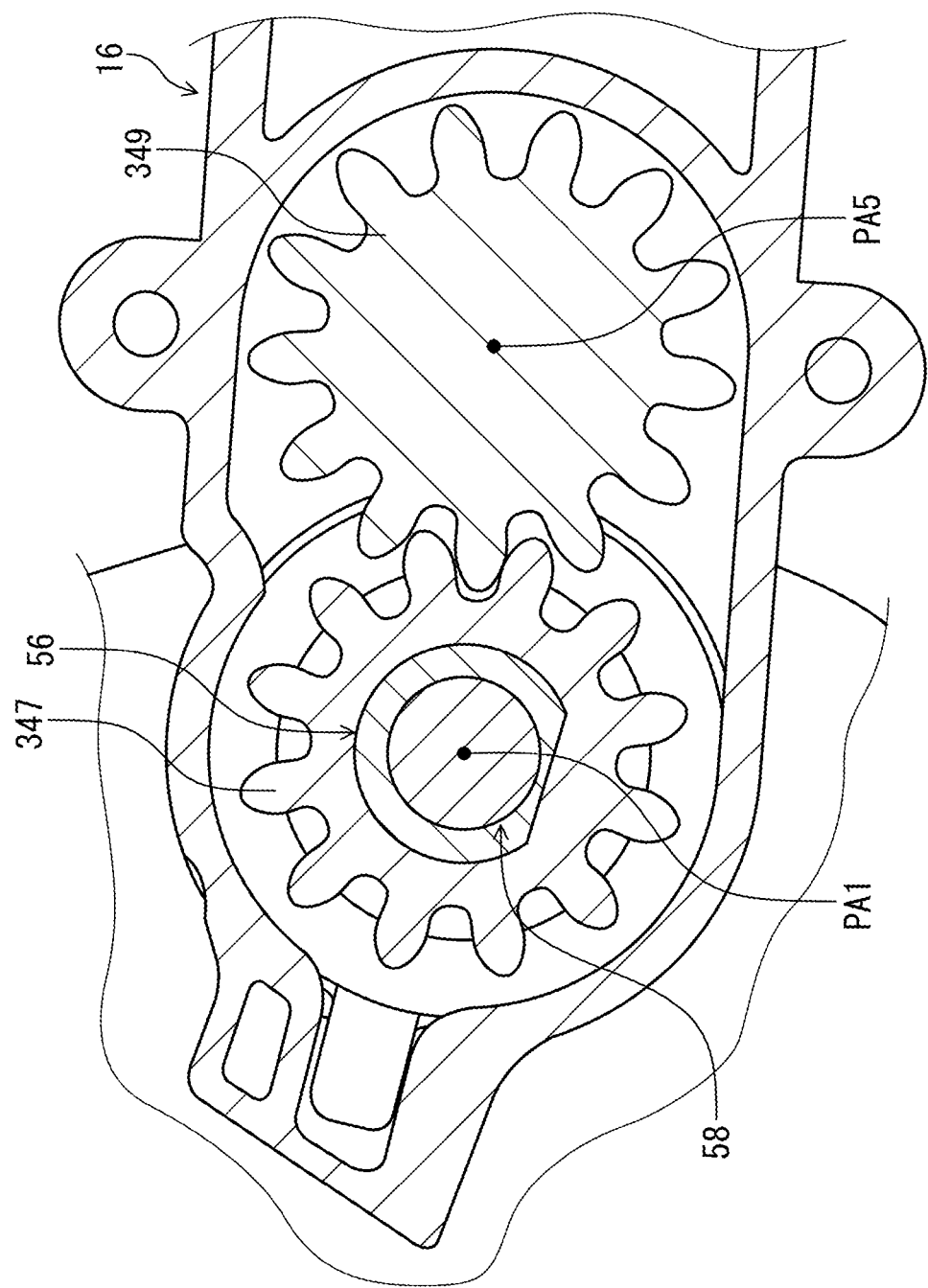
FIG. 29 is a cross-sectional view of the bicycle rear derailleur taken along line XXIX-XXIX of FIG. 28.

As seen in FIGS. 27 to 29, for example, the bicycle rear derailleur 10 in accordance with a third modification comprises a coupling structure 345. The coupling structure 345 includes a first gear 347, a second gear 349, and a coupling link 351. As seen in FIGS. 28 and 29, the first gear 347 is secured to the first pulley support 36 of the first pulley assembly 18 to pivot relative to the movable member 16 about the first pivot axis PA1 along with the first pulley support 36. The first gear 347 is secured to the rotational shaft 56. The second gear 349 is rotatably coupled to the movable member 16 about an additional pivot axis PA5 spaced apart from the first pivot axis PA1. As seen in FIG. 29, the second gear 349 is configured to engage with the first gear 347.

As seen in FIG. 27, the coupling link 351 includes a first lever 351A, a second lever 351B, and a link 351C. The first lever 351A is coupled to the second gear 349 to pivot relative to the movable member 16 about the additional pivot axis PA5 along with the second gear 349 (see e.g., FIG. 28). The second lever 351B is coupled to the second pulley support 40 of the second pulley assembly 20 to pivot relative to the movable member 16 about the second pivot axis PA2 along with the second pulley support 40. The link 351C is configured to couple the first lever 351A to the second lever 351B to transmit a pivotal movement of the first lever 351A to the second lever 351B. The link 351C is pivotally coupled to the first lever 351A about a first axis PA6. The link 351C is pivotally coupled to the second lever 351B about a second axis PA7.

Fourth Modification

In the present embodiment and the above modifications, as seen in FIG. 13, the damping structure 66 is configured to provide frictional resistance in the one rotational direction of the one of the first pulley support 36 and the second pulley support 40. However, rotational resistance can include resistance other resistance such as hydraulic resistance.

Figure 30:
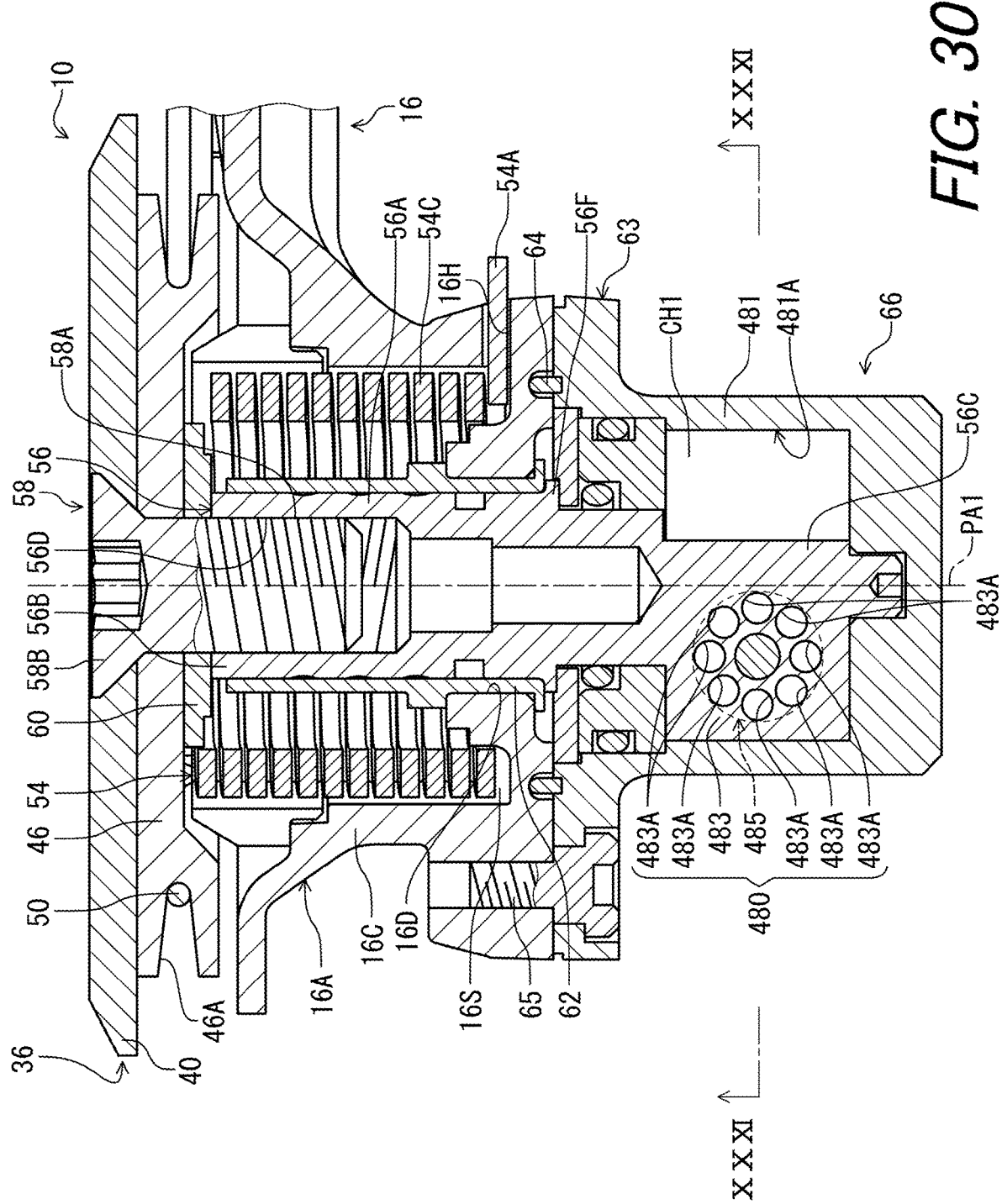
FIG. 30 is a cross-sectional view of a bicycle rear derailleur in accordance with a fourth modification.
Figure 31:
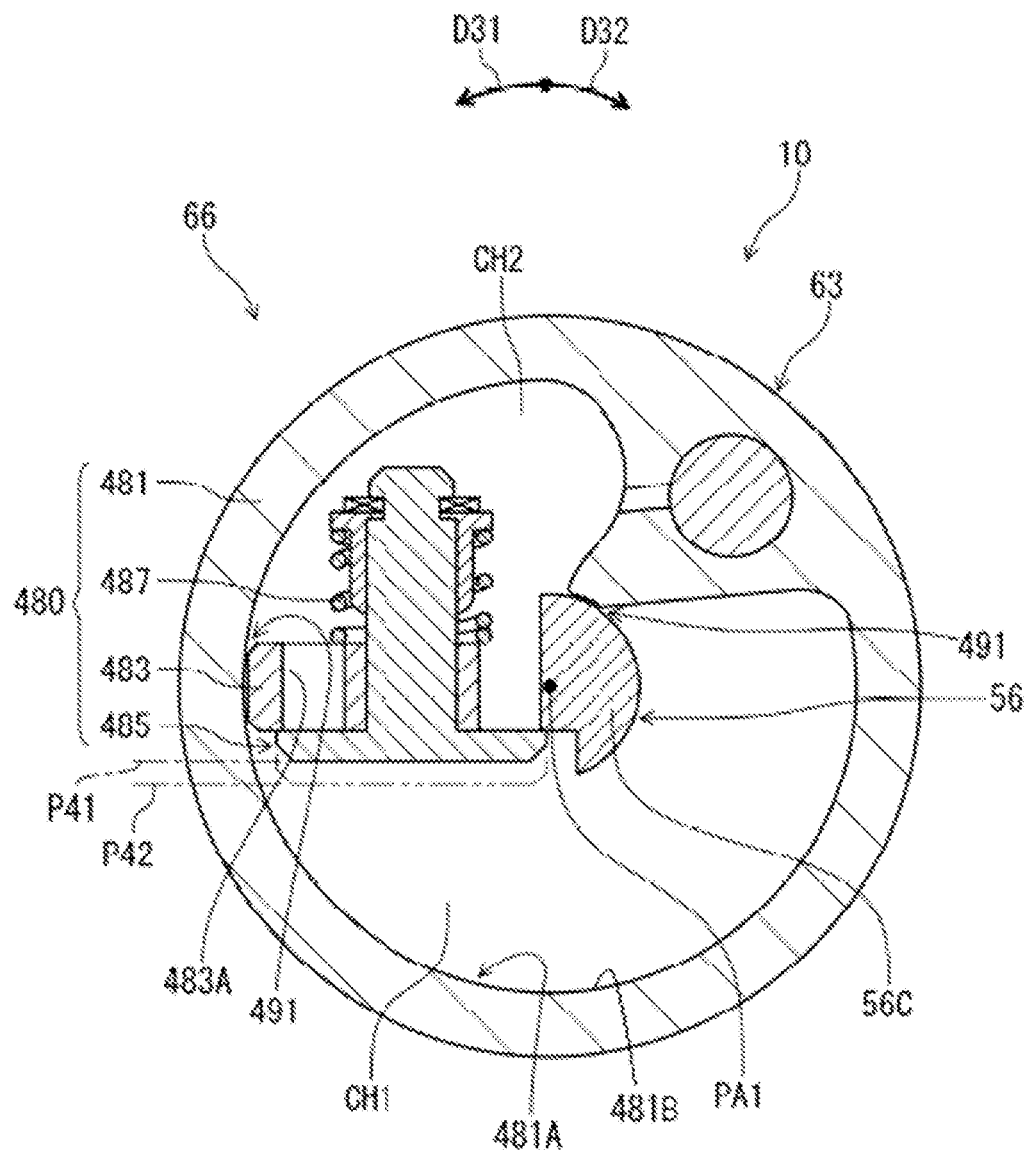
FIG. 31 is a cross-sectional view of the bicycle rear derailleur taken along line XXXI-XXXI of FIG. 30.

As seen in FIGS. 30 and 31, for example, the damping structure 66 can be configured to provide hydraulic resistance in the one rotational direction of the one of the first pulley support 36 and the second pulley support 40. In a fourth modification illustrated in FIGS. 30 and 31, the damping structure 66 includes a resistance applying member 480. The resistance applying member 480 is operatively arranged between the movable member 16 and the rotational shaft 56. The resistance applying member 480 is coupled to the rotational shaft 56 to rotate relative to the movable member 16 about the first pivot axis PA1 along with the rotational shaft 56. The damping structure 66 includes a hydraulic housing 481 including a hydraulic chamber 481A. The hydraulic housing 481 is provided to the cover 63. The hydraulic chamber 481A is configured to be filled with fluid such as oil.

As seen in FIG. 31, the resistance applying member 480 is movably provided in the hydraulic chamber 481A. The resistance applying member 480 includes a vane 483, a valve 485, and a valve spring 487. The vane 483 extends radially outward from the rotational shaft 56. The vane 483 includes a plurality of holes 483A. The valve 485 is movably coupled to the vane 483. The valve 485 is movable relative to the vane 483 between a closed position P41 and an open position P42. The valve 485 is configured to cover the plurality of holes 483A in a closed state where the valve 485 is in the closed position P41. The valve 485 is configured to not cover the plurality of holes 483A in an open state where the valve 485 is in the open position P42. The valve spring 487 is configured to bias the valve 485 toward the closed position P41.

The resistance applying member 480 is configured to define a first chamber CH1 and a second chamber CH2. A clearance 491 is provided between the vane 483 and an inner surface 481B of the hydraulic housing 481. The vane 483 is pivoted relative to the movable member 16 about the first pivot axis PA1 in the first pivot direction D31 when the rotational shaft 56 is rotated relative to the movable member 16 in the first pivot direction D31. The valve 485 is pressed by fluid provided in the first chamber CH1 when the vane 483 is pivoted relative to the movable member 16 about the first pivot axis PA1 in the first pivot direction D31. Thus, fluid flows from the first chamber CH1 to the second chamber CH2 through only the clearance 491, applying first hydraulic resistance to the rotational shaft 56.

The vane 483 is pivoted relative to the movable member 16 about the first pivot axis PA1 in the first additional pivot direction D32 when the rotational shaft 56 is rotated relative to the movable member 16 in the first additional pivot direction D32. The valve 485 is moved relative to the vane 483 from the closed position P41 toward the open position P42 by fluid provided in the second chamber CH2 when the vane 483 is pivoted relative to the movable member 16 about the first pivot axis PA1 in the first additional pivot direction D32. Thus, fluid flows from the second chamber CH2 to the first chamber CH1 through the plurality of holes 483A and the clearance 491, applying second hydraulic resistance, which is lower than the first hydraulic resistance, to the rotational shaft 56.

Fifth Modification

In the present embodiment and the above modifications, as seen in FIGS. 5, 24, 25, and 27, the distance defined between the first pivot axis PA1 and the second pivot axis PA2 is constant. However, the first pivot axis PA1 and the second pivot axis PA2 can be configured to be movable relative to each other.

Figure 32:
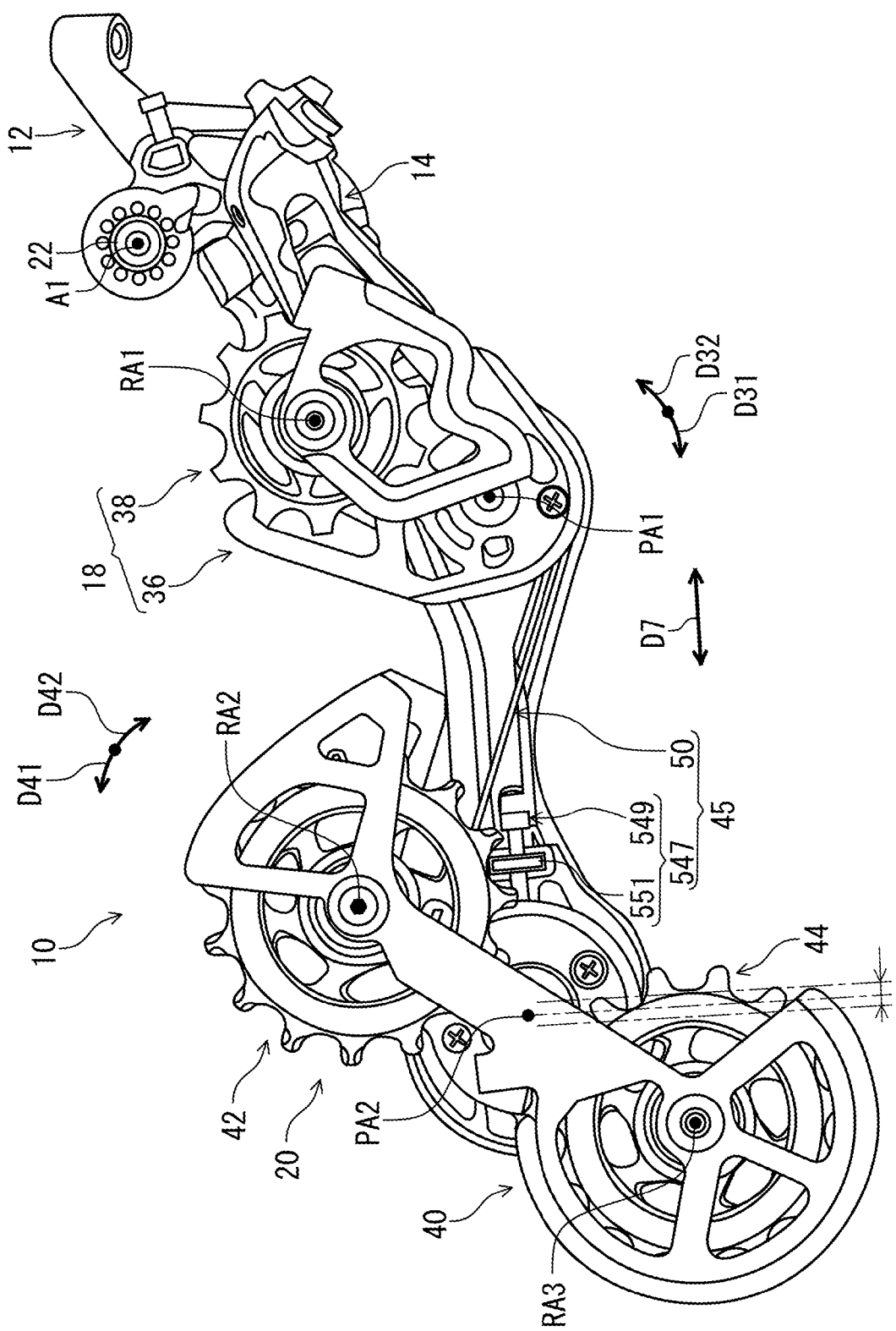
FIG. 32 is a side elevational view of a bicycle rear derailleur in accordance with a fifth modification.

As seen in FIG. 32, for example, the coupling structure 45 in accordance with a fifth modification includes an adjustment structure 547. The adjustment structure 547 is configured to move the second pulley assembly 20 relative to the first pulley assembly 18 so as to change the fourth distance DS4 defined between the first pivot axis PA1 and the second pivot axis PA2.

Figure 33:
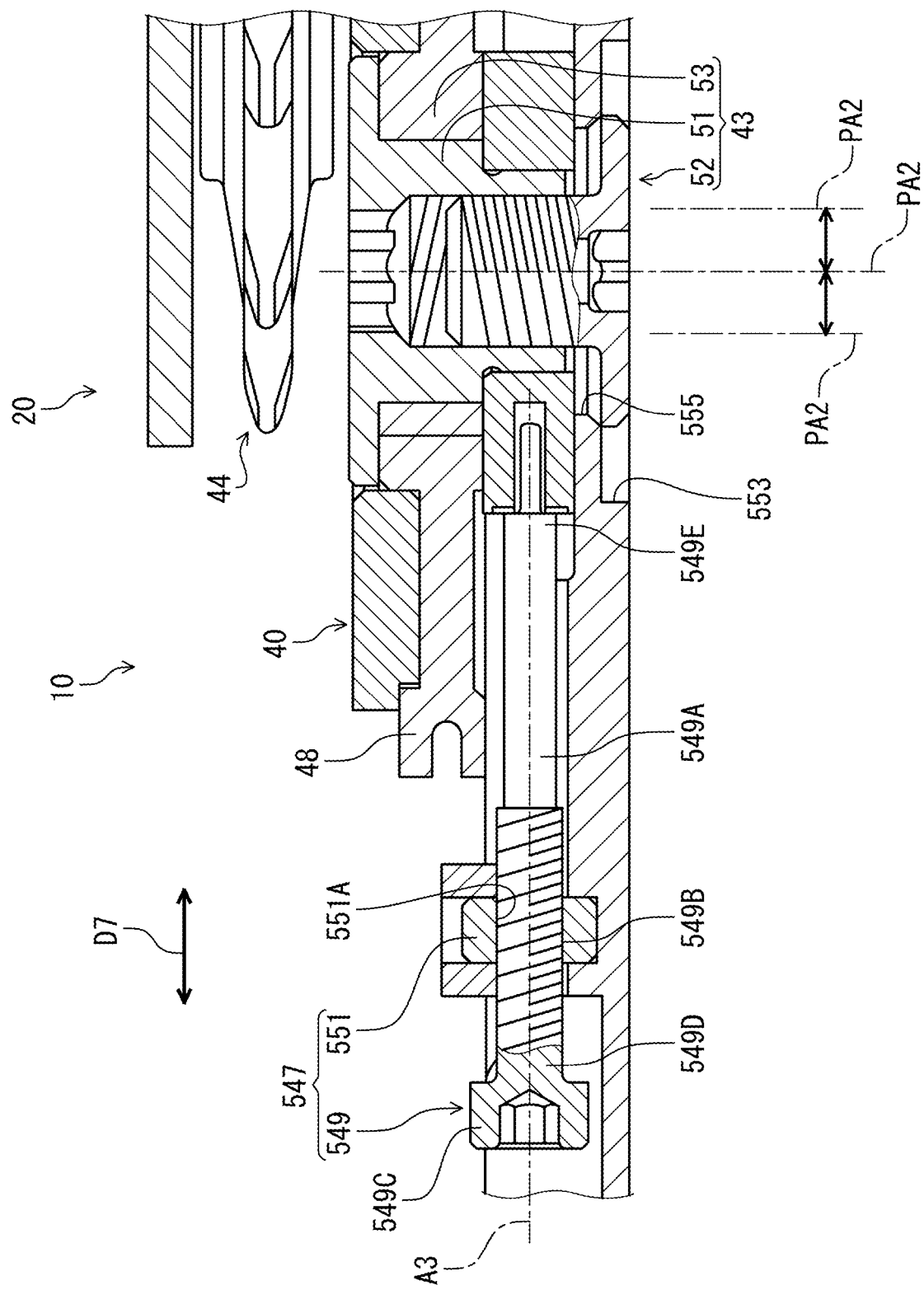
FIG. 33 is a cross-sectional view of the bicycle rear derailleur taken along line XXXIII-XXXIII of FIG. 34.

As seen in FIG. 33, the adjustment structure 547 includes an adjustment bolt 549 and an adjustment nut 551. The adjustment bolt 549 is rotatably mounted to the movable member 16. The adjustment nut 551 is attached to the movable member 16. The adjustment bolt 549 includes a rod 549A, an externally threaded part 549B, and a head 549C. The rod 549A includes a first rod end 549D and a second rod end 549E. The rod 549A extends between the first rod end 549D and the second rod end 549E along a longitudinal axis A3. The externally threaded part 549B is provided on an outer periphery of the rod 549A. The head 549C is provided at the first rod end 549D. The second rod end 549E is configured to be in contact with the second pulley assembly 20. The second rod end 549E is configured to be in contact with the second pulley support 40. The adjustment nut 551 includes a threaded hole 551A. The externally threaded part 549B is threadedly engaged with the threaded hole 551A.

The movable member 16 includes a first elongated opening 553 and a second elongated opening 555. The securing member 52 of the pivot coupling structure 43 extends through the first elongated opening 553 and the second elongated opening 555.

Figure 34:
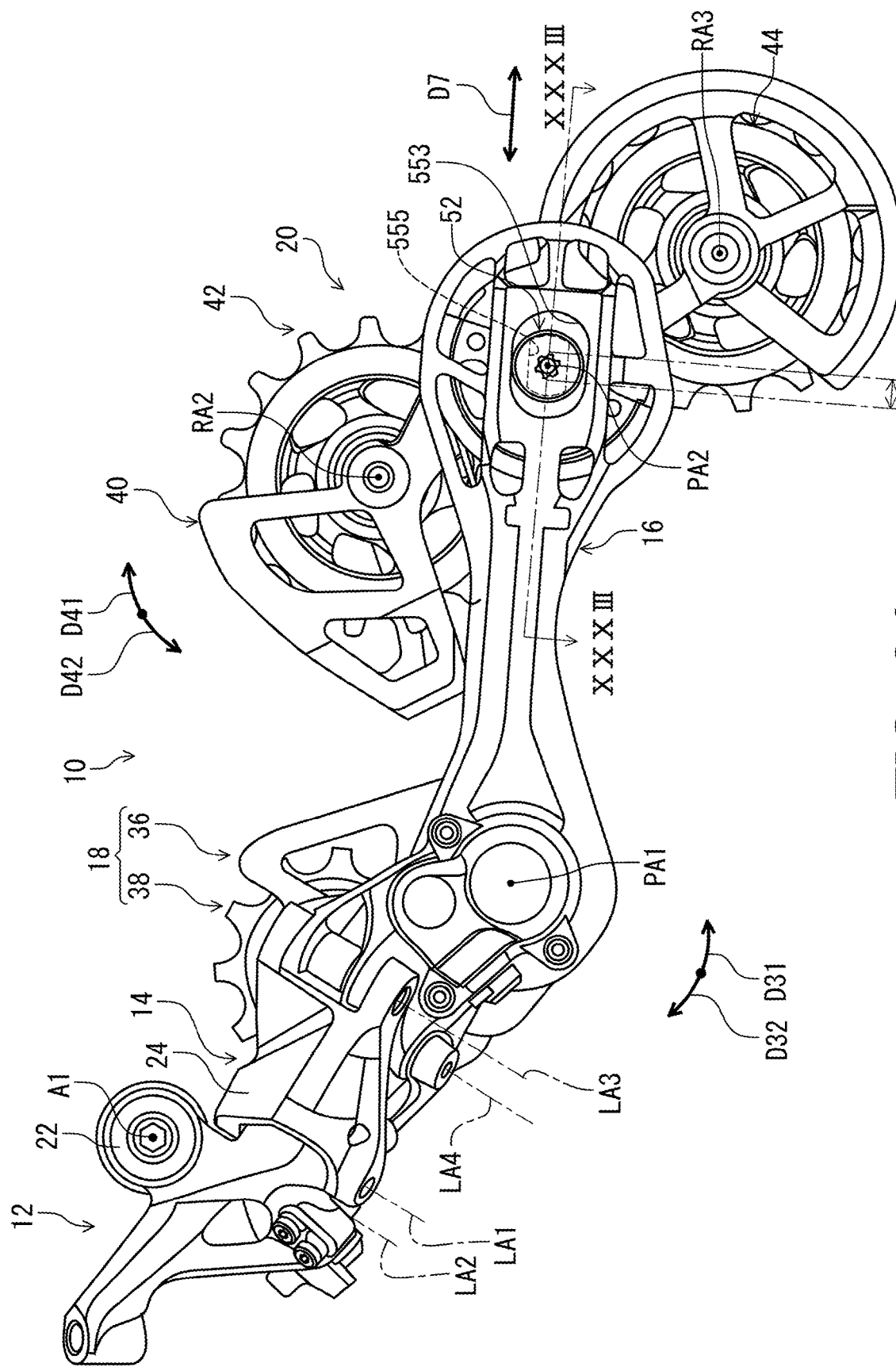
FIG. 34 is another side elevational view of a bicycle rear derailleur in accordance with the fifth modification.

As seen in FIG. 34, the first elongated opening 553 and the second elongated opening 555 extends in the direction D7. The pivot coupling structure 43 is movable relative to the movable member 16 in the direction D7 within a range of at least one of the first elongated opening 553 and the second elongated opening 555 in a state where the securing member 52 is loosened.

As seen in FIG. 33, rotation of the adjustment bolt 549 changes the relative position between the movable member 16 and the second pulley assembly 20 within the range of at least one of the first elongated opening 553 and the second elongated opening 555 in the state where the securing member 52 is loosened. Thus, it is possible to change or adjust tension of the interlocking cable 50 (see e.g., FIG. 32) and/or the additional interlocking cable 251 (see e.g., FIG. 25). Furthermore, it is possible to change or adjust the relationship between the pivotal position of the first pulley assembly 18 and the pivotal position of the second pulley assembly 20.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear derailleur comprising:
 a base member configured to be mounted to a bicycle frame;
 a linkage structure pivotally coupled to the base member;
 a movable member pivotally coupled to the linkage structure such that the movable member is movable relative to the base member;
 a first pulley assembly including:
  a first pulley support pivotally coupled to the movable member about a first pivot axis; and
  a first toothed pulley configured to engage with a bicycle chain and rotatably coupled to the first pulley support about a first pulley axis spaced apart from the first pivot axis; and
 a second pulley assembly including:
  a second pulley support pivotally coupled to the movable member about a second pivot axis spaced apart from the first pivot axis;
  a second toothed pulley configured to engage with the bicycle chain and rotatably coupled to the second pulley support about a second pulley axis spaced apart from the second pivot axis; and
  a third toothed pulley configured to engage with the bicycle chain and rotatably coupled to the second pulley support about a third pulley axis spaced apart from the second pivot axis and the second pulley axis.

2. The bicycle rear derailleur according to claim 1, wherein
 the first pivot axis is disposed closer to the linkage structure than the second pivot axis.

3. The bicycle rear derailleur according to claim 1, wherein
 the second pivot axis is disposed between the second pulley axis and the third pulley axis.

4. The bicycle rear derailleur according to claim 1, further comprising:
 a first cable pulley fixedly coupled to the first pulley support and rotatably coupled to the movable member about the first pivot axis;
 a second cable pulley fixedly coupled to the second pulley support and rotatably coupled to the movable member about the second pivot axis; and
 an interlocking cable coupled to the first cable pulley and the second cable pulley so as to interlock the first pulley support and the second pulley support.

5. The bicycle rear derailleur according to claim 4, further comprising:
 a biasing member disposed about the first pivot axis and having a first end coupled to the movable member and a second end coupled to at least one of the first cable pulley and the first pulley support.

6. The bicycle rear derailleur according to claim 5, wherein
 the movable member and the second pulley support are free of another biasing member about the second pivot axis.

7. The bicycle rear derailleur according to claim 1, further comprising:
 a rotational shaft secured to one of the first pulley support and the second pulley support and rotatably coupled to the movable member about corresponding one of the first pivot axis and the second pivot axis; and
 a damping structure disposed on the movable member about the rotational shaft, wherein
 the damping structure is configured to provide rotational resistance in one rotational direction of the one of the first pulley support and the second pulley support.

8. The bicycle rear derailleur according to claim 7, wherein the damping structure includes a one-way clutch disposed between the movable member and the rotational shaft.

9. The bicycle rear derailleur according to claim 7, wherein
the damping structure includes a resistance applying member operatively arranged between the movable member and the rotational shaft and a resistance adjusting member configured to contact the resistance applying member, and
the resistance adjusting member is movably mounted on the movable member between at least a first position and a second position so that first rotational resistance with the resistance adjusting member in the first position is different from second rotational resistance with the resistance adjusting member in the second position.

10. The bicycle rear derailleur according to claim 7, wherein
the damping structure is configured to provide frictional resistance in the one rotational direction of the one of the first pulley support and the second pulley support.

11. The bicycle rear derailleur according to claim 7, wherein
the damping structure is configured to provide hydraulic resistance in the one rotational direction of the one of the first pulley support and the second pulley support.

12. The bicycle rear derailleur according to claim 1, wherein
an inclination angle is defined between a reference axis line and a hub axle line as viewed along the first pivot axis in a mounting state where the bicycle rear derailleur is mounted to the bicycle frame,
the reference axis line passes through the first pivot axis and the second pivot axis as viewed along the first pivot axis,
the hub axle line passes through a center axis of a front hub axle and a center axis of a rear hub axle as viewed along the first pivot axis, and
the inclination angle ranges from 0 degree to 25 degrees.

13. A bicycle rear derailleur comprising:
a base member configured to be mounted to a bicycle frame;
a linkage structure pivotally coupled to the base member;
a movable member pivotally coupled to the linkage structure such that the movable member is movable relative to the base member;
a first pulley assembly pivotally or rotatably coupled to the movable member about a first pivot axis; and
a second pulley assembly pivotally or rotatably coupled to the movable member about a second pivot axis spaced apart from the first pivot axis,
an inclination angle being defined between a reference axis line and a hub axle line as viewed along the first pivot axis in a mounting state where the bicycle rear derailleur is mounted to the bicycle frame,
the reference axis line passing through the first pivot axis and the second pivot axis as viewed along the first pivot axis,
the hub axle line passing through a center axis of a front hub axle and a center axis of a rear hub axle as viewed along the first pivot axis, and
the inclination angle being within a range having a lower limit not less than 0 degree and an upper limit not greater than 25 degrees.

14. The bicycle rear derailleur according to claim 13, wherein
the inclination angle is within the range each of a top-gear state and a low-gear state.

15. The bicycle rear derailleur according to claim 13, wherein
the inclination angle is within the range each of a top-gear state, a middle-gear state and a low-gear state.

16. The bicycle rear derailleur according to claim 13, wherein
the first pivot axis is closer to the hub axle line than the second pivot axis in each of a top-gear state and a low-gear state as viewed along the first pivot axis.

17. A bicycle rear derailleur comprising:
a base member configured to be mounted to a bicycle frame at a base mounting axis;
a linkage structure pivotally coupled to the base member;
a movable member pivotally coupled to the linkage structure such that the movable member is movable relative to the base member;
a first pulley assembly including:
a first pulley support pivotally coupled to the movable member about a first pivot axis, and
a first toothed pulley configured to engage with a bicycle chain and rotatably coupled to the first pulley support about a first pulley axis spaced apart from the first pivot axis; and
a second pulley assembly including:
a second pulley support pivotally coupled to the movable member about a second pivot axis spaced apart from the first pivot axis, and
a second toothed pulley configured to engage with the bicycle chain and rotatably coupled to the second pulley support about a second pulley axis spaced apart from the second pivot axis,
an arrangement angle being defined between an arrangement line and a reference axis line as viewed along the first pivot axis,
the arrangement line passing through the base mounting axis and the first pivot axis as viewed along the first pivot axis,
the reference axis line passing through the first pivot axis and the second pivot axis as viewed along the first pivot axis, and
the arrangement angle ranging from 100 degrees to 150 degrees.

18. The bicycle rear derailleur according to claim 17, wherein
the second pulley assembly includes a third toothed pulley configured to engage with the bicycle chain and rotatably coupled to the second pulley support about a third pulley axis spaced apart from the second pivot axis and the second pulley axis.

* * * * *